(12) United States Patent
Huang

(10) Patent No.: US 9,976,085 B2
(45) Date of Patent: May 22, 2018

(54) LIQUID CRYSTAL ALIGNMENT AGENT, LIQUID CRYSTAL ALIGNMENT FILM, AND LIQUID CRYSTAL DISPLAY ELEMENT

(71) Applicant: Chi Mei Corporation, Tainan (TW)

(72) Inventor: Wan-Ting Huang, Tainan (TW)

(73) Assignee: Chi Mei Corporation, Tainan (TW)

( * ) Notice: Subject to any disclaimer, the term of this patent is extended or adjusted under 35 U.S.C. 154(b) by 329 days.

(21) Appl. No.: 14/932,977

(22) Filed: Nov. 5, 2015

(65) Prior Publication Data
US 2016/0122652 A1 May 5, 2016

(30) Foreign Application Priority Data

Nov. 5, 2014 (TW) .............................. 103138335 A

(51) Int. Cl.
| | |
|---|---|
| C09K 19/56 | (2006.01) |
| C09K 19/32 | (2006.01) |
| C09D 179/08 | (2006.01) |
| C08G 73/10 | (2006.01) |
| C09K 19/04 | (2006.01) |
| C09K 19/12 | (2006.01) |
| C09K 19/20 | (2006.01) |
| C08G 77/14 | (2006.01) |
| C08G 77/20 | (2006.01) |
| G02F 1/1337 | (2006.01) |
| C08G 77/00 | (2006.01) |

(52) U.S. Cl.
CPC .......... *C09K 19/56* (2013.01); *C08G 73/1042* (2013.01); *C08G 73/1067* (2013.01); *C08G 73/1078* (2013.01); *C09D 179/08* (2013.01); *C09K 19/32* (2013.01); *C08G 77/14* (2013.01); *C08G 77/20* (2013.01); *C08G 77/80* (2013.01); *C09K 2019/0448* (2013.01); *C09K 2019/122* (2013.01); *C09K 2019/2035* (2013.01); *C09K 2019/2078* (2013.01); *G02F 1/133711* (2013.01); *G02F 1/133788* (2013.01)

(58) Field of Classification Search
None
See application file for complete search history.

(56) References Cited

U.S. PATENT DOCUMENTS

| | | | | |
|---|---|---|---|---|
| 2003/0087045 A1* | 5/2003 | Nakata | ................. | C09K 19/56 428/1.27 |
| 2005/0003110 A1* | 1/2005 | Tanaka | ............. | G02F 1/133753 428/1.23 |
| 2007/0059612 A1* | 3/2007 | Yoshioka | ............. | C09D 133/06 430/7 |
| 2010/0093119 A1* | 4/2010 | Shimizu | ................. | B41N 1/12 438/29 |
| 2011/0026121 A1* | 2/2011 | Suzuki | .................... | G02B 1/04 359/585 |
| 2011/0157531 A1* | 6/2011 | Suwa | ................ | G02F 1/133711 349/124 |
| 2013/0237040 A1* | 9/2013 | Kakuta | .................... | B32B 7/06 438/479 |
| 2014/0173893 A1* | 6/2014 | Nagao | ............... | G02F 1/133788 29/829 |
| 2015/0125680 A1* | 5/2015 | Araki | ....................... | G03F 7/30 428/216 |
| 2015/0370358 A1* | 12/2015 | Araki | ..................... | G06F 3/041 345/173 |

FOREIGN PATENT DOCUMENTS

| | | |
|---|---|---|
| CN | 101515092 | 8/2009 |
| CN | 101730862 | 6/2010 |
| CN | 101910928 | 12/2010 |
| CN | 102311739 | 1/2012 |
| CN | 103080153 | 5/2013 |
| CN | 103320146 | 9/2013 |
| CN | 103911163 | 7/2014 |
| JP | 2000297082 | 10/2000 |
| JP | 2007002065 | 1/2007 |
| TW | 201323389 | 6/2013 |

OTHER PUBLICATIONS

"Office Action of China Counterpart Application," dated Jul. 3, 2017, p. 1-p. 6, in which the listed references were cited.

* cited by examiner

*Primary Examiner* — Megan McCulley
(74) *Attorney, Agent, or Firm* — JCIPRNET

(57) ABSTRACT

A liquid crystal alignment agent capable of forming a liquid crystal display element having good resistance to ultraviolet decay and no mura effect, a liquid crystal alignment film, and a liquid crystal display element having the same are provided. The liquid crystal alignment agent includes a polymer (A), a polysiloxane (B), a photopolymerizable compound (C), and a solvent (D). The polymer (A) is obtained by reacting a first mixture. The first mixture includes a tetracarboxylic dianhydride component (a1) and a diamine component (a2). The polysiloxane (B) is obtained by reacting a polysiloxane compound and a carboxylic acid compound (b4) having a $C_4$ to $C_{50}$ long chain. The polysiloxane compound is obtained by reacting a second mixture including a silane compound (b1) containing a polymerizable unsaturated group and a silane compound (b2) containing an epoxy group.

12 Claims, No Drawings

LIQUID CRYSTAL ALIGNMENT AGENT, LIQUID CRYSTAL ALIGNMENT FILM, AND LIQUID CRYSTAL DISPLAY ELEMENT

CROSS-REFERENCE TO RELATED APPLICATION

This application claims the priority benefit of Taiwan application serial no. 103138335, filed on Nov. 5, 2014. The entirety of the above-mentioned patent application is hereby incorporated by reference herein and made a part of this specification.

BACKGROUND OF THE INVENTION

Field of the Invention

The invention relates to a liquid crystal alignment agent, a liquid crystal alignment film, and a liquid crystal display element. More particularly, the invention relates to a liquid crystal alignment agent capable of forming a liquid crystal alignment element having good resistance to ultraviolet decay and no mura defect, a liquid crystal alignment film formed by the liquid crystal alignment agent, and a liquid crystal display element having the liquid crystal alignment film.

Description of Related Art

With the development of the liquid crystal display toward a large-size display specification, in order to overcome the issue of viewing angle of a large-size display, the wide-viewing angle techniques of the liquid crystal display panel also need to continuously progress and advance. The multi-domain vertical alignment (MVA)-type liquid crystal display panel is a common wide-viewing angle technique. In the MVA-type liquid crystal display panel, a protrusion is formed in the liquid crystal panel, and the protrusion can limit the tilting direction of a liquid crystal molecule, thereby achieving the display effect of wide-viewing angle. However, the MVA-type liquid crystal display panel cannot prevent the issues of insufficient transmittance and contrast and slow response speed of the liquid crystal molecule originating from the protrusion.

In recent years, to solve the above issues, a polymer-sustained alignment (PSA)-type technique has currently been developed. In the technique, a liquid crystal composition containing a polymerizable compound is clamped in the gap of a pair of substrates formed by a substrate having a patterned conductive film and a substrate without a patterned conductive film or in the gap of a pair of substrates formed by two substrates each having a patterned conductive film, and ultraviolet is irradiated on the liquid crystal composition when voltage is applied between the conductive films to perform polymerization on the polymerizable compound. As a result, pre-tilt angle characteristics are exhibited, and the direction of liquid crystal alignment is controlled. The technique can make the conductive films form a specific structure to achieve the effects of wide-viewing angle and increased response speed of a liquid crystal molecule, thus solving the inevitable issues of insufficient transmittance and contrast of the MVA-type liquid crystal display panel.

However, to generate polymerization to the polymerizable compound, a large amount of ultraviolet of, for instance, 100,000 J/m² needs to be irradiated. Therefore, in addition to the concern that liquid crystal molecules may be decomposed, unreacted compounds that are not polymerized from ultraviolet irradiation also remain in the liquid crystal layer to form impurity contamination, such that the issue of mura defect is generated to the liquid crystal display element, which in particular has a negative effect on electrical characteristics. Moreover, the type of the liquid crystal molecule used in the liquid crystal layer also needs to correspond to the added polymerizable compound, and is therefore limited.

Therefore, how to solve the issue of impurity contamination of the liquid crystal layer and provide a liquid crystal display element having good resistance to ultraviolet decay and no mura defect is a current topic actively researched by those skilled in the art.

SUMMARY OF THE INVENTION

Accordingly, the invention has researched and developed a surface-controlled vertical alignment (SCVA) technique, and provides a liquid crystal alignment agent capable of forming a liquid crystal display element having good resistance to ultraviolet decay and no mura defect, a liquid crystal alignment film formed by the liquid crystal alignment agent, and a liquid crystal display element having the liquid crystal alignment film.

The invention provides a liquid crystal alignment agent including a polymer (A), a polysiloxane (B), a photopolymerizable compound (C), and a solvent (D). The polymer (A) is obtained by reacting a first mixture. The first mixture includes a tetracarboxylic dianhydride component (a1) and a diamine component (a2).

The polysiloxane (B) is obtained by reacting a polysiloxane compound and a carboxylic acid compound (b4) having a $C_4$ to $C_{50}$ long chain. The polysiloxane compound is obtained by reacting a second mixture, wherein the second mixture includes a silane compound (b1) containing a polymerizable unsaturated group and a silane compound (b2) containing an epoxy group. The polymerizable unsaturated group contained in the silane compound (b1) containing a polymerizable unsaturated group includes a group represented by formula (1-1), a group represented by formula (1-2), or a combination of the two.

Specifically, the group represented by formula (1-1) is as shown below.

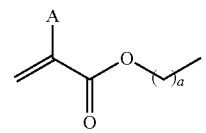

formula (1-1)

In formula (1-1), A represents a hydrogen atom or a methyl group; a represents an integer of 1 to 3.

Moreover, the group represented by formula (1-2) is as shown below.

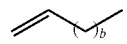

formula (1-2)

In formula (1-2), b represents an integer of 0 or 1.

In an embodiment of the invention, the group containing an epoxy group contained in the silane compound (b2) containing an epoxy group includes at least one of a group represented by formula (2-1), a group represented by formula (2-2), and a group represented by formula (2-3).

Specifically, the group represented by formula (2-1) is as shown below.

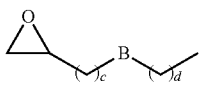

formula (2-1)

In formula (2-1), B represents a hydrogen atom or a single bond; c represents an integer of 1 to 3; d represents an integer of 0 to 6, wherein when d represents 0, B is a single bond.

Moreover, the group represented by formula (2-2) is as shown below.

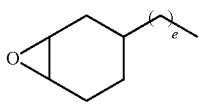

formula (2-2)

In formula (2-2), e represents an integer of 0 to 6.

The group represented by formula (2-3) is as shown below.

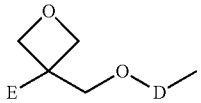

formula (2-3)

In formula (2-3), D represents a $C_2$ to $C_6$ alkylene group; E represents a hydrogen atom or a $C_1$ to $C_6$ alkyl group.

In an embodiment of the invention, the carboxylic acid compound (b4) has a $C_6$ to $C_{50}$ long chain.

In an embodiment of the invention, the photopolymerizable compound (C) is a compound represented by formula (3).

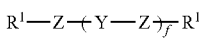

formula (3)

In formula (3), $R_1$ each independently represents a polymerizable functional group represented by formula (3-1) to formula (3-5), a hydrogen atom, a halogen atom, —CN, —CF$_3$, —CF$_2$H, —CFH$_2$, —OCF$_3$, —OCF$_2$H, —N═C═O, —N═C═S, or a $C_1$ to $C_{20}$ alkyl group, wherein any —CH$_2$— in the alkyl group may be substituted by —O—, —S—, —SO$_2$—, —CO—, —COO—, —OCO—, —CH═CH—, —CF═CF—, or —C≡C—, and in the hydrogen atom-containing functional group, any hydrogen atom may be substituted by a halogen atom or —CN; at least one $R_1$ is a polymerizable functional group represented by formula (3-1) to formula (3-5); Y independently represents a divalent group of a $C_3$ to $C_{20}$ saturated or unsaturated independent ring, condensed ring, or Spiro ring, wherein in the ring, any —CH$_2$— may be substituted by —O—, any —CH═ may be substituted by —N═, any —H may be substituted by a halogen atom, —CN, —NO$_2$, —NC, —N═C═O, —N═C═S, a silyl group substituted by 1 to 3 $C_1$ to $C_4$ alkyl groups or phenyl groups, a $C_1$ to $C_{10}$ straight-chain alkyl group, a $C_1$ to $C_{10}$ branched-chain alkyl group, or a $C_1$ to $C_{10}$ haloalkyl group, and in the alkyl group, any —CH$_2$— may be substituted by —O—, —CO—, —COO—, —OCO—, —OCOO—, —CH═CH—, or —C≡C—; Z each independently represents a single bond or a $C_1$ to $C_{20}$ alkylene group, wherein in the alkylene group, any —CH$_2$— may be substituted by —O—, —S—, —SO$_2$—, —CO—, —COO—, —OCO—, —OCOO—, —CH═CH—, —CF═CF—, —CH═N—, —N═CH—, —N═N—,

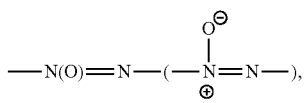

or —C≡C—, and any —H may be substituted by a halogen atom, a $C_1$ to $C_{10}$ alkyl group, or a $C_1$ to $C_{10}$ haloalkyl group; f represents an integer of 1 to 6, wherein when f is an integer of 2 to 6, a plurality of —Y—Z— are the same or different.

The polymerizable functional groups represented by formula (3-1) to formula (3-5) are as shown below.

formula (3-1)

formula (3-2)

formula (3-3)

formula (3-4)

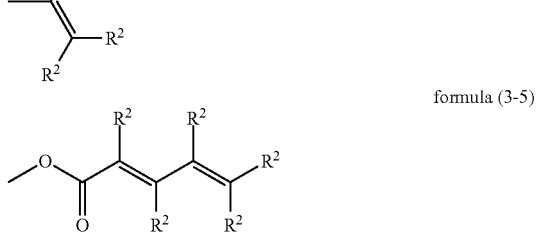

formula (3-5)

In formula (3-1) to formula (3-5), $R^2$ represents a hydrogen atom, a halogen atom, —CF$_3$, or a $C_1$ to $C_5$ alkyl group.

In an embodiment of the invention, at least one $R^1$ of the photopolymerizable compound (C) is the polymerizable functional group represented by formula (3-1) to formula (3-3).

In an embodiment of the invention, in the photopolymerizable compound (C), Y each independently represents a divalent group of 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, bicyclo[3.1.0]hexane-3,6-diyl, or triptycene-1,4-diyl; in the ring, any —CH$_2$— may be substituted by —O—, any —CH═ may be substituted by —N═, any —H may be substituted by a halogen atom, —CN, —NO$_2$, —NC, —N=C=O, —N=C=S, a silyl group substituted by one to three C$_1$ to C$_4$ alkyl groups or phenyl groups (that is, a group formed by substituting one to three hydrogen atoms of a silyl group by a C$_1$ to C$_4$ alkyl group or phenyl group), a C$_1$ to C$_{10}$ straight-chain alkyl group or branched-chain alkyl group, or a C$_1$ to C$_{10}$ haloalkyl group; and in the alkyl group, any —CH$_2$— may be substituted by —O—, —CO—, —COO—, —OCO—, —OCOO—, —CH=CH—, or —C≡C—.

In an embodiment of the invention, Y each independently represents at least one selected from the group consisting of functional groups represented by formula (3-6) to formula (3-30).

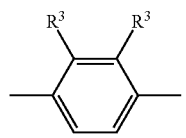

formula (3-6)

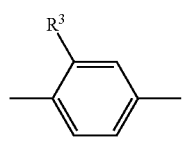

formula (3-7)

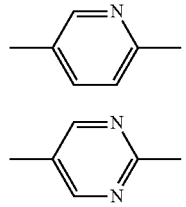

formula (3-8)

formula (3-9)

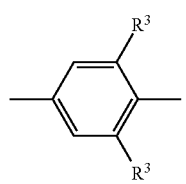

formula (3-10)

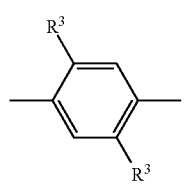

formula (3-11)

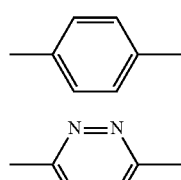

formula (3-12)

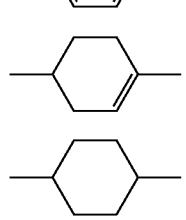

formula (3-13)

formula (3-14)

formula (3-15)

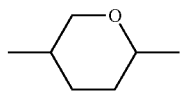

formula (3-16)

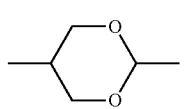

formula (3-17)

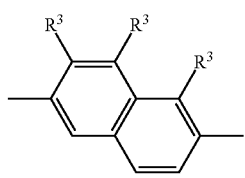

formula (3-18)

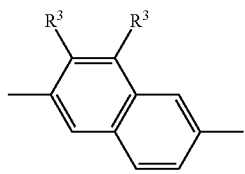

formula (3-19)

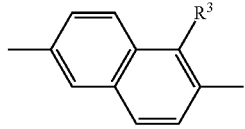

formula (3-20)

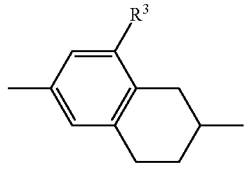

formula (3-21)

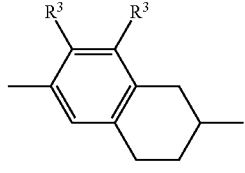

formula (3-22)

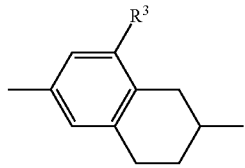

formula (3-23)

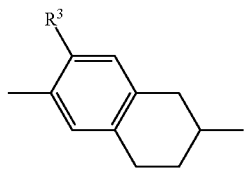

formula (3-24)

formula (3-25)

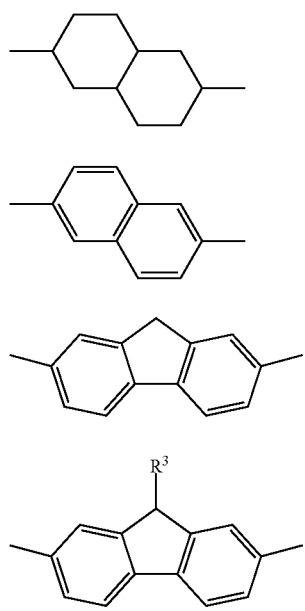

formula (3-26)

formula (3-27)

formula (3-28)

formula (3-29)

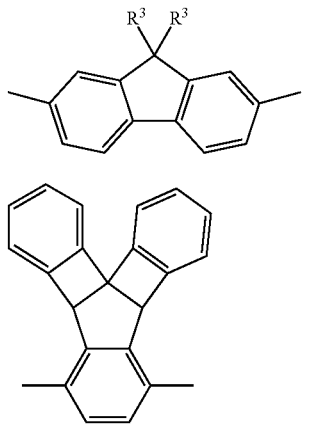

formula (3-30)

In formula (3-6) to formula (3-30), $R^3$ represents a halogen atom, a $C_1$ to $C_3$ alkyl group, a $C_1$ to $C_3$ alkoxy group, or a $C_1$ to $C_3$ haloalkyl group.

In an embodiment of the invention, the photopolymerizable compound (C) is at least one selected from the group consisting of compounds represented by formula (3-31) to formula (3-42).

formula (3-31)

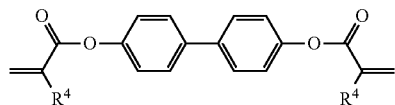

formula (3-32)

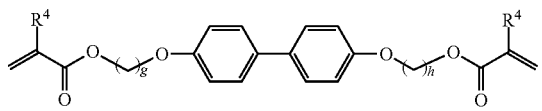

formula (3-33)

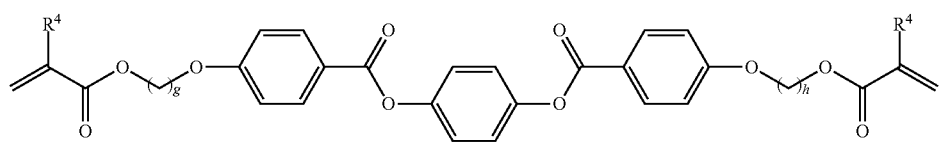

formula (3-34)

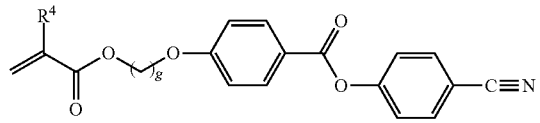

formual (3-35)

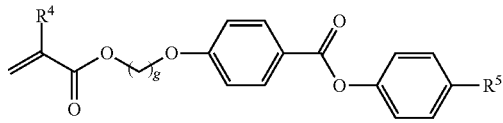

formula (3-36)

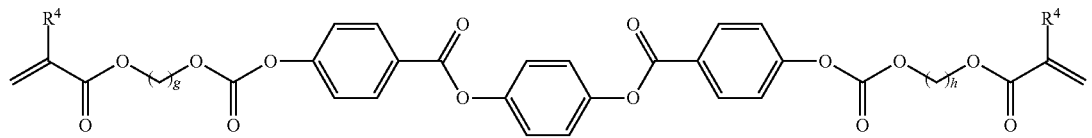

formula (3-37)

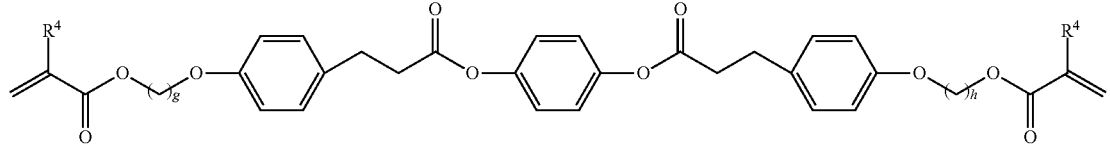

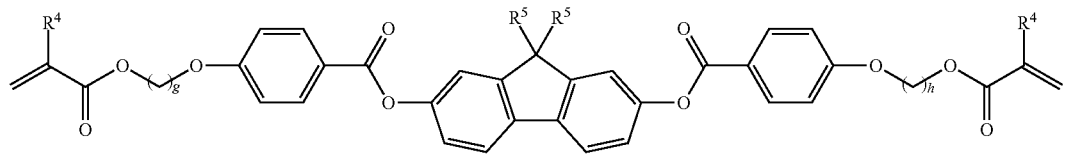

formula (3-38)

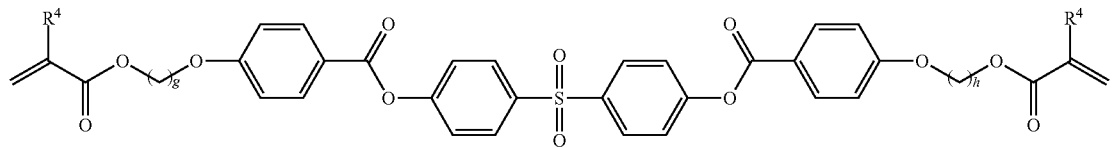

formula (3-39)

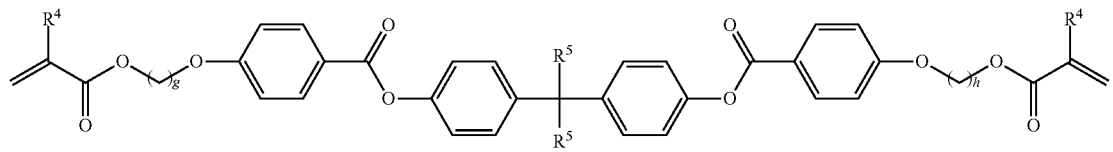

formula (3-40)

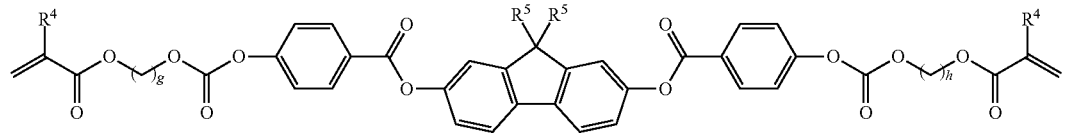

formula (3-41)

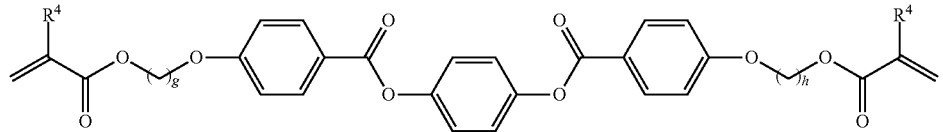

formula (3-42)

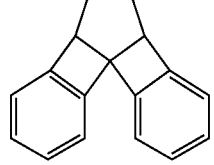

In formula (3-31) to formula (3-42), $R^4$ each independently represents a hydrogen atom or a methyl group; $R^5$ each independently represents a hydrogen atom, a halogen atom, a methyl group, $-CF_3$, $-OCH_3$, a phenyl group, or a $C_6$ to $C_{15}$ saturated or unsaturated hydrocarbon ring formed by two $R^5$ on the same carbon atom; g and h each independently represent an integer of 1 to 20.

In an embodiment of the invention, the imidization ratio of the polymer (A) is 30% to 90%.

In an embodiment of the invention, based on 100 parts by weight of the polymer (A), the usage amount of the polysiloxane (B) is 1 part by weight to 25 parts by weight; the usage amount of the photopolymerizable compound (C) is 1 part by weight to 35 parts by weight; the usage amount of the solvent (D) is 800 parts by weight to 4000 parts by weight.

The invention further provides a liquid crystal alignment film. The liquid crystal alignment film is formed by the above liquid crystal alignment agent.

The invention further provides a liquid crystal display element. The liquid crystal display element includes the above liquid crystal alignment film.

Based on the above, in the SCVA-type liquid crystal alignment agent of the invention, in addition to containing a polymer and a solvent, a photopolymerizable compound is further added in the liquid crystal alignment agent. As a result, the issue of impurity contamination of a liquid crystal layer does not occur. More specifically, the SCVA-type liquid crystal alignment agent of the invention contains both a polysiloxane having a specific structure and a photopolymerizable compound, such that the resistance to ultraviolet decay of the liquid crystal display element is good, and the liquid crystal display element does not have the issue of mura defect. As a result, the liquid crystal alignment agent of the invention is suitable for the manufacture of a liquid crystal alignment film and a liquid crystal display element.

To make the above features and advantages of the invention more comprehensible, several embodiments are described in detail as follows.

DESCRIPTION OF THE EMBODIMENTS

<Liquid Crystal Alignment Agent>

The invention provides a liquid crystal alignment agent including a polymer (A), a polysiloxane (B), a photopolymerizable compound (C), and a solvent (D). Moreover, the liquid crystal alignment agent can further include an additive (E) if needed.

In the following, each component of the liquid crystal alignment agent of the invention is described in detail.

It should be mentioned that, in the following, (meth) acrylic acid represents acrylic acid and/or methacrylic acid, and (meth)acrylate represents acrylate and/or methacrylate. Similarly, (meth)acryloyl group represents acryloyl group and/or methacryloyl group.

Polymer (A)

The polymer (A) is obtained by reacting a first mixture. The first mixture includes a tetracarboxylic dianhydride component (a1) and a diamine component (a2).

Specifically, the polymer (A) includes a polyamic acid, a polyimide, a polyamic acid-polyimide block copolymer, or a combination of the polymers. In particular, the polyimide-based block copolymer includes a polyamic acid block copolymer, a polyimide block copolymer, a polyamic acid-polyimide block copolymer, or a combination of the polymers. The polyamic acid polymer, the polyimide polymer, and the polyamic acid-polyimide block copolymer can all be obtained by reacting a first mixture of the tetracarboxylic dianhydride component (a1) and the diamine component (a2).

Tetracarboxylic Dianhydride Component (a1)

The tetracarboxylic dianhydride component (a1) includes an aliphatic tetracarboxylic dianhydride compound, an alicyclic tetracarboxylic dianhydride compound, an aromatic tetracarboxylic dianhydride compound, at least one of the tetracarboxylic dianhydride compounds represented by formula (I-1) to formula (I-6), or a combination of the compounds.

Specific examples of the aliphatic tetracarboxylic dianhydride compound, the alicyclic tetracarboxylic dianhydride compound, and the aromatic tetracarboxylic dianhydride compound are listed below. However, the invention is not limited to the specific examples.

Specific examples of the aliphatic tetracarboxylic dianhydride compound can include, but are not limited to, ethane tetracarboxylic dianhydride, butane tetracarboxylic dianhydride, or a combination of the compounds.

Specific examples of the alicyclic tetracarboxylic dianhydride compound can include, but are not limited to, 2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl-cycloheptyl-1,5-diene-1,2,5,6-tetracarboxylic dianhydride, 2,3,5-tricarboxycyclopentylacetic dianhydride, bicyclo[2.2.2]-oct-7-ene-2,3,5,6-tetracarboxylic dianhydride, or a combination of the compounds.

Specific examples of the aromatic tetracarboxylic dianhydride compound can include, but are not limited to, an aromatic tetracarboxylic dianhydride compound such as 3,4-dicarboxy-1,2,3,4-tetrahydronaphthalene-1-succinic dianhydride, pyromellitic dianhydride, 3,3',4,4'-benzophenone tetracarboxylic dianhydride, 3',3,4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-diphenyl ethane tetracarboxylic dianhydride, 3,3',4,4'-dimethyl diphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxy phenoxy)diphenylsulfide dianhydride, 4,4'-bis(3,4-dicarboxy phenoxy)diphenylsulfone dianhydride, 4,4'-bis(3,4-dicarboxy phenoxy)diphenylpropane dianhydride, 3,3',4,4'-perfluoroisopropylidene diphenyl dicarboxylic dianhydride, 3,3',4,4'-diphenyl tetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofuran tetracarboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-5-methyl-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl)naphtho[1,2-c]furan-1,3-dione, 1,3,3a,4,5,9b-hexahydro-7-methyl-5-(tetrahydro-2,5-dioxo-3-furanyl) naphtho [1,2-c]furan-1,3-dione, 1,3,3a,4,5,9b-hexahydro-7-ethyl-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, 1,3,3a,4,5,9b-hexahydro-8-ethyl-5-(tetrahydro-2,5-dioxo-3-furanyl)naphtho[1,2-c]furan-1,3-dione, 1,3,3a,4,5,9b-hexahydro-5,8-dimethyl-5-(tetrahydro-2,5-dioxo-3-furanyl)naphtho[1,2-c]furan-1,3-dione, 5-(2,5-dioxotetrahydrofural)-3-methyl-3-cyclohexene-1,2-dicarboxylic dianhydride, or a combination of the compounds.

The tetracarboxylic dianhydride compounds represented by formula (I-1) to formula (I-6) are as shown below.

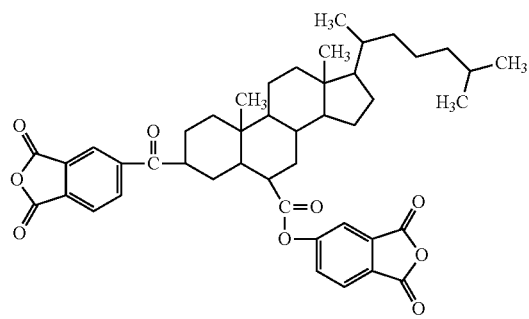

formula (I-1)

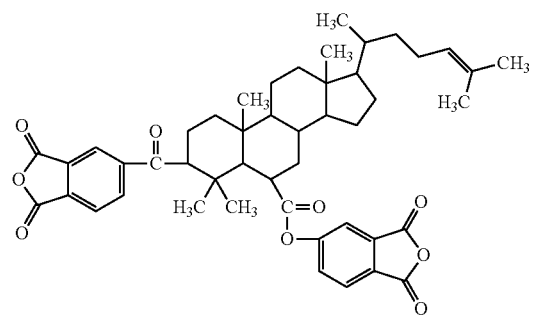

formula (I-2)

formula (I-3)

formula (I-4)

formula (I-5)

In formula (I-5), $A^1$ represents a divalent group containing an aromatic ring; r represents an integer of 1 to 2; and $A^2$ and $A^3$ can be the same or different, and can each independently represent a hydrogen atom or an alkyl group. Specific examples of the tetracarboxylic dianhydride compound represented by formula (I-5) include at least one of the compounds represented by formula (I-5-1) to formula (I-5-3).

formula (I-5-1)

formula (I-5-2)

formula (I-5-3)

formula (I-6)

In formula (I-6), $A^4$ represents a divalent group containing an aromatic ring; $A^5$ and $A^6$ can be the same or different, and each independently represent a hydrogen atom or an alkyl group. The tetracarboxylic dianhydride compound represented by formula (I-6) is preferably a compound represented by formula (I-6-1).

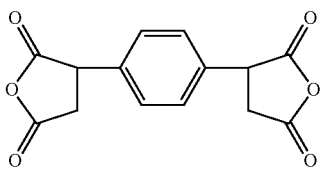

formula (I-6-1)

The tetracarboxylic dianhydride component (a1) can be used alone or in multiple combinations.

Specific examples of the tetracarboxylic dianhydride component (a1) preferably include 1,2,3,4-cyclobutane tetracarboxylic dianhydride, 1,2,3,4-cyclopentane tetracarboxylic dianhydride, 2,3,5-tricarboxycyclopentylacetic acid dianhydride, 1,2,4,5-cyclohexane tetracarboxylic dianhydride, 3,4-dicarboxy-1,2,3,4-tetrahydronaphthalene-1-succinic dianhydride, pyromellitic dianhydride, 3,3',4,4'-benzophenone tetracarboxylic dianhydride, and 3',3,4,4'-diphenylsulfone tetracarboxylic dianhydride, or a combination of the compounds.

Based on a total number of moles of 100 moles of the diamine component (a2), the usage amount of the tetracarboxylic dianhydride component (a1) preferably ranges from 20 moles to 200 moles; and the usage amount of the tetracarboxylic dianhydride component (a1) more preferably ranges from 30 moles to 120 moles.

Diamine Component (a2)

The diamine component (a2) includes an aliphatic diamine compound, an alicyclic diamine compound, an aromatic diamine compound, diamine compounds having structural formula (II-1) to formula (II-30), or a combination thereof.

Specific examples of the aliphatic diamine compound include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, or a combination of the compounds.

Specific examples of the alicyclic diamine compound include, but are not limited to, 4,4'-diaminodicyclohexylmethane, 4,4'-diamino-3,3'-dimethyldicyclohexylamine, 1,3-diaminocyclohexane, 1,4-diaminocyclohexane, isophorone diamine, tetrahydrodicyclopentadiene diamine, tricyclo[6.2.1.0$^{2,7}$]-undecenedimethyldiamine, 4,4'-methylene bis(cyclohexylamine), or a combination of the compounds.

Specific examples of the aromatic diamine compound include, but are not limited to, 4,4'-diaminodiphenylmethane, 4,4'-diaminodiphenylethane, 4,4'-diaminodiphenylsulfone, 4,4'-diaminobenzoylaniline, 4,4'-diaminodiphenylether, 3,4'-diaminodiphenylether, 1,5-diaminonaphthalene, 5-amino-1-(4'-aminophenyl)-1,3,3-trimethylindene, 6-amino-1-(4'-aminophenyl)-1,3,3-trimethylindene, hexahydro-4,7-methanoindanylenedimethylenediamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl) anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenylene isopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]-octafluorobiphenyl, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, or a combination of the compounds.

The diamine compounds having structural formula (II-1) to formula (II-30) are as shown below.

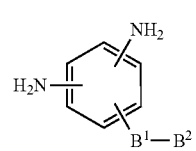

formula (II-1)

In formula (II-1), B$^1$ represents

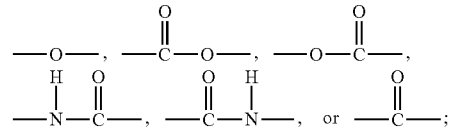

and B$^2$ represents a group having a steroid skeleton, a trifluoromethyl group, a fluorine atom, a $C_2$ to $C_{30}$ alkyl group, or a monovalent group of a cyclic structure containing a nitrogen atom derived from, for instance, pyridine, pyrimidine, triazine, piperidine, or piperazine.

Specific examples of the compound represented by formula (II-1) include, but are not limited to, 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene, at least one of the compounds represented by formula (II-1-1) to formula (II-1-6), or a combination of the compounds.

The compounds represented by formula (II-1-1) to formula (II-1-6) are as shown below.

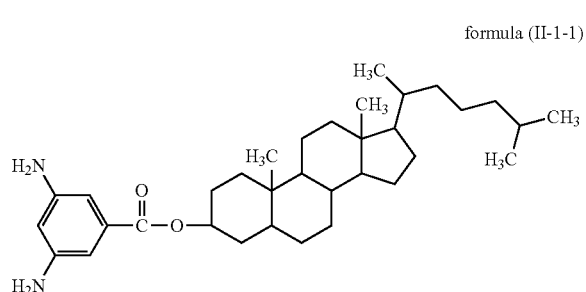

formula (II-1-1)

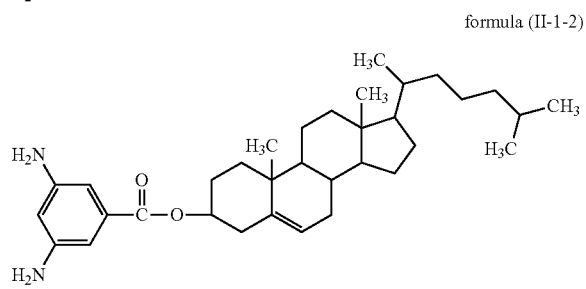

formula (II-1-2)

-continued

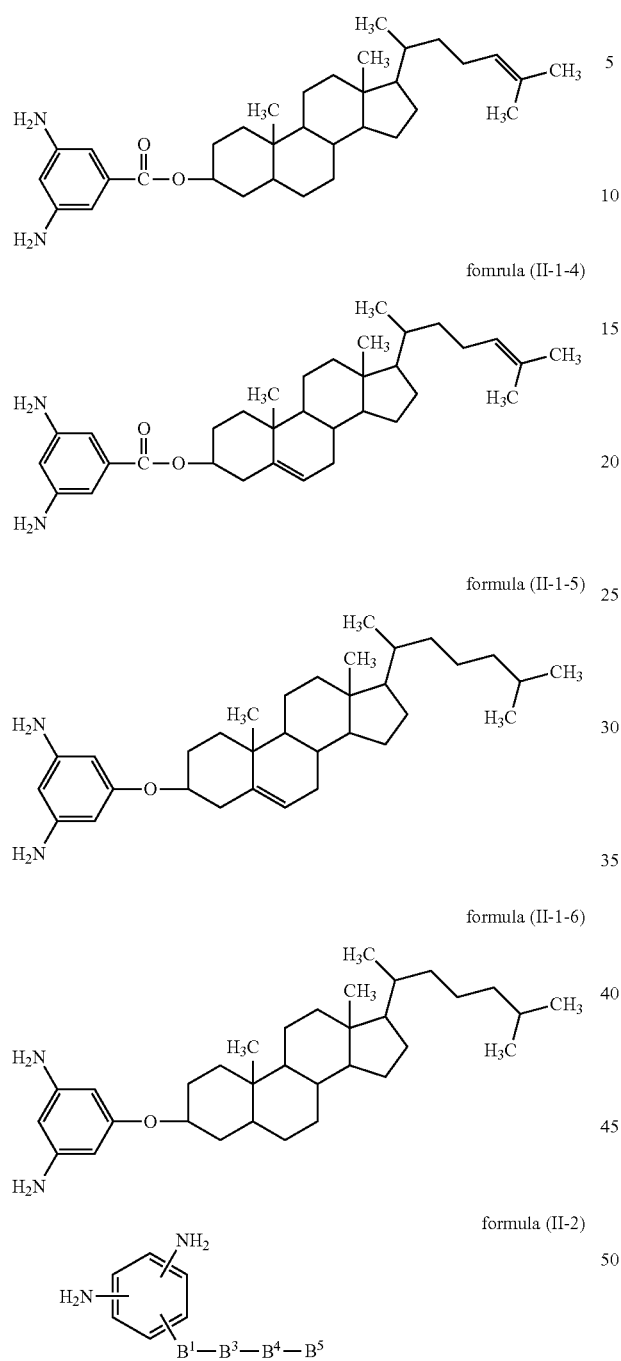

formula (II-1-3)

formula (II-1-4)

formula (II-1-5)

formula (II-1-6)

formula (II-2)

In formula (II-2), $B^1$ is the same as the $B^1$ in formula (II-1), $B^3$ and $B^4$ each independently represent a divalent aliphatic ring, a divalent aromatic ring, or a divalent heterocyclic group; $B^5$ represents a $C_3$ to $C_{18}$ alkyl group, a $C_3$ to $C_{18}$ alkoxy group, a $C_1$ to $C_5$ fluoroalkyl group, a $C_1$ to $C_5$ fluoroalkyloxy group, a cyano group, or a halogen atom.

Specific examples of the compound represented by formula (II-2) include at least one of the compounds represented by formula (II-2-1) to formula (II-2-13). Specifically, the compounds represented by formula (II-2-1) to formula (II-2-13) are as follows.

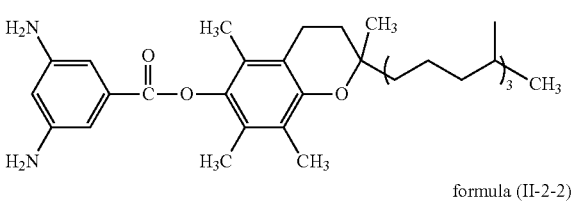

formula (II-2-1)

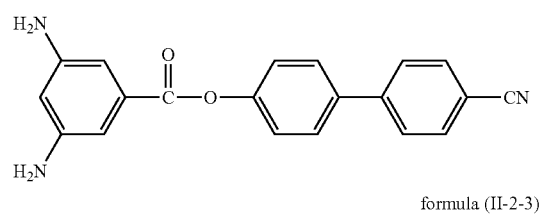

formula (II-2-2)

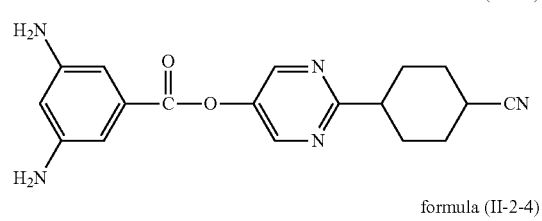

formula (II-2-3)

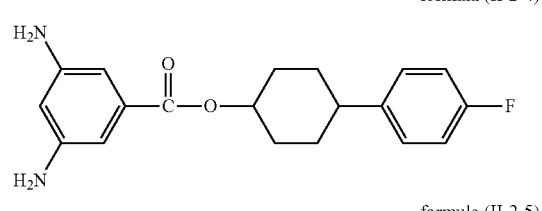

formula (II-2-4)

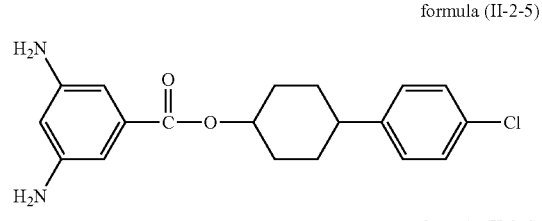

formula (II-2-5)

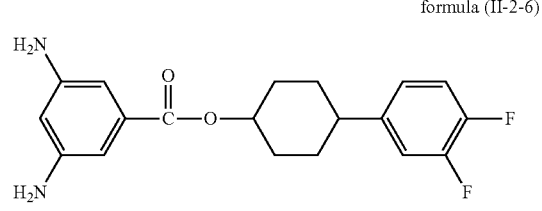

formula (II-2-6)

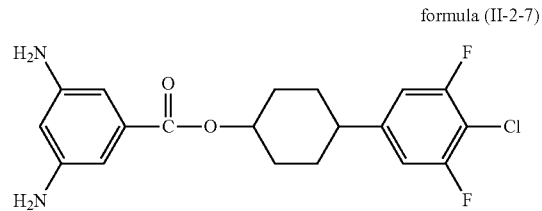

formula (II-2-7)

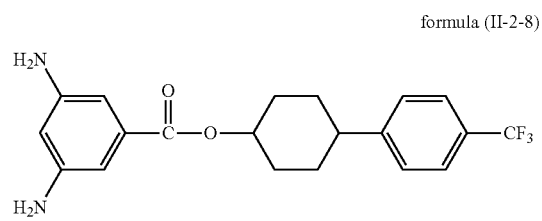

formula (II-2-8)

-continued formula (II-2-9)
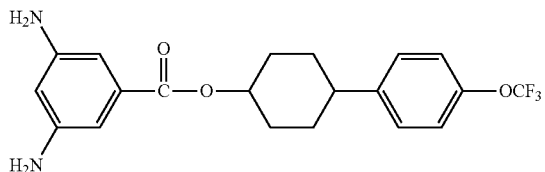

formula (II-2-10)
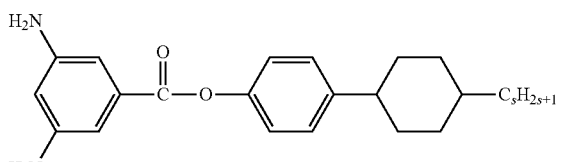

formula (II-2-11)
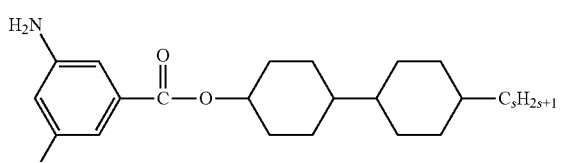

formula (II-2-12)
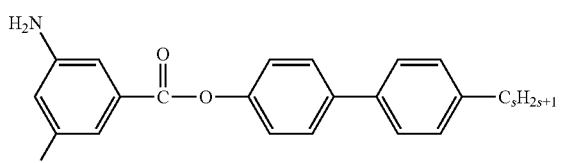

formula (II-2-13)
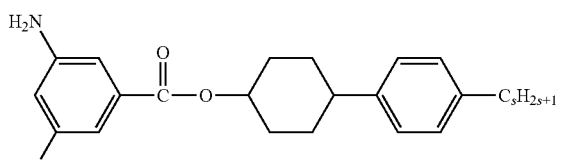

In formula (II-2-10) to formula (II-2-13), s represents an integer of 3 to 12.

formula (II-3)
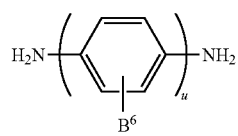

In formula (II-3), $B^6$ each independently represents a hydrogen atom, a $C_1$ to $C_5$ acyl group, a $C_1$ to $C_5$ alkyl group, a $C_1$ to $C_5$ alkoxy group, or a halogen atom, and $B^6$ in each repeating unit can be the same or different; and u represents an integer of 1 to 3.

Specific examples of the compound represented by formula (II-3) include: when u is 1: p-diaminobenzene, m-diaminobenzene, o-diaminobenzene, or 2,5-diaminotoluene . . . etc.; when u is 2: 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, or 4,4'-diamino-2,2'-bis(trifluoromethyl) biphenyl . . . etc.; or when u is 3: 1,4-bis(4'-aminophenyl)benzene . . . etc.

Specific examples of the compound represented by formula (II-3) preferably include p-diaminobenzene, 2,5-diaminotoluene, 4,4'-diaminobiphenyl, 3,3'-dimethoxy-4,4'-diaminobiphenyl, 1,4-bis(4'-aminophenyl)benzene, or a combination of the compounds.

formula (II-4)
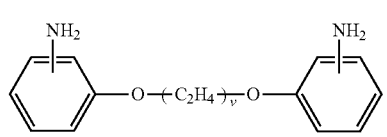

In formula (II-4), v represents an integer of 2 to 12.

formula (II-5)
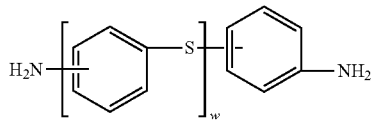

In formula (II-5), w represents an integer of 1 to 5. The compound represented by formula (II-5) is preferably 4,4'-diamino-diphenyl sulfide.

formula (II-6)
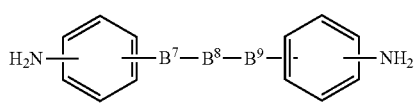

In formula (II-6), $B^7$ and $B^9$ each independently represent a divalent organic group, and $B^7$ and $B^9$ can be the same or different; $B^8$ represents a divalent group of a cyclic structure containing a nitrogen atom derived from, for instance, pyridine, pyrimidine, triazine, piperidine, or piperazine.

formula (II-7)
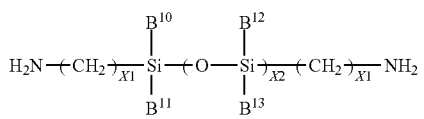

In formula (II-7), $B^{10}$, $B^{11}$, $B^{12}$ and $B^{13}$ each independently represent a $C_1$ to $C_{12}$ hydrocarbon group, and $B^{10}$, $B^{11}$, $B^{12}$, and $B^{13}$ can be the same or different; X1 each independently represents an integer of 1 to 3; and X2 represents an integer of 1 to 20.

formula (II-8)
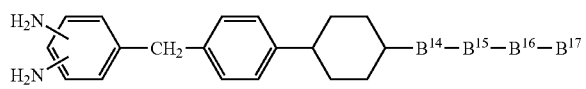

In formula (II-8), $B^{14}$ represents an oxygen atom or a cyclohexylene group; $B^{15}$ represents a methylene group (—CH$_2$); B$^{16}$ represents a phenylene group or a cyclohexylene group; and B$^{17}$ represents a hydrogen atom or a heptyl group.

Specific examples of the compound represented by formula (II-8) include a compound represented by formula (II-8-1), a compound represented by formula (II-8-2), or a combination of the compounds.

formula (II-8-1)

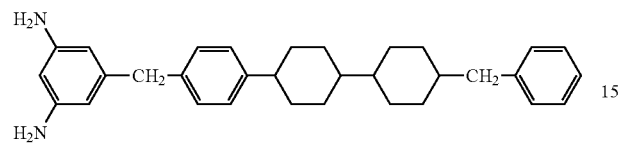

formula (II-8-2)

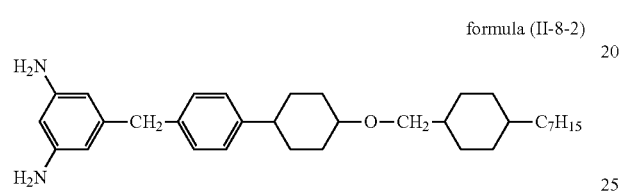

The compounds represented by formula (II-9) to formula (II-30) are as shown below.

formula (II-9)

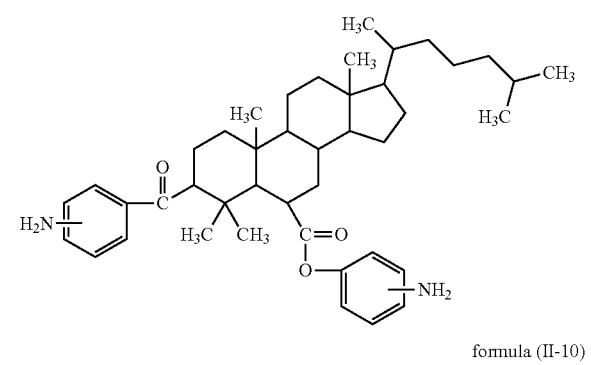

formula (II-10)

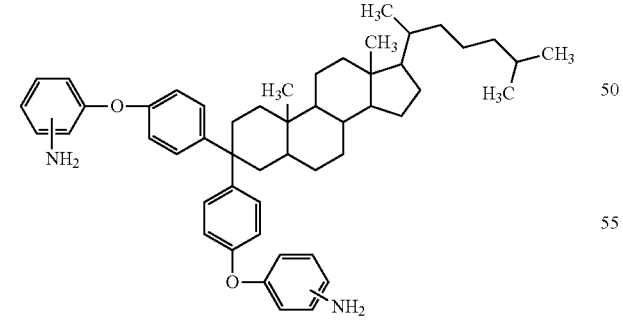

formula (II-11)

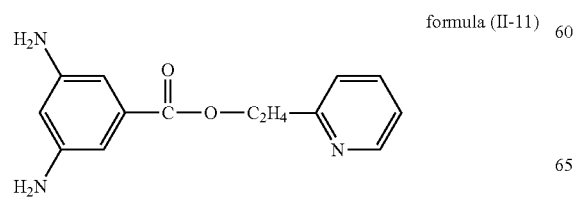

formula (II-12)

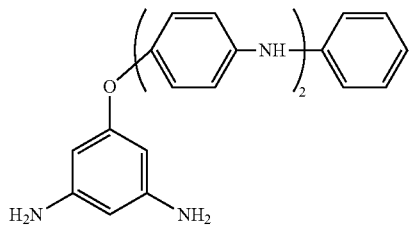

formula (II-13)

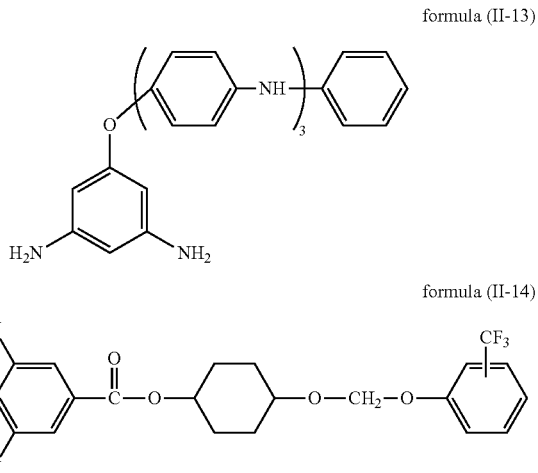

formula (II-14)

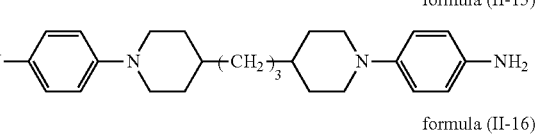

formula (II-15)

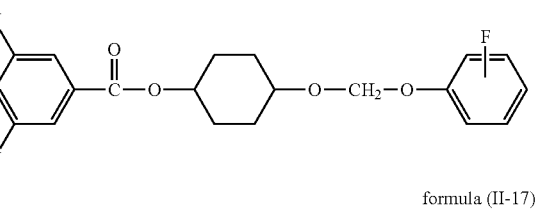

formula (II-16)

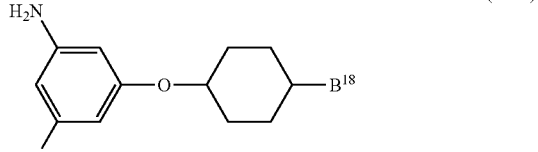

formula (II-17)

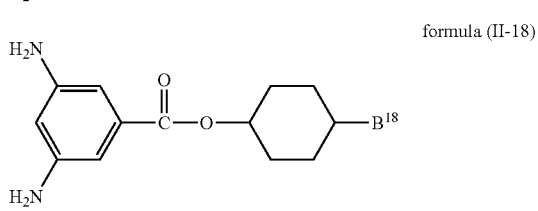

formula (II-18)

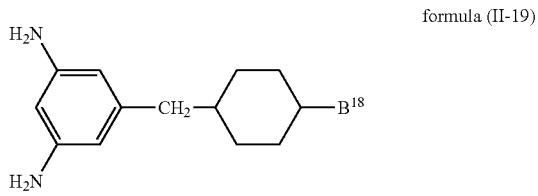

formula (II-19)

formula (II-20)
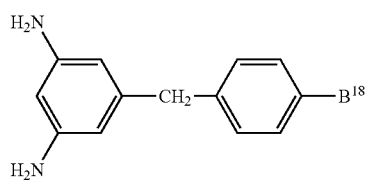

formula (II-21)
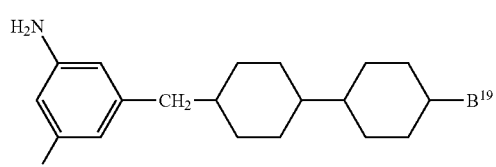

formula (II-22)
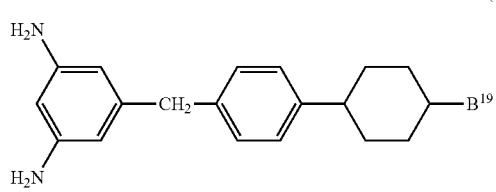

formula (II-23)
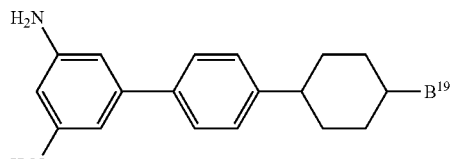

formula (II-24)
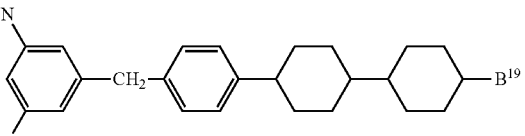

formula (II-25)
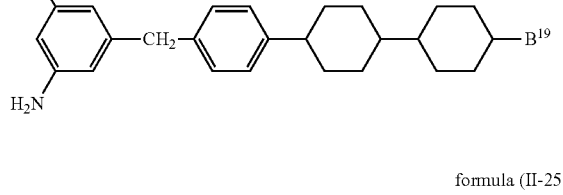

formula (II-26)
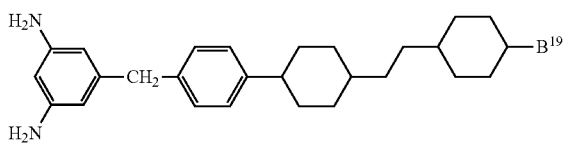

formula (II-27)
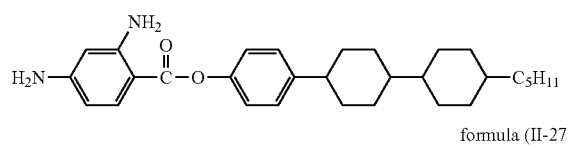

formula (II-28)
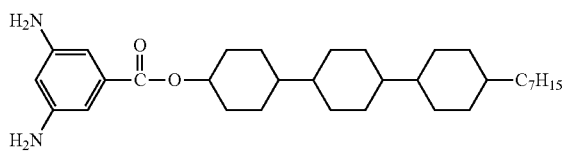

formula (II-29)
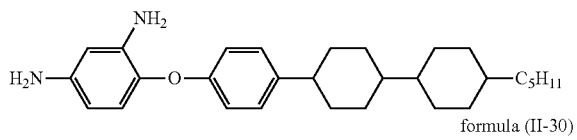

formula (II-30)
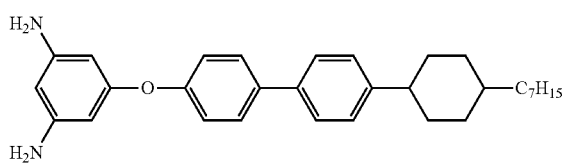

In formula (II-17) to formula (II-25), $B^{18}$ preferably represents a $C_1$ to $C_{10}$ alkyl group or a $C_1$ to $C_{10}$ alkoxy group; $B^{19}$ preferably represents a hydrogen atom, a $C_1$ to $C_{10}$ alkyl group, or a $C_1$ to $C_{10}$ alkoxy group.

The diamine compound (a2) can be used alone or in multiple combinations.

Specific examples of the diamine compound (a2) preferably include, but are not limited to, 1,2-diaminoethane, 4,4'-diaminodicyclohexylmethane, 4,4'-diaminodiphenylmethane, 4,4'-diaminodiphenyl ether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, 2,4-diaminophenyl ethyl formate, a compound represented by formula (II-1-1), a compound represented by formula (II-1-2), a compound represented by formula (II-1-5), a compound represented by formula (II-2-1), a compound represented by formula (II-2-11), p-diaminobenzene, m-diaminobenzene, o-diaminobenzene, a compound represented by formula (II-8-1), compounds represented by formula (II-26) to formula (II-30), or a combination of the compounds.

When the polymer (A) in the liquid crystal alignment agent contains at least one of the diamine compounds (a2) represented by formula (II-1) and formula (II-2), the issue of mura defect of the liquid crystal display element can be further alleviated.

When the polymer (A) in the liquid crystal alignment agent contains at least one of the diamine compounds (a2) represented by formula (II-26) to formula (II-30), resistance to ultraviolet decay of the liquid crystal display element can be further increased.

Method of Preparing Polymer (A)

The polymer (A) can include at least one of polyamic acid and polyimide. Moreover, the polymer (A) can further include a polyimide-based block copolymer. The preparation method of each of the various polymers above is further described below.

Method of Preparing Polyamic Acid

The method of preparing the polyamic acid includes first dissolving a first mixture in a solvent, wherein the first mixture includes the tetracarboxylic dianhydride component (a1) and the diamine component (a2). A polycondensation reaction is then performed at a temperature of 0° C. to 100° C. After reacting for 1 hour to 24 hours, the reaction solution is distilled under reduced pressure with an evaporator to obtain the polyamic acid. Alternatively, the reaction solution is poured into a large amount of a poor solvent to obtain a precipitate. Then, the precipitate is dried with a method of drying under reduced pressure to obtain the polyamic acid.

The solvent used in the polycondensation reaction can be the same or different as the solvent in the liquid crystal alignment agent below, and the solvent used in the polycondensation reaction is not particularly limited, provided the solvent can dissolve the reactants and the products. The solvent preferably includes, but is not limited to (1) an aprotic polar solvent such as N-methyl-2-pyrrolidinone (NMP), N,N-dimethyl acetamide, N,N-dimethyl formamide, dimethyl sulfoxide, γ-butyrolactone, tetramethylurea, or hexamethylphosphor amide; or (2) a phenolic solvent such as m-cresol, xylenol, phenol, or halogenated phenol. Based on a total usage amount of 100 parts by weight of the first mixture, the usage amount of the solvent used in the polycondensation reaction is preferably 200 parts by weight to 2000 parts by weight, more preferably 300 parts by weight to 1800 parts by weight.

It should be mentioned that, in the polycondensation reaction, the solvent can be used with a suitable amount of a poor solvent, wherein the poor solvent does not cause precipitation of the polyamic acid. The poor solvent can be used alone or in multiple combinations, and includes, but is not limited to (1) an alcohol such as methanol, ethanol, isopropanol, cyclohexanol, ethylene glycol, propylene glycol, 1,4-butanediol, or triglycol; (2) a ketone such as acetone, methyl ethyl ketone, methyl isobutyl ketone, or cyclohexanone; (3) an ester such as methyl acetate, ethyl acetate, butyl acetate, diethyl oxalate, diethyl malonate, or ethylene glycol monoethyl ether acetate; (4) an ether such as diethyl ether, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, or diethylene glycol dimethyl ether; (5) a halogenated hydrocarbon such as dichloromethane, 1,2-dichloroethane, 1,4-dichlorobutane, trichloroethane, chlorobenzene, or o-dichlorobenzene; or (6) a hydrocarbon such as tetrahydrofuran, hexane, heptane, octane, benzene, toluene, or xylene, or any combination of the solvents. Based on a usage amount of 100 parts by weight of the diamine component (a2), the usage amount of the poor solvent is preferably 0 parts by weight to 60 parts by weight, more preferably 0 parts by weight to 50 parts by weight.

Method of Preparing Polyimide

The method of preparing the polyimide includes heating the polyamic acid obtained by the above method of preparing polyamic acid under the existence of a dehydrating agent and a catalyst. During the heating process, the auric acid functional group in the polyamic acid can be converted into an imide functional group through a dehydration ring-closure reaction (i.e., imidization).

The solvent used in the dehydration ring-closure reaction can be the same as the solvent (D) in the liquid crystal alignment agent and is therefore not repeated herein. Based on a usage amount of 100 parts by weight of the polyamic acid, the usage amount of the solvent used in the dehydration ring-closure reaction is preferably 200 parts by weight to 2000 parts by weight, more preferably 300 parts by weight to 1800 parts by weight.

To obtain a preferable degree of imidization of the polyamic acid, the operating temperature of the dehydration ring-closure reaction is preferably 40° C. to 200° C., more preferably 40° C. to 150° C. If the operating temperature of the dehydration ring-closure reaction is less than 40° C., then the imidization reaction is incomplete, and the degree of imidization of the polyamic acid is thereby reduced. However, if the operating temperature of the dehydration ring-closure reaction is higher than 200° C., then the weight-average molecular weight of the obtained polyimide is lower.

The dehydrating agent used in the dehydration ring-closure reaction can be selected from an anhydride compound, and specific examples thereof include, for instance, acetic anhydride, propionic anhydride, or trifluoroacetic anhydride. Based on 1 mole of the polyamic acid, the usage amount of the dehydrating agent is 0.01 moles to 20 moles. The catalyst used in the dehydration ring-closure reaction can be selected from (1) a pyridine compound such as pyridine, trimethyl pyridine, or dimethyl pyridine; or (2) a tertiary amine compound such as triethylamine. Based on a usage amount of 1 mole of the dehydrating agent, the usage amount of the catalyst can be 0.5 moles to 10 moles.

The imidization ratio of the polymer (A) can be 30% to 90%, preferably 35% to 88%, and more preferably 40% to 85%. When the imidization ratio of the polymer (A) in the liquid crystal alignment agent is within the above ranges, resistance to ultraviolet decay of the liquid crystal display element can be further increased.

Method of Preparing Polyimide-Based Block Copolymer

The polyimide-based block copolymer is selected from a polyamic acid block copolymer, a polyimide block copolymer, a polyamic acid-polyimide block copolymer, or any combination of the polymers.

The method of preparing the polyimide-based block copolymer preferably includes first dissolving a starting material in a solvent and then performing a polycondensation reaction, wherein the starting material includes at least one type of polyamic acid and/or at least one type of polyimide, and can further include a carboxylic anhydride component and a diamine component.

The carboxylic anhydride component and the diamine component in the starting material can be the same as the tetracarboxylic dianhydride component (a1) and the diamine component (a2) used in the method of preparing polyamic acid. Moreover, the solvent used in the polycondensation reaction can be the same as the solvent in the liquid crystal alignment agent below and is not repeated herein.

Based on a usage amount of 100 parts by weight of the starting material, the usage amount of the solvent used in the polycondensation reaction is preferably 200 parts by weight to 2000 parts by weight, more preferably 300 parts by weight to 1800 parts by weight. The operating temperature of the polycondensation reaction is preferably 0° C. to 200° C., more preferably 0° C. to 100° C.

The starting material preferably includes, but is not limited to (1) two polyamic acids for which the terminal groups are different and the structures are different; (2) two polyimides for which the terminal groups are different and the structures are different; (3) a polyamic acid and a polyimide for which the terminal groups are different and the structures are different; (4) a polyamic acid, a carboxylic anhydride component, and a diamine component, wherein the structure of at least one of the carboxylic anhydride component and the diamine component is different from the structures of the carboxylic anhydride component and the diamine component used to form the polyamic acid; (5) a polyimide, a carboxylic anhydride component, and a diamine component, wherein the structure of at least one of the carboxylic anhydride component and the diamine component is different from the structures of the carboxylic anhydride component and the diamine component used to form the polyimide; (6) a polyamic acid, a polyimide, a carboxylic anhydride component, and a diamine component, wherein the structure of at least one of the carboxylic anhydride component and the diamine component is different from the structures of the carboxylic anhydride component and the diamine component used to form the polyamic acid or the polyimide; (7) two polyamic acids having different structures, a carboxylic anhydride component, and a diamine component; (8) two polyimides having different structures, a carboxylic anhydride component, and a diamine component; (9) two polyamic acids having anhydride groups as terminal groups and having different structures, and a diamine component; (10) two polyamic acids having amine groups as terminal groups and having different structures, and a carboxylic anhydride component; (11) two polyimides having anhydride groups as terminal groups and having different structures, and a diamine component; or (12) two polyimides having amine groups as terminal groups and having different structures, and a carboxylic anhydride component.

Without affecting the efficacy of the invention, the polyamic acid, the polyimide, and the polyimide-based block copolymer are preferably terminal-modified polymers in which molecular weight regulation is first performed. By using the terminal-modified polymers, the coating performance of the liquid crystal alignment agent can be improved. The method of preparing the terminal-modified polymers can include adding a monofunctional compound at the same time a polycondensation reaction is performed on the polyamic acid.

Specific examples of the monofunctional compound include, but are not limited to, (1) a monoanhydride such as maleic anhydride, phthalic anhydride, itaconic anhydride, n-decyl succinic anhydride, n-dodecyl succinic anhydride, n-tetradecyl succinic anhydride, or n-hexadecyl succinic anhydride; (2) a monoamine compound such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, or n-eicosylamine; or (3) a monoisocyanate compound such as phenyl isocyanate or naphthyl isocyanate.

In the polymer (A) of the invention, the polystyrene-equivalent weight average molecular weight obtained according to gel permeation chromatography (GPC) is 2,000 to 200,000, preferably 3,000 to 100,000, and more preferably 4,000 to 50,000.

Polysiloxane (B)

The steps of preparing the polysiloxane (B) include: step (i) performing a copolycondensation reaction on a second mixture including the silane compound (b1) containing a polymerizable unsaturated group and a silane compound (b2) containing an epoxy group to obtain a polysiloxane compound; and step (ii) reacting the polysiloxane compound and the carboxylic acid compound (b4) to obtain the polysiloxane (B). Moreover, without affecting the efficacy of the invention, the second mixture can further include other silane compounds (b3).

In the following, the preparation methods of the silane compound (b1) containing a polymerizable unsaturated group, the silane compound (b2) containing an epoxy group, the other silane compounds (b3), the carboxylic acid compound (b4), and the polysiloxane (B) are described in detail.

Silane Compound (b1) Containing a Polymerizable Unsaturated Group

The polymerizable unsaturated group contained in the silane compound (b1) containing a polymerizable unsaturated group includes a group represented by formula (1-1), a group represented by formula (1-2), or a combination of the two.

Specifically, the group represented by formula (1-1) is as shown below.

formula (1-1)

In formula (1-1), A represents a hydrogen atom or a methyl group; a represents an integer of 1 to 3.

Moreover, the group represented by formula (1-2) is as shown below.

formula (1-2)

In formula (1-2), b represents an integer of 0 or 1.

Specific examples of the silane compound (b1) containing a polymerizable unsaturated group include 3-(meth)acryloxypropyl trichlorosilane, 3-(meth)acryloxypropyl trimethoxysilane, 3-(meth)acryloxypropyl triethoxysilane, 2-(meth)acryloxyethyl trichlorosilane, 2-(meth)acryloxyethyl trimethoxysilane, 2-(meth)acryloxyethyl triethoxysilane, 4-(meth)acryloxybutyl trichlorosilane, 4-(meth)acryloxybutyl trimethoxysilane, 4-(meth)acryloxybutyl triethoxysilane, vinyltrichlorosilane, vinyltrimethoxysilane, vinyltriethoxysilane, allyltrichlorosilane, allyltrimethoxysilane, allyltriethoxysilane, methylvinyldichlorosilane, divinyldichlorosilane, divinyldimethoxysilane, chlorovinyldimethylsilane, methoxyvinyldimethylsilane, or a combination of the compounds.

Specific examples of the silane compound (b1) containing a polymerizable unsaturated group preferably include 3-(meth)acryloxypropyl trichlorosilane, 3-(meth)acryloxypropyl trimethoxysilane, vinyltrichlorosilane, vinyltrimethoxysilane, allyltrimethoxysilane, or a combination of the compounds.

Based on a total usage amount of 1.0 mole of the silane compound (b1) containing a polymerizable unsaturated group, the silane compound (b2) containing an epoxy group, and the other silane compounds (b3), the usage amount of the silane compound (b1) containing a polymerizable unsaturated group is 0.2 moles to 0.5 mole, preferably 0.25 moles to 0.45 moles, and more preferably 0.3 moles to 0.4 moles.

In the silane compound of the polysiloxane (B) for polymerization, in the case that the silane compound (b1) containing a polymerizable unsaturated group is not used, the obtained liquid crystal display element has the issue of poor resistance to ultraviolet decay.

Silane Compound (b2) Containing an Epoxy Group

The group containing an epoxy group contained in the silicon compound (b2) containing an epoxy group includes at least one of a group represented by formula (2-1), a group represented by formula (2-2), and a group represented by formula (2-3).

Specifically, the group represented by formula (2-1) is as shown below.

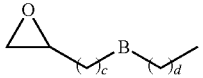
formula (2-1)

In formula (2-1), B represents a hydrogen atom or a single bond; c represents an integer of 1 to 3; d represents an integer of 0 to 6, wherein when d represents 0, B is a single bond.

Moreover, the group represented by formula (2-2) is as shown below.

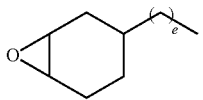
formula (2-2)

In formula (2-2), e represents an integer of 0 to 6.

The group represented by formula (2-3) is as shown below.

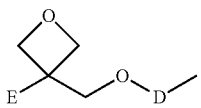
formula (2-3)

In formula (2-3), D represents a $C_2$ to $C_6$ alkylene group; E represents a hydrogen atom or a $C_1$ to $C_6$ alkyl group.

The group containing an epoxy group contained in the silane compound (b2) containing an epoxy group is, for instance, a glycidyl group, a glycidyloxy group, an epoxycyclohexyl group, or an oxetanyl group.

Specifically, the group containing an epoxy group can include at least one of the group represented by formula (2-1), the group represented by formula (2-2), and the group represented by formula (2-3).

The group containing an epoxy group preferably includes at least one of a group represented by formula (2-1-1), a group represented by formula (2-2-1), and a group represented by formula (2-3-1).

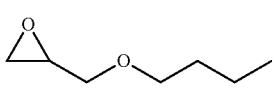
formula (2-1-1)

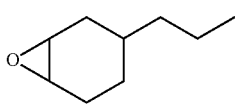
formula (2-2-1)

formula (2-3-1)

Specific examples of the silane compound (b2) containing an epoxy group include 3-(N,N-diglycidyl)aminopropyltrimethoxysilane, 3-(N-allyl-N-glycidyl)aminopropyltrimethoxysilane, 3-glycidoxypropyltrimethoxysilane 3-glycidyloxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyldimethylmethoxysilane, 3-glycidoxypropyldimethylethoxysilane, 2-glycidoxyethyltrimethoxysilane, 2-glycidoxyethyltriethoxysilane, 2-glycidoxyethylmethyldimethoxysilane, 2-glycidoxyethylmethyldiethoxysilane, 2-glycidoxyethyldimethylmethoxysilane, 2-glycidoxyethyldimethylethoxysilane, 4-glycidoxybutyltrimethoxysilane, 4-glycidoxybutyltriethoxysilane, 4-glycidoxybutylmethyldimethoxysilane, 4-glycidoxybutylmethyldiethoxysilane, 4-glycidoxybutyldimethylmethoxysilane, 4-glycidoxybutyldimethylethoxysilane, 2-(3,4-epoxycyclohexyl)ethyltrimethoxysilane, 2-(3,4-epoxycyclohexyl)ethyltriethoxy silane, 3-(3,4-epoxycyclohexyl)propyltrimethoxysilane, 3-(3,4-epoxycyclohexyl)propyl triethoxysilane, ((3-ethyl-3-oxetanyl)methoxy)propyltrimethoxysilane, ((3-ethyl-3-oxetanyl)methoxy)propyltriethoxysilane, ((3-ethyl-3-oxetanyl)methoxy)propylmethyl dimethoxysilane, ((3-ethyl-3-oxetanyl)methoxy)propyldimethylmethoxysilane, commercial products such as DMS-E01, DMS-E12, DMS-E21, EMS-32 (made by JNC), or a combination of the compounds.

Specific examples of the silane compound (b2) containing an epoxy group preferably include 3-glycidoxypropyltrimethoxysilane, 2-glycidoxyethyltrimethoxy silane, 4-glycidoxybutyltrimethoxysilane, 2-(3,4-epoxycyclohexyl)ethyltrimethoxysilane, 2-(3,4-epoxycyclohexyl)ethyltriethoxysilane, ((3-ethyl-3-oxetanyl)methoxy)propyl trimethoxysilane, ((3-ethyl-3-oxetanyl)methoxy)propyltriethoxysilane, DMS-E01, DMS-E12, or a combination of the compounds.

Based on a total usage amount of 1.0 mole of the silane compound (b1) containing a polymerizable unsaturated group, the silane compound (b2) containing an epoxy group, and the other silane compounds (b3), the usage amount of the silane compound (b2) containing an epoxy group is 0.3 moles to 0.8 moles, preferably 0.35 moles to 0.75 moles, and more preferably 0.4 moles to 0.7 moles.

Other Silane Compounds (b3)

The other silane compounds (b3) are, for instance, a compound having one silicon atom. The compound having one silicone atom includes a silane compound having four hydrolyzable groups, a silane compound having three hydrolyzable groups, a silane compound having two hydrolyzable groups, a silane compound having one hydrolyzable group, or a combination thereof.

Specific examples of the silane compound having four hydrolyzable groups include tetrachlorosilane, tetramethoxysilane, tetraethoxysilane, tetra-n-propoxysilane, tetraisopropoxysilane, tetra-n-butoxysilane, tetra-sec-butoxysilane, or a combination of the compounds.

Specific examples of the silane compound having three hydrolyzable groups include trichlorosilane, trimethoxysilane, triethoxysilane, fluorotrichlorosilane, fluorotrimethoxysilane, fluorotriethoxysilane, methyltrichlorosilane, methyltrimethoxysilane, methyltriethoxysilane, 2-(trifluoromethyl)ethyltrichlorosilane, 2-(trifluoromethyl)ethyltrimethoxysilane, 2-(trifluoromethyl)ethyltriethoxysilane, hydroxymethyltrichlorosilane, hydroxymethyltrimethoxysilane, hydroxyethyltrimethoxy silane, mercaptomethyltrichlorosilane, 3-mercaptopropyltrichlorosilane, mercaptomethyltrimethoxysilane, mercaptomethyltriethoxysilane, 3-mercaptopropyl trimethoxysilane, 3-mercaptopropyltriethoxysilane, phenyltrichlorosilane, phenyltrimethoxysilane, phenyltriethoxysilane, or a combination of the compounds.

Specific examples of the silane compound having two hydrolyzable groups include methyldichlorosilane, methyldimethoxysilane, methyldiethoxysilane, dimethyldichlorosilane, dimethyldimethoxysilane, dimethyldiethoxysilane, methyl[2-(perfluoro-n-octyl)ethyl]dichlorosilane, methyl[2-(perfluoro-n-octyl)ethyl]dimethoxysilane, 3-mercaptopropylmethyldichlorosilane, 3-mercaptopropylmethyl dimethoxysilane, diphenyldichlorosilane, diphenyldimethoxysilane, or a combination of the compounds.

Specific examples of the silane compound having one hydrolyzable group include chlorodimethylsilane, methoxydimethylsilane, chlorotrimethylsilane, bromotrimethylsilane, iodotrimethylsilane, methoxytrimethylsilane, chloromethyldiphenylsilane, methoxymethyldiphenylsilane, or a combination of the compounds.

Specific examples of commercial products of the other silane compounds (b3) can include, for instance, KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220 L, KR242A, KR271, KR282, KR300, KR311, KR401N, KR500, KR510, KR5206, KR5230, KR5235, KR9218, KR9706 (made by Shin-Etsu Chemical); glass resin (made by Showa Denko); SH804, SH805, SH806A, SH840, SR2400, SR2402, SR2405, SR2406, SR2410, SR2411, SR2416, SR2420 (made by Dow Corning Toray); FZ3711, FZ3722 (made by NUC); DMS-S12, DMS-S15, DMS-S21, DMS-S27, DMS-S31, DMS-S32, DMS-S33, DMS-S35, DMS-538, DMS-542, DMS-545, DMS-551, DMS-227, PSD-0332, PDS-1615, PDS-9931, XMS-5025 (made by JNC); MS51, MS56 (made by Mitsubishi Chemical); and partial condensates of GR100, GR650, GR908, GR950 (made by Showa Denko).

The other silane compounds (b3) are preferably tetramethoxysilane, tetraethoxysilane, methyltrimethoxysilane, methyltriethoxysilane, phenyltrimethoxy silane, phenyltriethoxysilane, 3-mercaptopropyltrimethoxysilane, 3-mercaptopropyl triethoxysilane, mercaptomethyltrimethoxysilane, mercaptomethyltriethoxysilane, dimethyldimethoxysilane, dimethyldiethoxysilane, or a combination of the compounds.

Based on a total usage amount of 1.0 mole of the silane compound (b1) containing a polymerizable unsaturated group, the silane compound (b2) containing an epoxy group, and the other silane compounds (b3), the usage amount of the other silane compounds (b3) is 0 moles to 0.5 moles, preferably 0.05 moles to 0.4 moles, and more preferably 0.1 moles to 0.3 moles.

Carboxylic Acid Compound (b4)

The carboxylic acid compound (b4) has a $C_4$ to $C_{50}$ long chain, preferably has a $C_6$ to $C_{50}$ long chain.

Specifically, the carboxylic acid compound (b4) includes a carboxylic acid derivative having a steroid skeleton, a compound represented by formula (V), or a combination thereof.

The carboxylic acid derivative having a steroid skeleton includes a benzoic acid derivative having a steroid skeleton, a succinic acid derivative having a steroid skeleton, a compound represented by formula (IV), or a combination thereof

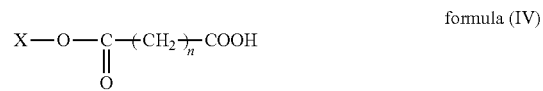

formula (IV)

In formula (IV), X is a group represented by formula (X-1), formula (X-2), or formula (X-3); n is an integer of 0 to 18.

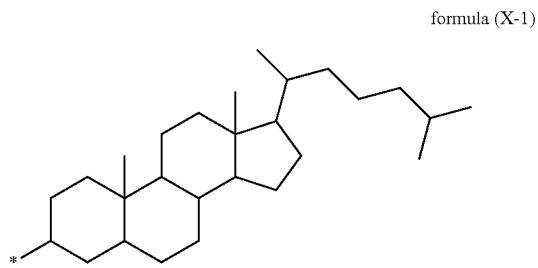

formula (X-1)

formula (X-2)

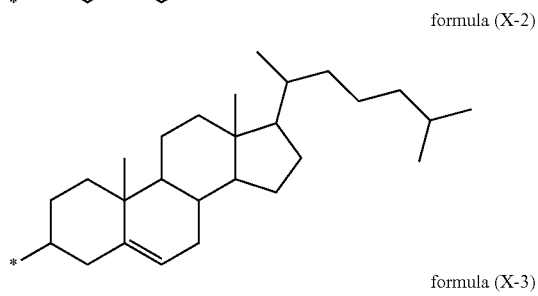

formula (X-3)

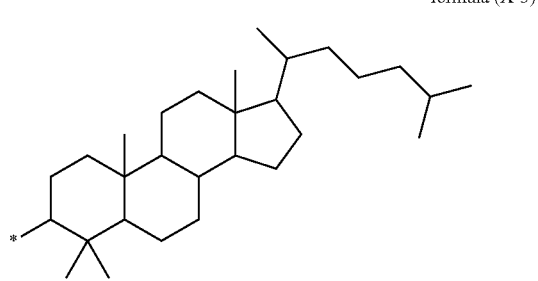

Specific examples of the carboxylic acid derivative having a steroid skeleton include cholestanyloxy benzoic acid, cholestenyloxy benzoic acid, lanostanyloxy benzoic acid, cholestanyloxy carbonyl benzoic acid, cholestenyloxy carbonyl benzoic acid, lanostanyloxy carbonyl benzoic acid, 5ξ-cholestane-3-yl succinate, 5ξ-cholestene-3-yl succinate, 5ξ-lanostane-3-yl succinate, a compound represented by formula (IV-1), a compound represented by formula (IV-2), or a combination of the compounds.

formula (IV-1)

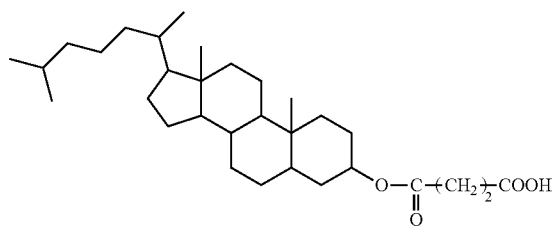

formula (IV-2)

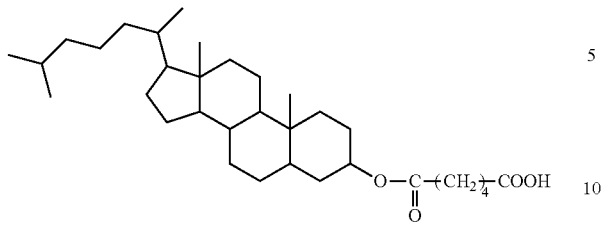

$Z^1$-$L^0$-$L^1$-$Z^2$     formula (V)

In formula (V), $Z^1$ represents a $C_4$ to $C_{50}$ straight-chain alkyl group or branched-chain alkyl group, wherein a portion or all of the hydrogen atoms of the alkyl group may be substituted by a substituent such as a cyano group, a fluorine atom, or a trifluoromethyl group; $L^0$ represents a single bond or *—O—, wherein "*" represents the bonding site with $Z^1$; $L^1$ represents a single bond, a phenylene group, a biphenylene group, a cyclohexylene group, a dicyclohexylene group, or a group represented by formula ($L^1$-1) or formula ($L^1$-2); $Z^2$ represents a carboxylic acid group. When $L^1$ is a single bond, $L^0$ is a single bond.

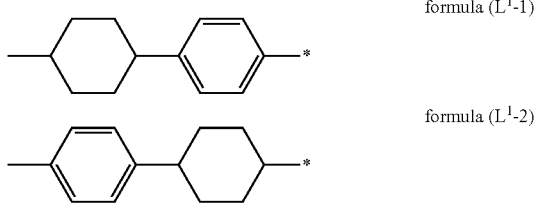

In formula ($L^1$-1) and formula ($L^1$-2), "*" represents the bonding site with $Z^2$.

In formula (V), when $Z^1$ represents a $C_4$ to $C_{50}$ long-chain alkyl group or branched-chain alkyl group, $Z^1$ is, for instance, an n-butyl group, a sec-butyl group, a tert-butyl group, an n-pentyl group, 3-methylbutyl, 2-methylbutyl, 1-methylbutyl, 2,2-dimethylpropyl, n-hexyl, 4-methylpentyl, 3-methylpentyl, 2-methylpentyl, 1-methylpentyl, 3,3-dimethylbutyl, 2,3-dimethylbutyl, 1,3-dimethylbutyl, 2,2-dimethylbutyl, 1,2-dimethylbutyl, 1,1-dimethylbutyl, an n-heptyl group, 5-methylhexyl, 4-methylhexyl, 3-methylhexyl, 2-methylhexyl, 1-methylhexyl, 4,4-dimethylpentyl, 3,4-dimethylpentyl, 2,4-dimethylpentyl, 1,4-dimethylpentyl, 3,3-dimethylpentyl, 2,3-dimethylpentyl, 1,3-dimethylpentyl, 2,2-dimethylpentyl, 1,2-dimethylpentyl, 1,1-dimethylpentyl, 2,3,3-trimethylbutyl, 3,3-trimethylbutyl, 1,2,3-trimethylbutyl, an n-octyl group, 6-methylheptyl, 5-methylheptyl, 4-methylheptyl, 3-methylheptyl, 2-methylheptyl, 1-methylheptyl, 2-ethylhexyl, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, or a similar group thereof.

In formula (V), $Z^1$ preferably represents a $C_6$ to $C_{50}$ alkyl group or a $C_6$ to $C_{50}$ fluoroalkyl group.

The compound represented by formula (V) includes at least one of the compounds represented by formula (V-1) to formula (V-5).

$C_pH_{2p+1}$—COOH     formula (V-1)

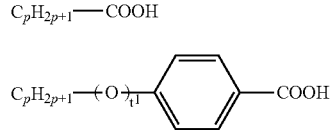

formula (V-2)

$C_qF_{2q+1}$—$C_mH_{2m}$—COOH     formula (V-3)

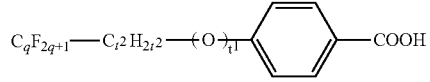

formula (V-4)

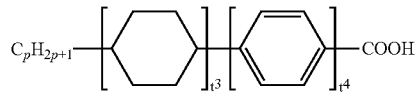

formula (V-5)

In formula (V-1) to formula (V-5), p represents an integer of 4 to 20; q represents an integer of 1 to 5; m represents an integer of 1 to 18, q+m≥4; $t^1$ represents 0 or 1; $t^2$ represents an integer of 0 to 18, q+$t^2$≥4; $t^3$ and $t^4$ each independently represent an integer of 0 to 2.

Specific examples of the compounds represented by formula (V-1) to formula (V-5) include pentanoic acid, hexanoic acid, n-heptanoic acid, n-octanoic acid, n-decanoic acid, n-lauric acid, n-hexadecanoic acid, stearic acid, n-hexylbenzoic acid, 4-n-octyl benzoic acid, 4-n-decyl benzoic acid, 4-n-dodecyl benzoic acid, 4-n-hexadecyl benzoic acid, 4-octadecyl benzoic acid, 4-n-hexyloxy benzoic acid, 4-n-octyloxy benzoic acid, 4-n-decyloxy benzoic acid, 4-n-dodecyloxy benzoic acid, 4-n-hexadecyloxy benzoic, 4-octadecyloxy benzoic acid, 4-(4-pentyl-cyclohexyl)benzoic acid, 4-(4-hexyl-cyclohexyl)benzoic acid, 4-(4-heptyl-cyclohexyl)benzoic acid, 4'-pentyl-dicyclohexyl-4-carboxylic acid, 4'-hexyl-dicyclohexyl-4-carboxylic acid, 4'-heptyl-dicyclohexyl-4-carboxylic acid, 4'-pentyl-biphenyl-4-carboxylic acid, 4'-hexyl-biphenyl-4-carboxylic acid, 4'-heptyl-biphenyl-4-carboxylic acid, 4-(4-pentyl-dicyclohexyl-4-yl) benzoic acid, 4-(4-hexyl-dicyclohexyl-4-yl)benzoic acid, 4-(4-heptyl-dicyclohexyl-4-yl)benzoic acid, at least one of the compounds represented by formula (V-6) to formula (V-8), or a combination of the compounds.

$CF_3$—$C_3H_6$—COOH     formula (V-6)

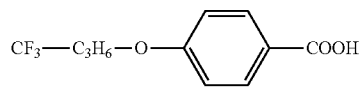

formula (V-7)

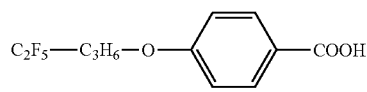

formula (V-8)

Specific examples of the carboxylic acid compound (b4) preferably include cholestanyloxy benzoic acid, cholestanyloxy carbonyl benzoic acid, a compound represented by formula (IV-1), pentanoic acid, hexanoic acid, n-heptanoic acid, n-octanoic acid, n-hexadecanoic acid, stearic acid, 4-n-hexyl benzoic acid, 4-n-dodecyl benzoic acid, 4-n-hexyloxy benzoic acid, 4-octadecyloxy benzoic acid, 4-(4-pentyl-cyclohexyl)benzoic acid, 4'-pentyl-dicyclohexyl-4- carboxylic acid, 4'-pentyl-biphenyl-4-carboxylic acid, 4-(4-hexyl-dicyclohexyl-4-yl)benzoic acid, a compound represented by formula (V-6), a compound represented by formula (V-7), or a combination of the compounds.

The molar equivalent ratio (b4)/(b2) of the carboxylic acid compound (b4) and the silane compound (b2) containing an epoxy group can be 0.05 to 0.5, preferably 0.08 to 0.4, more preferably 0.1 to 0.3.

In the polysiloxane (B) of the invention, the polystyrene-equivalent weight average molecular weight obtained according to GPC is 500 to 100,000, preferably 800 to 50,000, more preferably 1,000 to 20,000.

When the carboxylic acid compound (b4) is used in the polysiloxane (B) of the liquid crystal alignment agent, the issue of mura defect of the liquid crystal display element can be alleviated. In particular, when the carboxylic acid compound (b4) in the liquid crystal alignment agent has a $C_6$ to $C_{50}$ long chain, the issue of mura defect of the liquid crystal display element can be further alleviated.

Preparation Method of Polysiloxane (B)

Step (i)

The polycondensation reaction forming the polysiloxane compound can include a general method such as adding an organic solvent or water in the silane compound or a mixture thereof, or optionally further adding a catalyst thereto, and then performing heating via, for instance, an oil bath at 50° C. to 150° C., and the heating time is preferably 0.5 hours to 120 hours. During heating, the mixed solution can be stirred, and can also be placed in a reflux condition.

The organic solvent is not particularly limited, and can be the same or different from the solvent (D) contained in the liquid crystal alignment agent of the invention.

Specific examples of the organic solvent include a hydrocarbon compound such as toluene or xylene; a ketone solvent such as methyl ethyl ketone, methyl isobutyl ketone, methyl-n-pentyl ketone, diethyl ketone, cyclohexanone, 2-butanone, or 2-hexanone; an ester solvent such as ethyl acetate, n-butyl acetate, isopentyl acetate, propylene glycol monomethyl ether acetate, 3-methoxybutyl acetate, or ethyl lactate; an ether solvent such as ethylene glycol dimethyl ether, ethylene glycol diethyl ether, tetrahydrofuran, or dioxane; an alcohol solvent such as 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, or propylene glycol mono-n-propyl ether; an amide solvent such as N-methyl-2-pyrrolidone, N,N-dimethylacetamide, N,N-dimethylformamide, hexamethylphosphoric triamide, or 1,3-dimethyl-2-imidazolidinone, or a combination of the organic solvents.

The organic solvents can be used alone or in multiple combinations.

Based on 100 parts by weight of all of the silane compounds, the usage amount of the organic solvent is preferably 10 parts by weight to 1200 parts by weight, more preferably 30 parts by weight to 1,000 parts by weight.

Based on 1 mole of the hydrolyzable group of all of the silane compounds, the usage amount of water is preferably 0.5 moles to 2 moles.

The catalyst is not particularly limited, and the catalyst is preferably selected from an acid, an alkali metal compound, an organic base, a titanium compound, a zirconium compound, or a combination thereof.

Specific examples of the acid include hydrochloric acid, nitric acid, sulfuric acid, hydrofluoric acid, oxalic acid, phosphoric acid, acetic acid, trifluoroacetic acid, formic acid, polybasic carboxylic acid, polybasic acid anhydride, or a combination thereof.

Specific examples of the alkali metal compound include sodium hydroxide, potassium hydroxide, sodium methoxide, potassium methoxide, sodium ethoxide, potassium ethoxide, or a combination thereof.

Specific examples of the organic base include, for instance, a primary or secondary organic amine such as ethylamine, diethylamine, piperazine, piperidine, pyrrolidine, or pyrrole; a tertiary organic amine such as triethylamine, tri-n-propylamine, tri-n-butylamine, pyridine, 4-dimethylaminopyridine, or diazabicycloundecene; a quaternary organic amine such as tetramethylammonium hydroxide, or a combination of the compounds.

The usage amount of the catalyst is different according to, for instance, reaction conditions such as the type or the temperature, and can be suitably set. For instance, based on 1 mole of all of the silane compounds, the additive amount of the catalyst is 0.01 moles to 5 moles, preferably 0.03 moles to 3 moles, and more preferably 0.05 moles to 1 mole.

Based on stability concerns, after the polycondensation reaction is complete, the organic solvent layer fractionated from the reaction solution is preferably washed with water. When washing is performed, water containing a small amount of salt is preferably used, such as performing washing with, for instance, an aqueous solution of around 0.2 wt % ammonium nitrate. The washing can be performed until the washed aqueous layer is neutral, and then after the organic solvent layer is dried via a desiccant such as anhydrous calcium sulfate or a molecular sieve as needed, the organic solvent is removed to obtain a polysiloxane compound.

Step (ii)

The reaction of the epoxy group of the polysiloxane compound and the carboxylic acid compound (b4) can be performed in the presence of a catalyst and an organic solvent. Moreover, the addition reaction of the epoxy group of the polysiloxane compound and the carboxylic acid compound (b4) can also be performed in the presence of a curing promoter.

Specific examples of the catalyst of step (ii) are the same as the specific examples of the catalyst of step (i) and are not repeated herein.

Based on 100 parts by weight of the carboxylic acid compound (b4), the usage amount of the catalyst can be 0 parts by weight to 100 parts by weight, preferably 0.01 parts by weight to 50 parts by weight, and more preferably 0.1 parts by weight to 20 parts by weight.

The organic solvent of step (ii) is not particularly limited, and can be the same or different from the organic solvent of step (i) and the solvent (D) contained in the liquid crystal alignment agent of the invention. Specific examples of the organic solvent are preferably 2-butanone, 2-hexanone, methyl isobutyl ketone, n-butyl acetate, or a combination thereof.

Specific examples of the curing promoter include, for instance, a tertiary amine such as benzyl dimethylamine, 2,4,6-tris(dimethylaminomethyl)phenol, cyclohexyl dimethylamine, or triethanolamine; an imidazole compound such as 2-methylimidazole, 2-n-heptyl-imidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole, 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4- methyl-5-hydroxymethyl imidazole, 2-phenyl-4,5-bis(hydroxymethyl)imidazole, 1-(2-cyano ethyl)-2-phenyl-4,5-bis[(2'-cyanoethoxy)methyl]imidazole, 1-(2-cyanoethyl)-2-n-undecanyl imidazolium trimellitate, 1-(2-cyanoethyl)-2-phenyl imidazolium trimellitate, 1-(2-cyanoethyl)-2-ethyl-4-methyl imidazolium trimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, an isocyanuric acid adduct of 2-methylimidazole, an isocyanuric acid adduct of 2-phenylimidazole, or an isocyanuric acid adduct of 2,4-diamino-6-[2'-methylimidazolyl-(1')]ethyl-s-triazine; an organophosphorus compound such as diphenylphosphine, triphenylphosphine, or triphenyl phosphite; a quaternary phosphonium salt such as benzyl triphenyl phosphonium chloride, tetra-n-butyl phosphonium bromide, methyl triphenyl phosphonium bromide, ethyl triphenyl phosphonium bromide, n-butyl triphenylphosphonium bromide, tetraphenylphosphonium bromide, ethyl triphenyl phosphonium iodide, ethyl triphenyl phosphonium acetate, tetra-n-butyl phosphonium-O,O-diethyl phosphorodithionate, tetra-n-butylphosphonium benzotriazolate, tetra-n-butylphosphonium tetrafluoroborate, tetra-n-butyl phosphonium tetraphenylborate, or tetraphenyl phosphonium tetraphenylborate; a diazabicycloalkene such as 1,8-diazabicyclo[5.4.0]undec-7-ene or an organic acid salt thereof; an organometallic compound such as zinc octoate, tin octoate, or aluminium acetylacetone complex; a quaternary ammonium salt such as tetraethyl ammonium bromide, tetra-n-butyl ammonium bromide, tetraethylammonium chloride, or tetra-n-butyl ammonium chloride; a boron compound such as boron trifluoride or triphenyl borate; a metal halogen compound such as zinc chloride or tin tetrachloride; a high-melting point dispersion-type latent curing promoter such as dicyandiamide or an amine addition-type promoter such as an adduct of amine and an epoxy resin; a microcapsule-type latent curing promoter covering the surface of a curing promoter such as the imidazole compound, the organophosphorus compound, or the quaternary phosphonium salt via a polymer; an amine salt-type latent curing promoter; a latent curing promoter such as a high-temperature dissociation-type thermal cationic polymerization latent curing promoter such as a Lewis acid or a Bronsted acid salt.

Specific examples of the curing promoter preferably include a quaternary ammonium salt such as tetraethyl ammonium bromide, tetra-n-butyl ammonium bromide, tetraethyl ammonium chloride, and tetra-n-butyl ammonium chloride.

The reaction temperature of step (ii) can be 0° C. to 200° C., preferably 50° C. to 150° C. The reaction time of step (ii) can be 0.1 hours to 50 hours, preferably 0.5 hours to 20 hours.

Based on a usage amount of 100 parts by weight of the polymer (A), the usage amount of the polysiloxane (B) is 1 part by weight to 25 parts by weight, preferably 2 parts by weight to 20 parts by weight, and more preferably 3 parts by weight to 15 parts by weight.

In the case that the polysiloxane (B) is not used in the liquid crystal alignment agent, the liquid crystal display element has the issue of poor resistance to ultraviolet decay.

Photopolymerizable Compound (C)

The photopolymerizable compound (C) is a compound represented by formula (3).

formula (3)

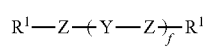

In formula (3), $R_1$ each independently represents a polymerizable functional group represented by formula (3-1) to formula (3-5), a hydrogen atom, a halogen atom, —CN, —CF$_3$, —CF$_2$H, —CFH$_2$, —OCF$_3$, —OCF$_2$H, —N=C=O, —N=C=S, or a $C_1$ to $C_{20}$ alkyl group, wherein any —CH$_2$— in the alkyl group may be substituted by —O—, —S—, —SO$_2$—, —CO—, —COO—, —OCO—, —CH=CH—, —CF=CF—, or —C≡C—, and in the hydrogen atom-containing functional group, any hydrogen atom may be substituted by a halogen atom or —CN; at least one $R_1$ is a polymerizable functional group represented by formula (3-1) to formula (3-5); Y independently represents a divalent group of a $C_3$ to $C_{20}$ saturated or unsaturated independent ring, condensed ring, or spiro ring, wherein in the ring, any —CH$_2$— may be substituted by —O—, any —CH= may be substituted by —N=, any —H may be substituted by a halogen atom, —CN, —NO$_2$, —NC, —N=C=O, —N=C=S, a silyl group substituted by 1 to 3 $C_1$ to $C_4$ alkyl groups or phenyl groups, a $C_1$ to $C_{10}$ straight-chain alkyl group, a $C_1$ to $C_{10}$ branched-chain alkyl group, or a $C_1$ to $C_{10}$ haloalkyl group, and in the alkyl group, any —CH$_2$— may be substituted by —O—, —CO—, —COO—, —OCO—, —OCOO—, —CH=CH—, or —C≡C—; Z each independently represents a single bond or a $C_1$ to $C_{20}$ alkylene group, wherein in the alkylene group, any —CH$_2$— may be substituted by —O—, —S—, —SO$_2$—, —CO—, —COO—, —OCO—, —OCOO—, —CH=CH—, —CF=CF—, —CH=N—, —N=CH—, —N=N—, —N(O)=N—, or —C≡C—, and any —H may be substituted by a halogen atom, a $C_1$ to $C_{10}$ alkyl group, or a $C_1$ to $C_{10}$ haloalkyl group; f represents an integer of 1 to 6, wherein when f is an integer of 2 to 6, a plurality of —Y—Z— are the same or different.

The polymerizable functional groups represented by formula (3-1) to formula (3-5) are as shown below.

formula (3-1)

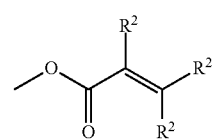

formula (3-2)

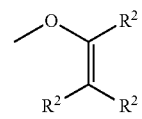

formula (3-3)

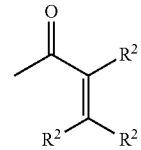

formula (3-4)

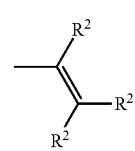

formula (3-5)

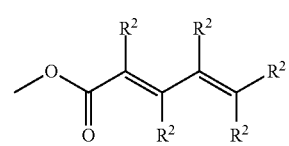

In formula (3-1) to formula (3-5), $R^2$ represents a hydrogen atom, a halogen atom, —CF$_3$, or a $C_1$ to $C_5$ alkyl group.

In formula (3), at least one $R^1$ is preferably the polymerizable functional group represented by formula (3-1) to formula (3-3).

In formula (3), specifically, Y each independently represents a divalent group of 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, bicyclo[3.1.0]hexane-3,6-diyl, or triptycene-1,4-diyl; in the ring, any —CH$_2$— may be substituted by —O—, any —CH═ may be substituted by —N═, any —H may be substituted by a halogen atom, —CN, —NO$_2$, —NC, —N═C═O, —N═C═S, a silyl group substituted by one to three C$_1$ to C$_4$ alkyl groups or phenyl groups, a C$_1$ to C$_{10}$ straight-chain alkyl group or branched-chain alkyl group, or a C$_1$ to C$_{10}$ haloalkyl group; and in the alkyl, any —CH$_2$— maybe substituted by —O—, —CO—, —COO—, —OCO—, —OCOO—, —CH═CH—, or —C≡C—.

Y preferably each independently represents at least one selected from the group consisting of functional groups represented by formula (3-6) to formula (3-30).

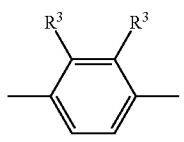

formula (3-6)

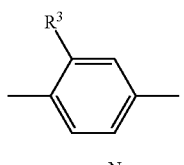

formula (3-7)

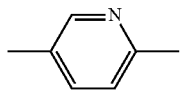

formula (3-8)

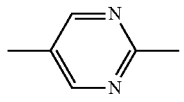

formula (3-9)

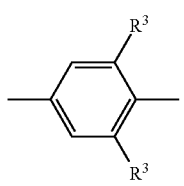

formula (3-10)

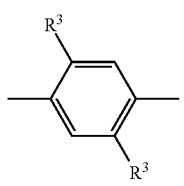

formula (3-11)

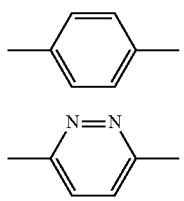

formula (3-12)

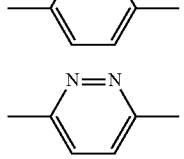

formula (3-13)

-continued

formula (3-14)

formula (3-15)

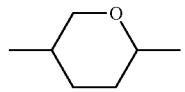

formula (3-16)

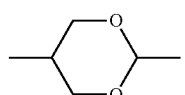

formula (3-17)

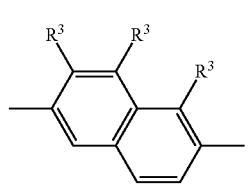

formula (3-18)

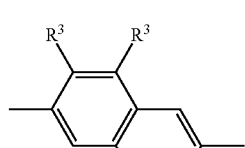

formula (3-19)

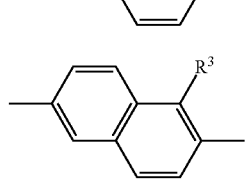

formula (3-20)

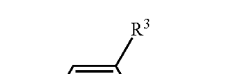

formula (3-21)

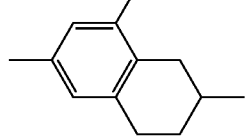

formula (3-22)

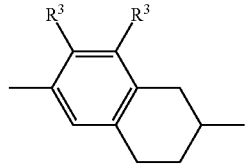

formula (3-23)

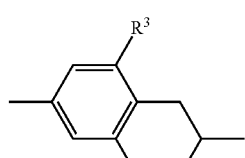

formula (3-24)

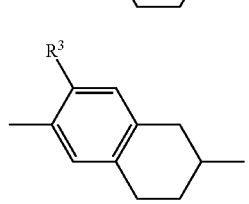

formula (3-25)

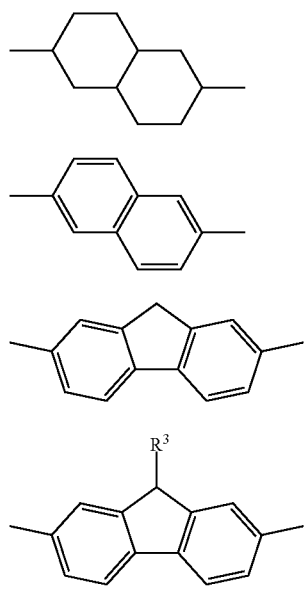

formula (3-26)

formula (3-27)

formula (3-28)

formula (3-29)

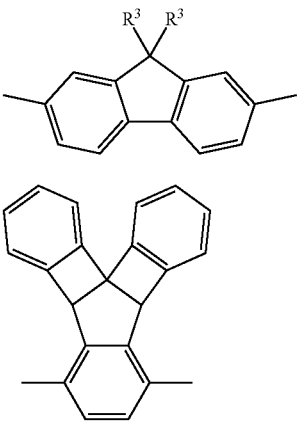

formula (3-30)

In formula (3-6) to formula (3-30), $R^3$ represents a halogen atom, a $C_1$ to $C_3$ alkyl group, a $C_1$ to $C_3$ alkoxy group, or a $C_1$ to $C_3$ haloalkyl group.

The photopolymerizable compound (C) is preferably at least one selected from the group consisting of compounds represented by formula (3-31) to formula (3-42).

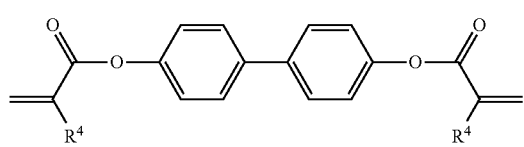

formula (3-31)

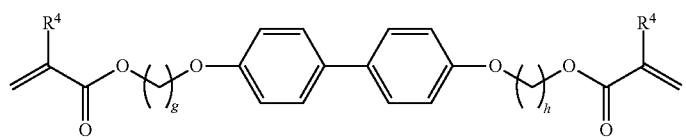

formula (3-32)

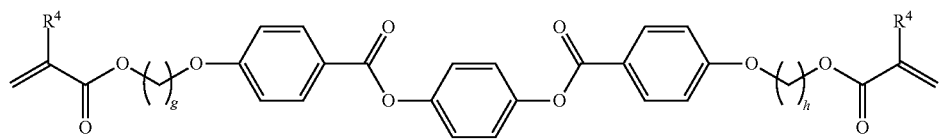

formula (3-33)

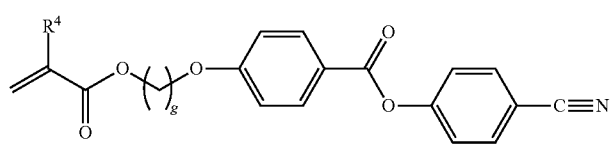

formula (3-34)

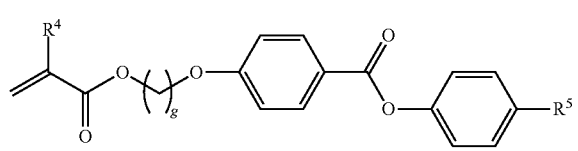

formula (3-35)

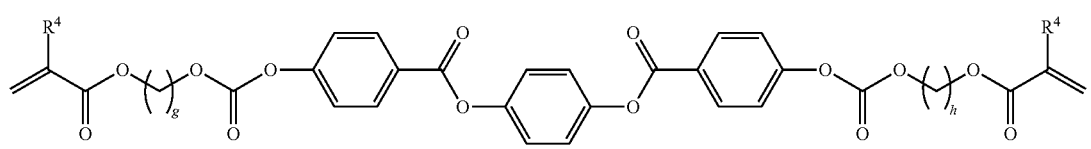

formula (3-36)

-continued formula (3-37)
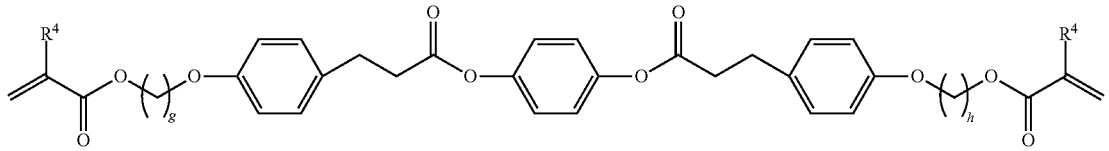

formula (3-38)
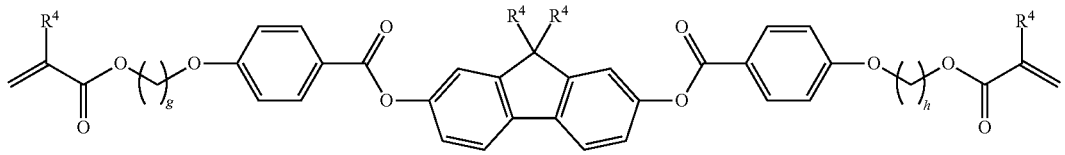

formula (3-39)
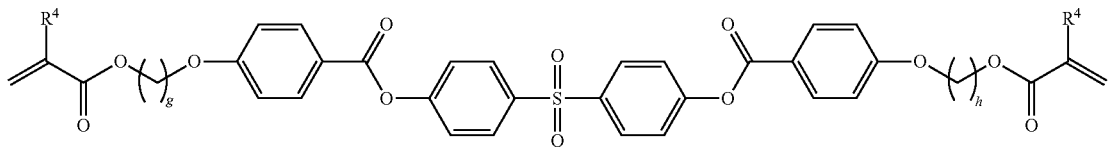

formula (3-40)
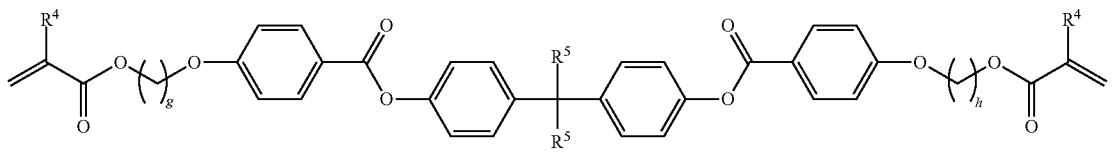

formula (3-41)
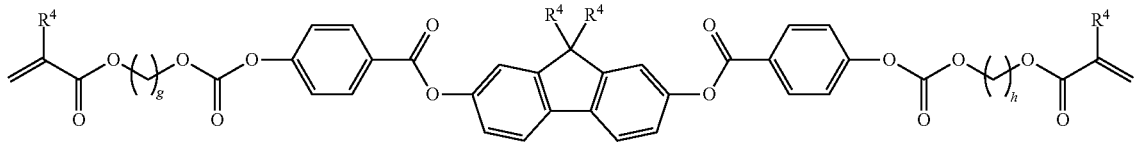

formula (3-42)
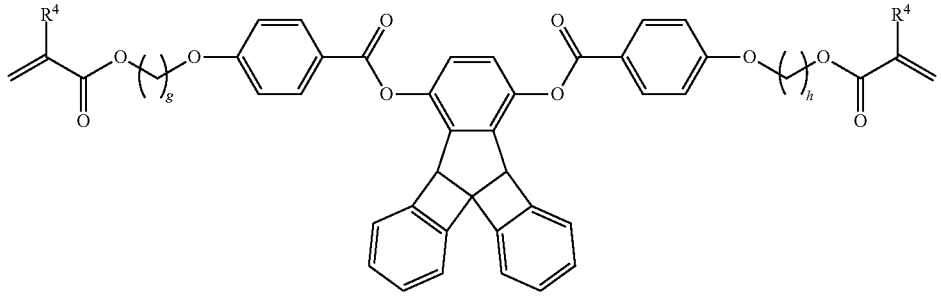

In formula (3-31) to formula (3-42), $R^4$ each independently represents a hydrogen atom or a methyl group; $R^5$ each independently represents a hydrogen atom, a halogen atom, a methyl group, $-CF_3$, $-OCH_3$, a phenyl group, or a $C_6$ to $C_{15}$ saturated or unsaturated hydrocarbon ring formed by two $R^5$ on the same carbon atom; g and h each independently represent an integer of 1 to 20.

Specific examples of the photopolymerizable compound (C) more preferably include at least one of the compounds represented by formula (3-43) to formula (3-97).

formula (3-43)
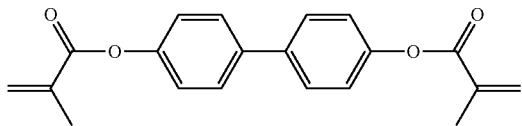

-continued
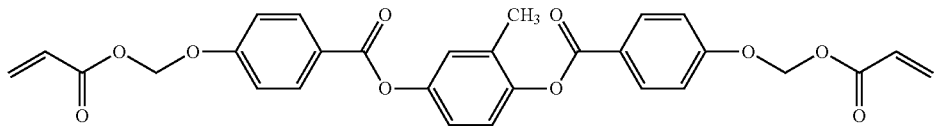
formula (3-44)
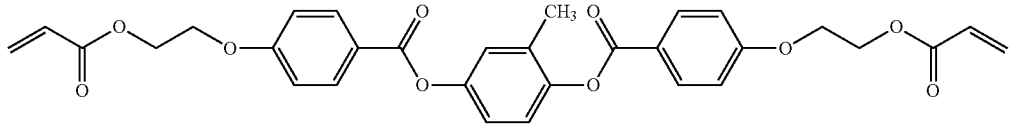
formula (3-45)
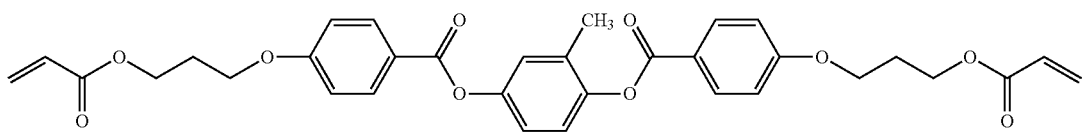
formula (3-46)
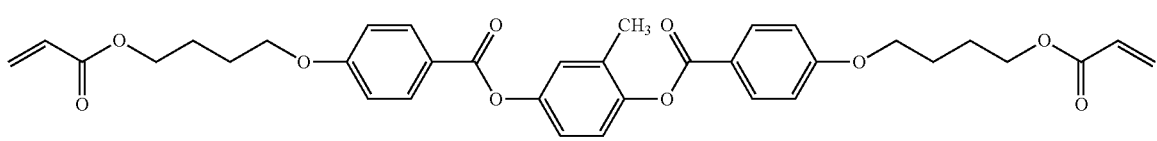
formula (3-47)
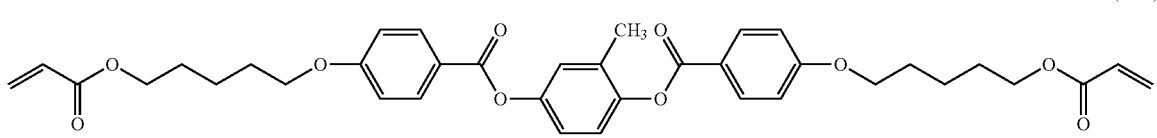
formula (3-48)
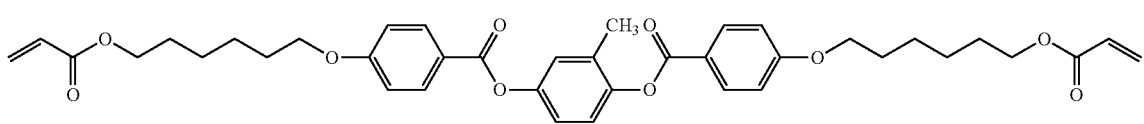
formula (3-49)
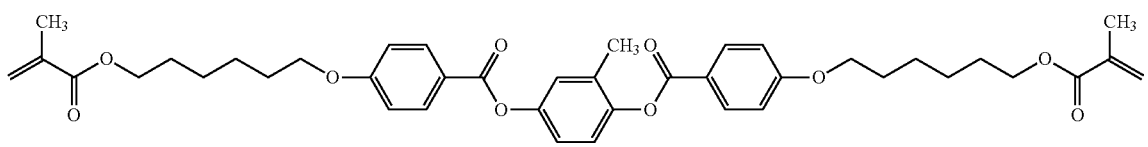
formula (3-50)
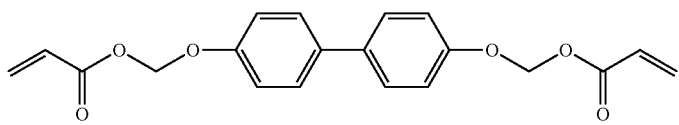
formula (3-51)
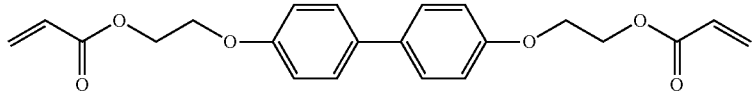
formula (3-52)
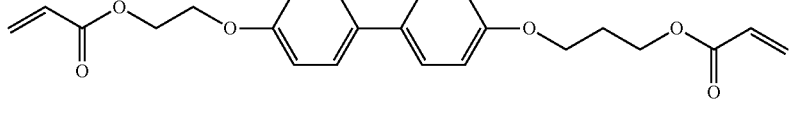
formula (3-53)
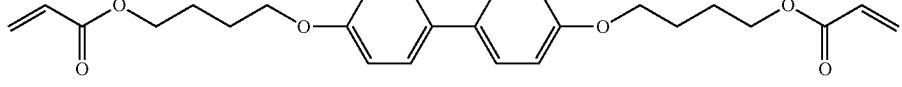
formula (3-54)

formula (3-55)
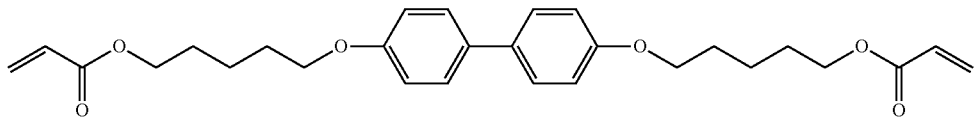
formula (3-56)
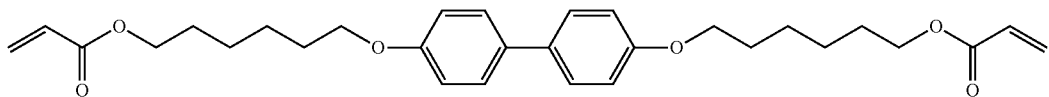
formula (3-57)
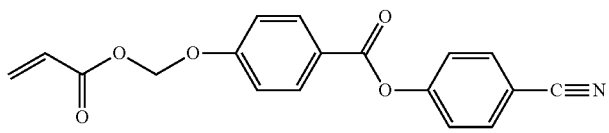
formula (3-58)
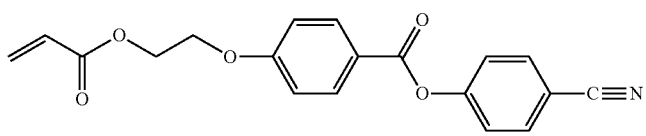
formula (3-59)
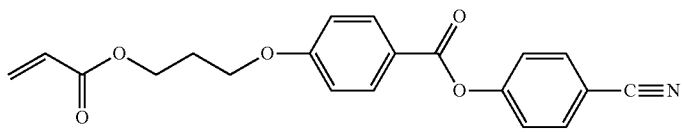
formula (3-60)
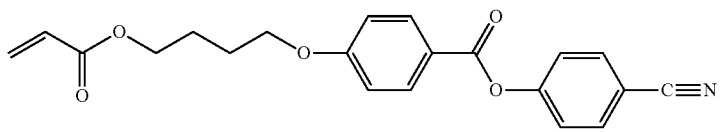
formula (3-61)
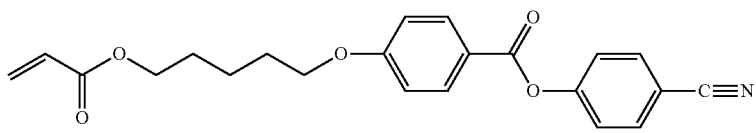
formula (3-62)
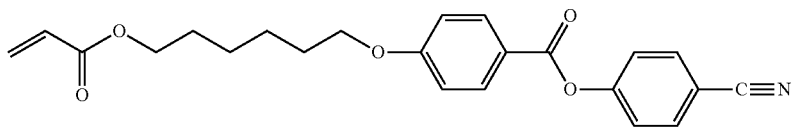
formula (3-63)
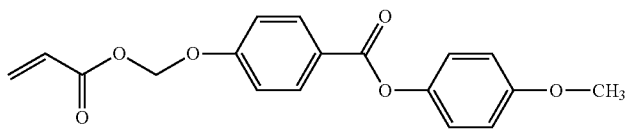
formula (3-64)
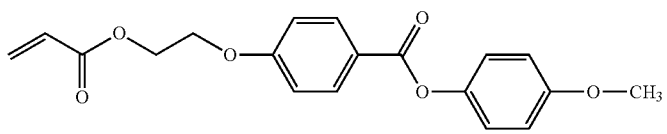
formula (3-65)
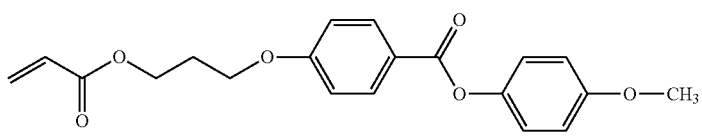

formula (3-66)
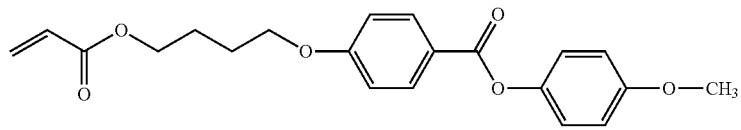
formula (3-67)
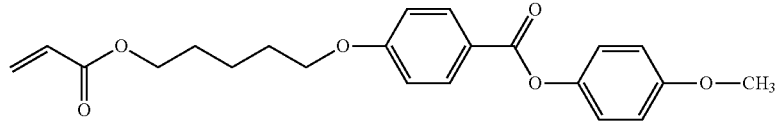
formula (3-68)
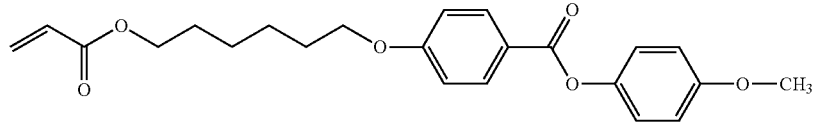
formula (3-69)
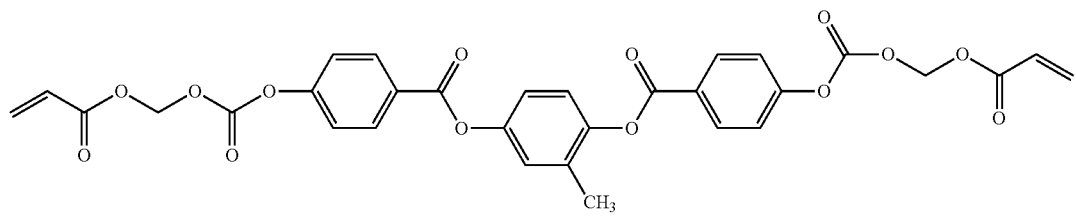
formula (3-70)
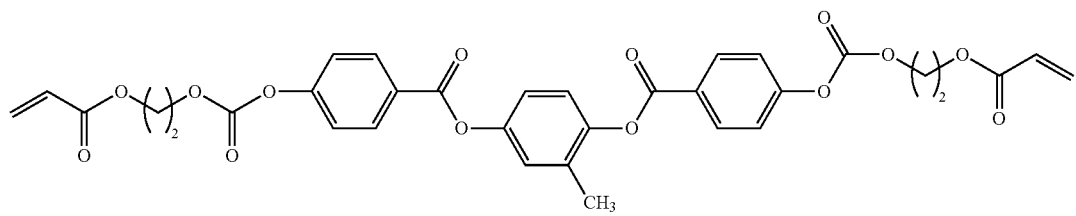
formula (3-71)
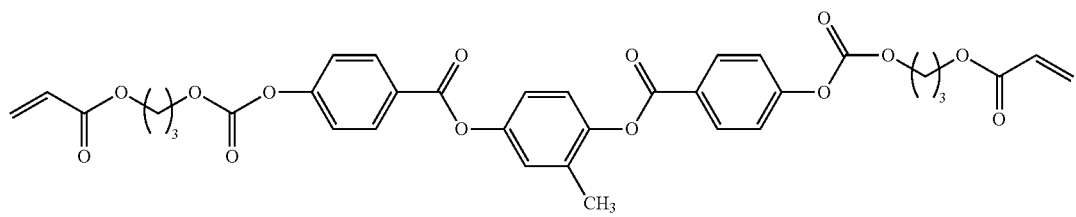
formula (3-72)
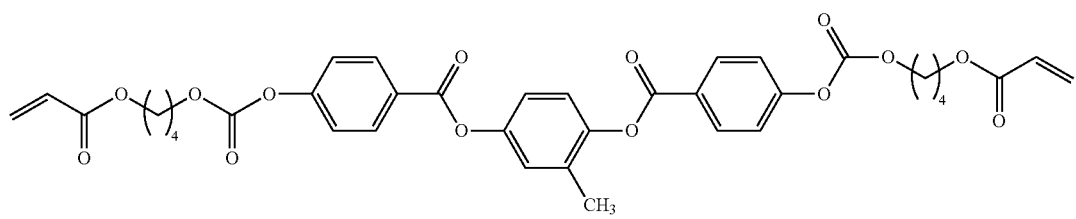
formula (3-73)
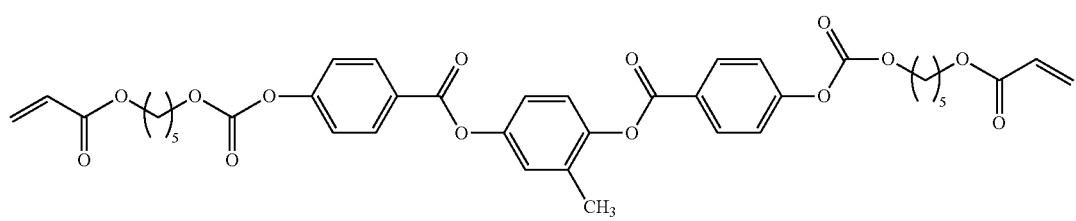

formula (3-74)
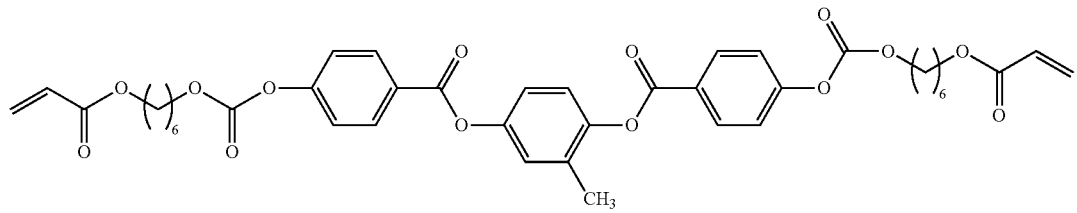
formula (3-75)
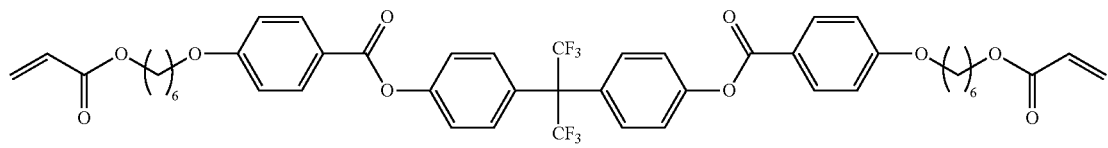
formula (3-76)
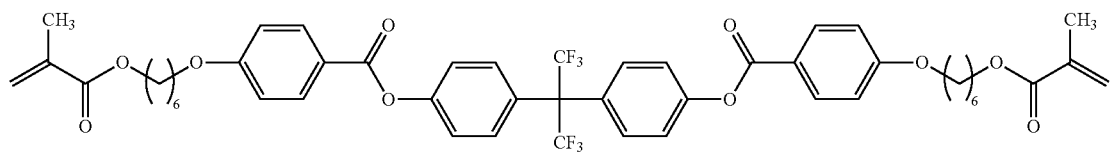
formula (3-77)
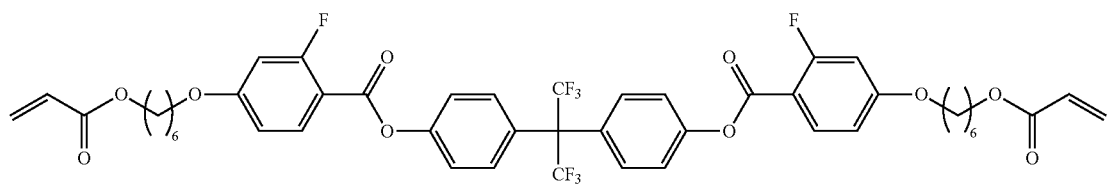
formula (3-78)
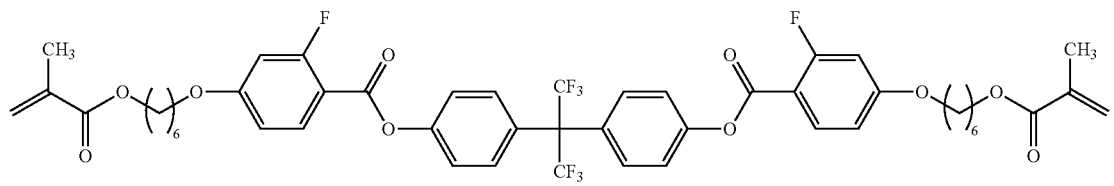
formula (3-79)
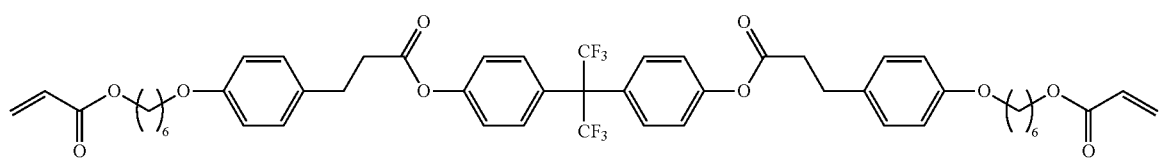
formula (3-80)
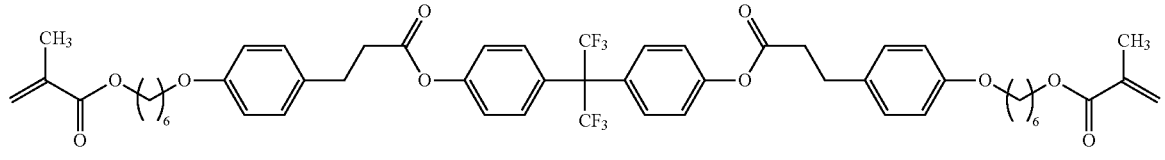
formula (3-81)
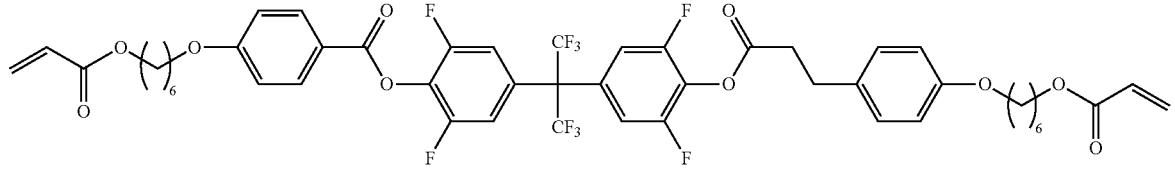

formula (3-82)
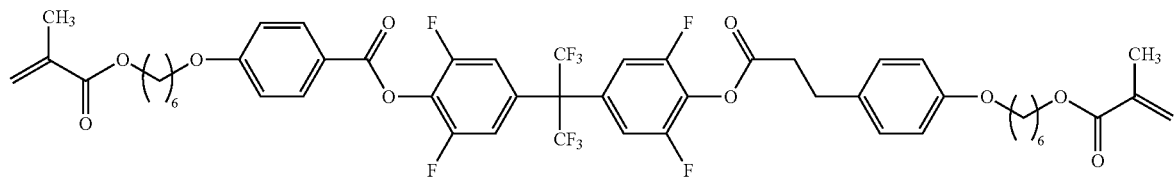
formula (3-83)
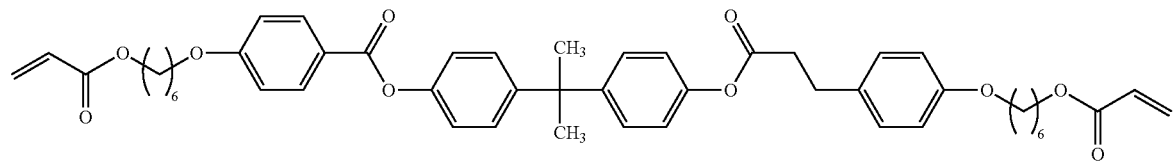
formula (3-84)
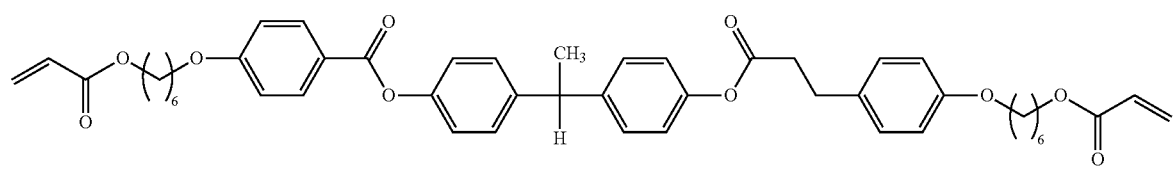
formula (3-85)
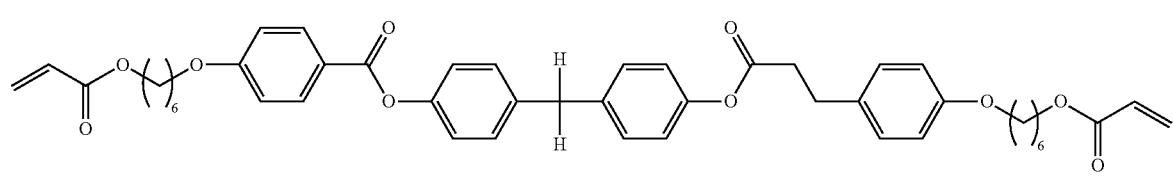
formula (3-86)
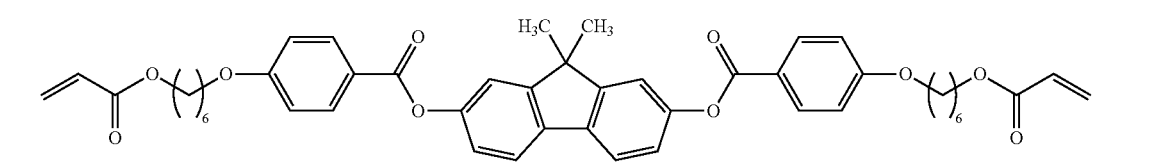
formula (3-87)
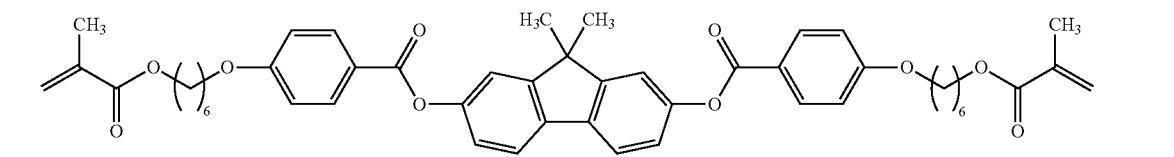
formula (3-88)
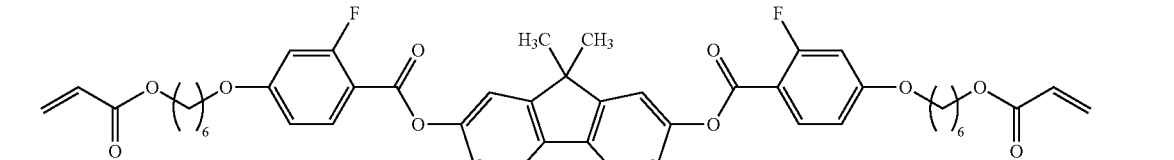
formula (3-89)
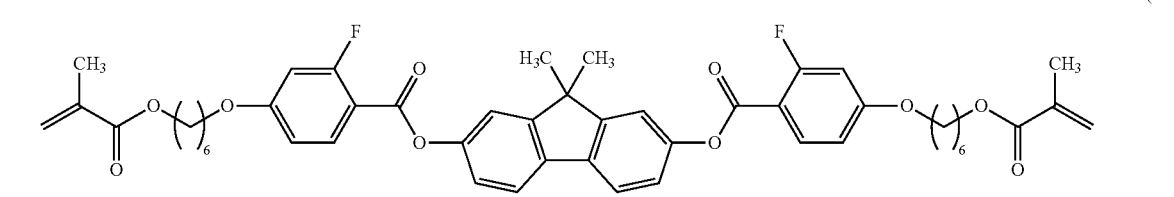

-continued
formula (3-90)
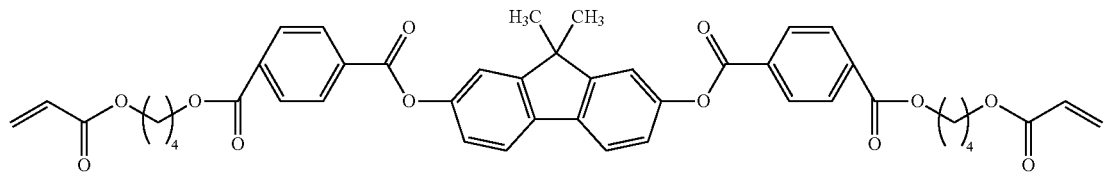
formulal (3-91)
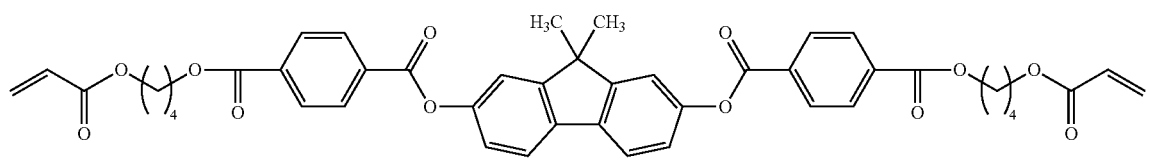
formula (3-92)
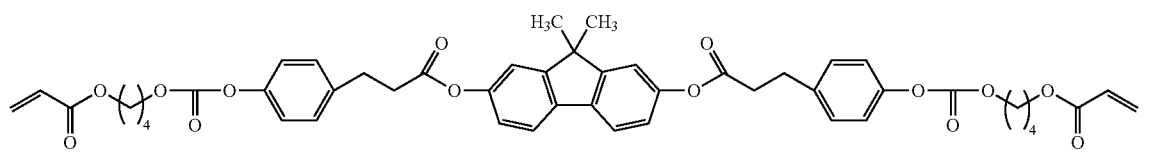
formula (3-93)
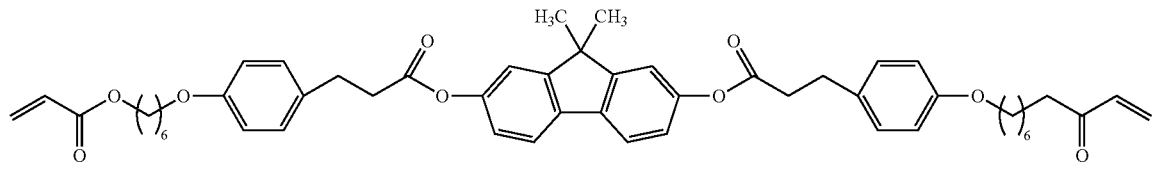
formula (3-94)
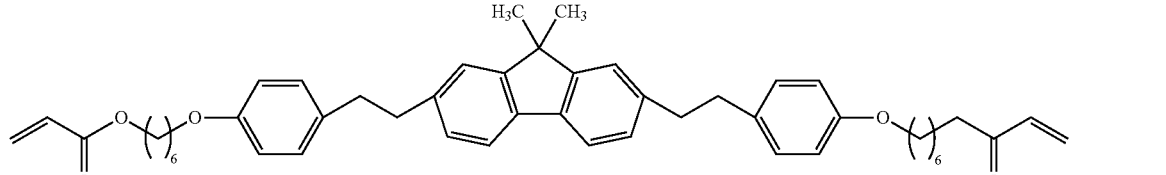
formula (3-95)
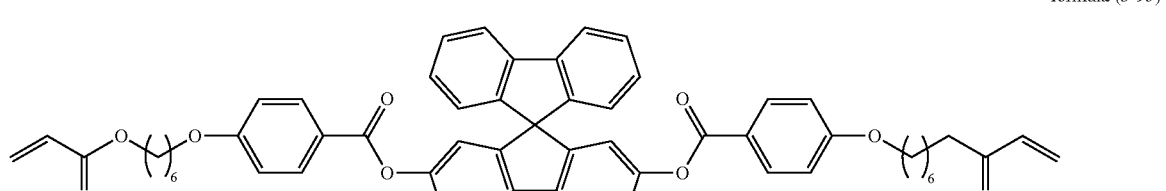
formula (3-96)
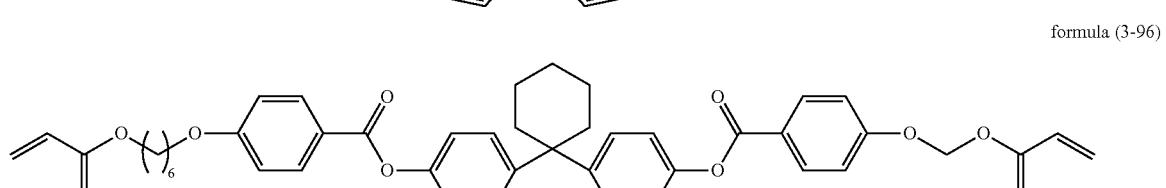
formula (3-97)
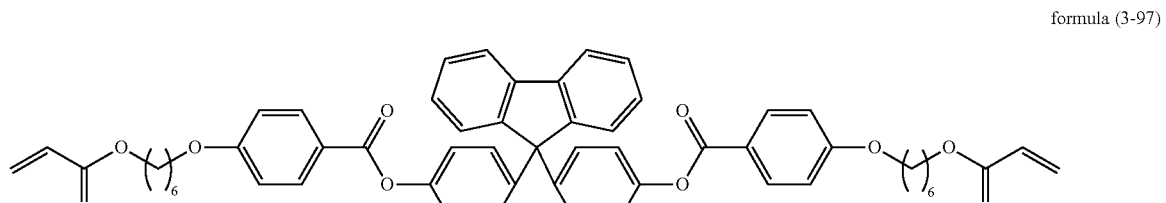

The photopolymerizable compound (C) more preferably includes at least one of compounds represented by formula (3-44) to formula (3-50) or formula (3-69) to formula (3-97). When the photopolymerizable compound (C) is the compound shown in formula (3-44) to formula (3-50) or formula (3-69) to formula (3-97), the resistance to ultraviolet decay of the manufactured liquid crystal display element is particularly good.

The photopolymerizable compound (C) can be used alone or in multiple combinations.

Based on a usage amount of 100 parts by weight of the polymer (A), the usage amount of the photopolymerizable compound (C) is 1 part by weight to 35 parts by weight, preferably 3 parts by weight to 30 parts by weight, and more preferably 5 parts by weight to 25 parts by weight.

In the case that the photopolymerizable compound (C) is not used in the liquid crystal alignment agent, the liquid crystal display element has the issue of mura defect.

Solvent (D)

The solvent used in the liquid crystal alignment agent of the invention is not particularly limited, and only needs to be able to dissolve the polymer (A), the polysiloxane (B), and any other components without reacting therewith. The solvent is preferably the same as the solvent used in the synthesis of the polyamic acid, and at the same time, the poor solvent used in the synthesis of the polyamic acid can also be used together.

Specific examples of the solvent (D) include, but are not limited to, for instance, N-methyl-2-pyrrolidone (NMP), γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, N,N-dimethyl formamide, or N,N-dimethyl acetamide. The solvent (D) can be used alone or in multiple combinations.

Based on a usage amount of 100 parts by weight of the polymer (A), the usage amount of the solvent (D) is 800 parts by weight to 4000 parts by weight, preferably 900 parts by weight to 3500 parts by weight, and more preferably 1000 parts by weight to 3000 parts by weight.

Additive (E)

Without affecting the efficacy of the invention, an additive (E) can further optionally be added to the liquid crystal alignment agent, wherein the additive (E) includes a compound having at least two epoxy groups, a silane compound having a functional group, or a combination thereof.

The compound having at least two epoxy groups includes, but is not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromo-neopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, N,N-glycidyl-p-glycidyloxy aniline, 3-(N, N-diglycidyl)aminopropyltrimethoxysilane, or a combination of the compounds.

The compound having at least two epoxy groups can be used alone or in multiple combinations.

Based on a usage amount of 100 parts by weight of the polymer (A), the usage amount of the compound having at least two epoxy groups can be 0 parts by weight to 40 parts by weight, preferably 0.1 parts by weight to 30 parts by weight.

Specific examples of the silane compound having a functional group include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysane, N-phenyl-3-aminopropyltriethoxysilane, N-bis(oxyethylene)-3-aminopropyltrimethoxysilane, N-bis(oxyethylene)-3-aminopropyltriethoxysilane, or a combination of the compounds.

The additive (E) can be used alone or in multiple combinations.

Based on a usage amount of 100 parts by weight of the polymer (A), the usage amount of the silane compound having a functional group can be 0 parts by weight to 10 parts by weight, preferably 0.5 parts by weight to 10 parts by weight.

Based on a total usage amount of 100 parts by weight of the polymer (A), the usage amount of the additive (E) is preferably 0.5 parts by weight to 50 parts by weight, more preferably 1 part by weight to 45 parts by weight.

<Preparation Method of Liquid Crystal Alignment Agent>

The preparation method of the liquid crystal alignment agent of the invention is not particularly limited, and a general mixing method can be used for the preparation. For instance, the polymer (A), the polysiloxane (B), and the photopolymerizable compound (C) formed by the above methods are uniformly mixed into a mixture. Then, the solvent (D) is added under the condition of a temperature of 0° C. to 200° C. Next, the additive (E) is optionally added, and lastly the mixture is continuously stirred with a stirring apparatus until dissolved. Moreover, the solvent (D) is preferably added under a temperature of 20° C. to 60° C.

Under 25° C., the viscosity of the liquid crystal alignment agent of the invention is generally 15 cps to 35 cps, preferably 17 cps to 33 cps, and more preferably 20 cps to 30 cps.

<Forming Method of Liquid Crystal Alignment Film>

After the liquid crystal alignment agent of the invention is coated on a substrate, when needed, a coating film obtained via heat treatments such as pre-bake and post-bake is directly used as the liquid crystal alignment film. Moreover, a treatment such as rubbing, or irradiation of, for instance, polarized light or light of a specific wavelength, or an ion beam, can be performed on the coating film. Moreover, ultraviolet is irradiated when voltage is applied to the liquid crystal display element after liquid crystal is filled to form an SCVA film.

At this point, the used substrate only needs to be a substrate having high transparency, and is not particularly limited. The substrate is, for instance, a glass substrate, polycarbonate, poly(meth)acrylate, polyether sulfone, polyarylate, polyurethane, polysulfone, polyether, polyether ketone, trimethyl pentene, polyolefin, polyethylene terephthalate, (meth)acrylonitrile, cellulose triacetate, cellulose diacetate, or cellulose acetate butyrate. From the perspective of a simplified process, the substrate is preferably a substrate on which, for instance, an indium tin oxide (ITO) electrode for driving a liquid crystal is formed. Moreover, in the case that the reflective liquid crystal display element is a one-sided substrate, an opaque object such as a silicon wafer can also be used. Moreover, the electrode in this case can also include a light-reflecting material such as aluminum.

The coating method of the liquid crystal alignment agent is not particularly limited, and is, for instance, a printing method such as screen printing, offset printing, or flexo printing, an ink-jet method, a spray coating method, a roll coating method, immersion, slit coating, or spin coating. From the perspective of productivity, the widely industrially used transfer printing is also suitable for the invention.

After the liquid crystal alignment agent is coated via the above method, a coating film is formed via a pre-bake treatment and a post-bake treatment. Although the pre-bake step after the liquid crystal alignment agent is coated is not required, when the time between the coating and the post-bake is not fixed for each substrate, or when the post-bake is not performed immediately after the coating, a pre-bake step is preferably further performed. The only condition for the pre-bake step is that the organic solvent is volatilized without deforming the shape of the coating film due to, for instance, transport of the substrate. The conditions of the pre-bake treatment are not particularly limited, and the pre-bake treatment is, for instance, performed under any temperature of 40° C. to 150° C., preferably 50° C. to 120° C., and more preferably 60° C. to 100° C. The pre-bake treatment can be performed for any time from 0.1 minutes to 30 minutes, preferably performed for 0.5 minutes to 15 minutes, and more preferably performed for 1 minute to 5 minutes.

The conditions of the post-bake treatment are not particularly limited, and the post-bake treatment is, for instance, performed under any temperature of 100° C. to 350° C., preferably 120° C. to 300° C., and more preferably 150° C. to 250° C. The post-bake treatment can be performed for any time from 5 minutes to 240 minutes, preferably performed for 10 minutes to 100 minutes, and more preferably performed for 20 minute to 90 minutes. The heating can be performed via a known method, and can be performed via, for instance, a heating plate, a convection oven, or an infrared furnace.

The thickness of the liquid crystal alignment film obtained after post-bake is not particularly limited, and can be, for instance, 1 nm to 1000 nm, preferably 5 nm to 500 nm, and more preferably 10 nm to 300 nm.

<Liquid Crystal Display Element and Manufacturing Method Thereof>

The liquid crystal display element of the invention includes the liquid crystal alignment film formed by the liquid crystal alignment agent of the invention. The liquid crystal display element of the invention can be manufactured according to the following method.

Specifically, the liquid crystal display element of the invention can be obtained by manufacturing a liquid crystal cell via a known method after a liquid crystal alignment film is formed on a substrate via the above method. Specific examples of the liquid crystal display element include, for instance, a vertical alignment-type liquid crystal display element provided with a liquid crystal cell, wherein the liquid crystal cell has: two substrates disposed opposite to each other, a liquid crystal layer disposed between the substrates, and the liquid crystal alignment film formed by the liquid crystal alignment agent of the invention and disposed between the substrates and the liquid crystal layer.

Specifically, in the vertical alignment-type liquid crystal display element provided with a liquid crystal cell, the liquid crystal cell is fabricated via the following method: the liquid crystal alignment agent of the invention is coated on two substrates, and then a liquid crystal alignment film is formed via pre-bake and post-bake. Then, the two substrates are disposed in a manner in which the liquid crystal alignment films are facing to each other. The liquid crystal layer formed by a liquid crystal is clamped between the two substrates, wherein the liquid crystal layer is disposed in contact with the liquid crystal alignment film. Lastly, voltage is applied to the liquid crystal alignment film and the liquid crystal layer, and ultraviolet is irradiated at the same time.

Voltage is applied to the liquid crystal alignment film formed by the liquid crystal alignment agent of the invention and the liquid crystal layer, and ultraviolet is irradiated at the same time to perform polymerization on the polymerizable compound. At the same time, the polymerizable unsaturated groups of the polysiloxane are reacted with one another, or the polymerizable unsaturated groups are reacted with the polymerizable compound, such that the alignment of the liquid crystal is more efficiently fixed. As a result, a liquid crystal display element having good resistance to ultraviolet decay and no mura defect is formed.

The method of clamping the liquid crystal layer between the two substrates includes, for instance, the following two known methods:

(Method 1)

A pair of substrates on which a liquid crystal alignment film is each formed are prepared, and a spacer such as a bead is spread on the liquid crystal alignment film of one of the substrates. Then, the two liquid crystal alignment films are adhered to another substrate in a manner in which the liquid crystal alignment films are facing to each other, and then liquid crystal is injected under reduced pressure. Lastly, sealing is performed.

(Method 2)

A pair of substrates on which a liquid crystal alignment film is each formed are prepared, and after a spacer such as a bead is spread on the liquid crystal alignment film of one of the substrates, liquid crystal is dropped, then the two liquid crystal alignment films are adhered to another substrate in a manner in which the liquid crystal alignment films are facing to each other, and then sealing is performed.

In the two methods, the thickness of the spacer is preferably 1 μm to 30 μm, more preferably 2 μm to 10 μm.

The step in which voltage is applied to the liquid crystal alignment film and the liquid crystal layer while irradiating ultraviolet to manufacture a liquid crystal cell includes, for instance, applying the voltage between electrodes disposed on a substrate to apply an electric field to the liquid crystal alignment film and the liquid crystal layer, and irradiating ultraviolet while maintaining the electric field. In particular, the voltage applied between the electrodes is, for instance, 5 Vp-p to 30 Vp-p, preferably 5 Vp-p to 20 Vp-p. The amount of ultraviolet irradiation is, for instance, 1 J to 60 J, preferably 40 J or less, and more preferably 10 J or less. The less the amount of ultraviolet irradiation, the more poor reliability generated by damage to the liquid crystal or the material forming the liquid crystal display element can be inhibited. Moreover, by reducing the time of ultraviolet irradiation, the manufacturing efficiency can be increased. In the invention, even a lesser amount of ultraviolet irradiation can also increase response speed, and therefore even with a low irradiation amount such as 5 J, a liquid crystal display element having sufficiently fast response speed can also be formed.

Accordingly, when voltage is applied to the liquid crystal alignment film and the liquid crystal layer while irradiating ultraviolet, the polymerizable compound can be reacted to form a polymer. In addition, the polymerizable unsaturated groups of the polysiloxane can also be reacted with one other during ultraviolet irradiation, or be reacted with the polymerizable compound. Via the above reaction, the liquid crystal alignment film can obtain a better cured structure, such that the obtained liquid crystal display element has the characteristics of good resistance to ultraviolet decay and no mura defect.

Moreover, not only can the liquid crystal alignment agent be used for the manufacture of a vertical-alignment-type liquid crystal display element such as an SCVA-type liquid crystal display, but is also suitable for the application of a liquid crystal alignment film manufactured via a rubbing treatment or an optical alignment treatment.

The liquid crystal includes, for instance, a nematic liquid crystal or a smectic liquid crystal. Specific examples of the liquid crystal include, but are not limited to, a liquid crystal having positive dielectric anisotropy, and examples thereof can include, for instance, a biphenyl-based liquid crystal, a phenyl cyclohexane-based liquid crystal, an ester-based liquid crystal, a terphenyl-based liquid crystal, a biphenyl cyclohexane-based liquid crystal, a pyrimidine-based liquid crystal, a dioxane-based liquid crystal, a bicyclooctane-based liquid crystal, a cubane-based liquid crystal, or a combination of the liquid crystals. Moreover, the following can further be added to the liquid crystal above: a cholesteric liquid crystal such as cholesteryl chloride, cholesteryl nonanoate, or cholesteryl carbonate . . . etc.; a chiral agent sold under the product name of "C-15" or "CB-15" (made by Merck & Co.); or a ferroelectric liquid crystal such as p-decyloxybenzylidene-p-amino-2-methyl butyl cinnamate.

Moreover, specific examples of the liquid crystal can also include a liquid crystal having negative dielectric anisotropy, and examples thereof can include, for instance, a dicyanobenzene-based liquid crystal, a pyridazine-based liquid crystal, a Schiff base-based liquid crystal, an azoxy-based liquid crystal, a biphenyl-based liquid crystal, a phenyl cyclohexane-based liquid crystal, or a combination of the liquid crystals.

The following examples are used to further describe the invention. However, it should be understood that, the examples are only exemplary, and are not intended to limit the implementation of the invention.

SYNTHESIS EXAMPLES OF POLYMER (A)

In the following, synthesis example A-1-1 to synthesis example A-1-5 of the polymer (A) are described:

Synthesis Example A-1-1

A nitrogen inlet, a stirrer, a condenser tube, and a thermometer were provided to a four-necked flask having a volume of 500 mL, and then nitrogen gas was introduced. Then, in the four-necked flask, 4.86 g (0.045 moles) of p-diaminobenzene (hereinafter a2-1), 1.91 g (0.005 moles) of a diamine compound represented by formula (II-12) (hereinafter a2-4), and 80 g of N-methyl-2-pyrrolidone (hereinafter NMP) were added, and the mixture was stirred under room temperature until dissolved. Next, 9.80 g (0.05 mol) of 1,2,3,4-cyclobutane tetracarboxylic dianhydride (a1-1 hereinafter) and 20 g of NMP were added, and the mixture was reacted at room temperature for 2 hours. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-1-1).

Synthesis Example A-1-2 To Synthesis Example A-1-5

Polymer (A-1-2) to polymer (A-1-5) of synthesis example A-1-2 to synthesis example A-1-5 were respectively prepared with the same steps as synthesis example A-1-1, and the difference thereof is: the types and the usage amounts of the monomers were changed (as shown in Table 1).

In the following, synthesis example A-2-1 to synthesis example A-2-10 of the polymer (A) are described:

Synthesis Example A-2-1

A nitrogen inlet, a stirrer, a condenser tube, and a thermometer were provided to a four-necked flask having a volume of 500 mL, and then nitrogen gas was introduced. Then, in the four-necked flask, 4.86 g (0.045 moles) of p-diaminobenzene (hereinafter a2-1), 1.91 g (0.005 moles) of a diamine compound represented by formula (II-12) (hereinafter a2-4), and 80 g of N-methyl-2-pyrrolidone (hereinafter NMP) were added, and the mixture was stirred under room temperature until dissolved. Next, 9.80 g (0.05 moles) of 1,2,3,4-cyclobutane tetracarboxylic dianhydride (a1-1 hereinafter) and 20 g of NMP were added. After the mixture was reacted at room temperature for 6 hours, 97 g of NMP, 2.55 g of acetic anhydride, and 19.75 g of pyridine were added. Then, the temperature was raised to 60° C., and the mixture was continuously stirred for 2 hours to perform an imidization reaction. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-2-1).

Synthesis Example A-2-2 to Synthesis Example A-2-10

Polymer (A-2-2) to polymer (A-2-10) of synthesis example A-2-2 to synthesis example A-2-10 were respectively prepared with the same steps as synthesis example A-2-1, and the difference thereof is: the type and the usage amount of the monomers were changed (as shown in Table 1).

The compounds corresponding to the abbreviations in Table 1 are as shown below.

| Abbreviation | Component |
|---|---|
| a1-1 | 1,2,3,4-cyclobutane tetracarboxylic dianhydride |
| a1-2 | Pyromellitic dianhydride |
| a1-3 | 2,3,5-tricarboxycyclopentylacetic dianhydride |
| a1-4 | 3,4-dicarboxy-1,2,3,4-tetrahydronaphthalene-1-succinic dianhydride |
| a2-1 | p-diaminobezene |
| a2-2 | 4,4'-diaminodiphenylmethane |
| a2-3 | 4,4'-diaminodiphenyl ether |
| a2-4 | Diamine compound represented by formula (II-12) |

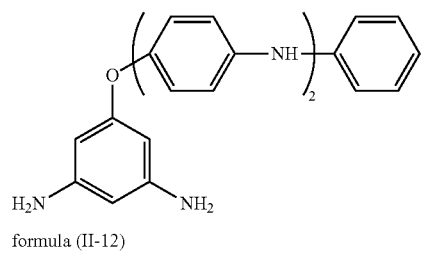

formula (II-12)

a2-5  Diamine compound represented by formula (II-22)

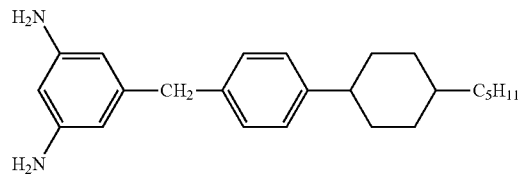

formula (II-22)

a2-6  1-octadecoxy-2,4-diaminobenzene
a2-7  Diamine compound represented by formula (II-1-4)

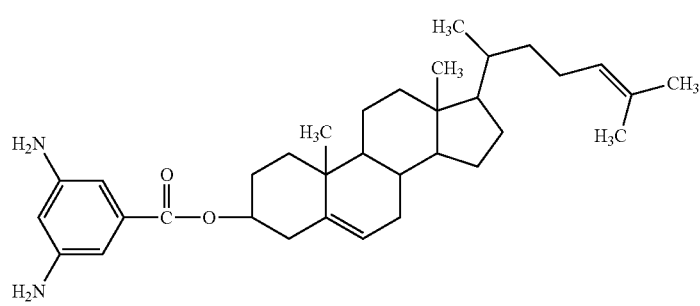 [SMILES: CC(C)=CCCC(C)C1CCC2C3CC=C4CC(OC(=O)c5cc(N)cc(N)c5)CCC4(C)C3CCC12C]

a2-8  Diamine compound represented by formula (II-28)

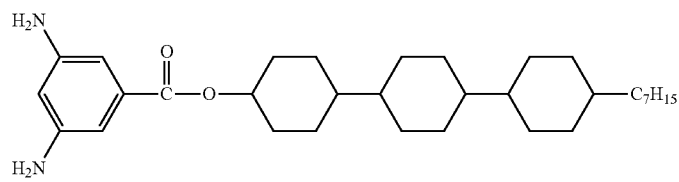

a2-9  Diamine compound represented by formula (II-30)

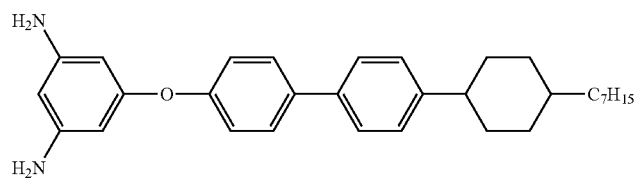

TABLE 1

| Component (unit: mole %) | | A-1-1 | A-1-2 | A-1-3 | A-1-4 | A-1-5 | A-2-1 | A-2-2 | A-2-3 | A-2-4 | A-2-5 | A-2-6 | A-2-7 | A-2-8 | A-2-9 | A-2-10 |
|---|---|---|---|---|---|---|---|---|---|---|---|---|---|---|---|---|
| Tetracarboxylic dianhydride component (a1) | a1-1 | 100 | — | — | — | — | 100 | — | — | — | — | — | 80 | — | — | 100 |
| | a1-2 | — | 100 | — | — | 50 | — | 100 | — | — | 50 | — | 20 | 100 | — | — |
| | a1-3 | — | — | 100 | — | — | — | — | 100 | — | — | 100 | — | — | 70 | — |
| | a1-4 | — | — | — | 100 | 50 | — | — | — | 100 | 50 | — | — | — | 30 | — |
| Diamine component (a2) | a2-1 | 90 | — | — | 94 | — | 90 | — | — | 94 | — | 60 | — | 75 | 80 | — |
| | a2-2 | — | 85 | — | — | 90 | — | 85 | — | — | 90 | 25 | 92 | — | 15 | 88 |
| | a2-3 | — | — | 85 | — | — | — | 15 | 85 | — | — | — | — | 15 | 5 | — |
| | a2-4 | 10 | — | 5 | — | — | 10 | — | — | — | — | 15 | — | 10 | — | 6 |
| | a2-5 | — | — | — | 6 | — | — | — | 6 | — | — | — | — | — | — | — |
| | a2-6 | — | — | 10 | — | — | — | — | 10 | — | — | — | — | — | — | 6 |
| | a2-7 | — | — | — | — | 5 | — | — | — | — | 10 | — | — | — | — | — |
| | a2-8 | — | 15 | — | — | — | — | — | 5 | — | — | — | 4 | — | — | — |
| | a2-9 | — | — | — | — | 5 | — | — | — | — | — | — | 4 | — | — | — |
| Imidization ratio (%) | | 0 | 0 | 0 | 0 | 0 | 15 | 20 | 26 | 30 | 42 | 55 | 68 | 73 | 90 | 95 |

SYNTHESIS EXAMPLES OF POLYSILOXANE (B)

Synthesis example B-1 to synthesis example B-6 of the polysiloxane (B) are described below.

Synthesis Example B-1

A stirrer, a condenser tube, and a thermometer were provided to a three-necked flask having a volume of 500 mL. Then, in the three-necked flask, 0.50 moles of 3-methacryloxypropyltrimethoxysilane (hereinafter GMPTS), 0.30 moles of 2-glycidoxyethyltrimethoxysilane (hereinafter GETMS), 0.10 moles of methyltrimethoxysilane (hereinafter MTMS), 0.10 moles of dimethyldimethoxysilane (hereinafter DMDMS), and 6 g of propylene glycol monomethyl ether (hereinafter PGME) were added, and an aqueous solution (20 g triethylamine (hereinafter TEA)/200 g H$_2$O) of TEA was added within 30 minutes while the mixture was stirred under room temperature. Then, the three-necked flask was immersed in an oil bath at 30° C. and stirred for 30 minutes, and then the temperature of the oil bath was raised to 90° C. within 30 minutes. When the internal temperature of the solution reached 75° C., the mixture was continuously heated and stirred to perform polycondensation for 6 hours. After the reaction was complete, the organic layer was removed and washed with an aqueous solution of 0.2 wt % ammonium nitrate to obtain a solution containing a polysiloxane compound.

Then, 0.06 moles of the carboxylic acid compound (hereinafter FPA) represented by formula (V-3-1) and 0.2 g of curing promoter UCAT 18X (made by SAN-APRO, Ltd.) were added in a solution containing a polysiloxane compound. Then, the three-necked flask was immersed in an oil bath at 30° C. and stirred for 10 minutes, and then the temperature of the oil bath was raised to 115° C. within 30 minutes. When the internal temperature of the solution reached 100° C., the mixture was continuously heated and stirred for 24 hours. After the reaction was complete, the organic layer was removed and washed with water. Then, drying was performed by using magnesium sulfate, and after the solvent was removed, polysiloxane (B-1) was obtained.

Synthesis Example B-2 to Synthesis Example B-6

Polysiloxane (B-2) to polysiloxane (B-6) of synthesis example B-2 to synthesis example B-6 were prepared with the same steps as synthesis example B-1, and the difference thereof is: the types and the usage amounts of the reactants of the polysiloxane (B) were changed, the types and the usage amounts of the carboxylic acid compounds were changed, the types and the usage amounts of the catalysts and the solvents were changed, and the reaction temperatures and the polycondensation times were changed (as shown in Table 2).

Synthesis Example B'-1 to Synthesis Example B'-3

Polysiloxane (B'-1) to polysiloxane (B'-3) of synthesis example B'-1 to synthesis example B'-3 were prepared with the same steps as synthesis example B-1, and the difference thereof is: the types and the usage amounts of the reactants of the polysiloxane (B) were changed, the types and the usage amounts of the carboxylic acid compounds were changed, the types and the usage amounts of the catalysts and the solvents were changed, and the reaction temperatures and the polycondensation times were changed (as shown in Table 2).

The compounds corresponding to the abbreviations in Table 2 are as shown below.

| Abbreviation | Compound |
|---|---|
| GMPTS | 3-methacryloxypropyltrimethoxy silane |
| GAPTS | 3-acryloxypropyltrimethoxy silane |
| VTMS | Vinyltrimethoxy silane |
| ATMS | Allyltrimethoxysilane |
| GETMS | 2-glycidoxyethyltrimethoxy silane |
| GBTMS | 4-glycidoxybutyltrimethoxysilane |
| ECETS | 2-(3,4-epoxycyclohexyl)ethyltrimethoxy silane |
| ECEES | 2-(3,4-epoxycyclohexyl)ethyltriethoxysilane |
| OXTMS | (3-ethyl-3-oxetanyl)methoxy)propyltrimethoxysilane |
| OXTES | (3-ethyl-3-oxetanyl)methoxy)propyltriethoxysilane |
| MTMS | Methyltrimethoxy silane |

| Abbreviation | Compound |
|---|---|
| DMDMS | Dimethyldimethoxy silane |
| PTMS | Phenyltrimethoxy silane |
| PTES | Phenyltriethoxy silane |
| FPA | $CF_3$—$C_3H_6$—COOH formula (V-6) |
| CPA | n-heptanoic acid |
| NHBA | 4-m-hexylbenzoic acid |
| 5HBA | 4-(4-pentylcyclohexyl)benzoic acid |
| HCEA | 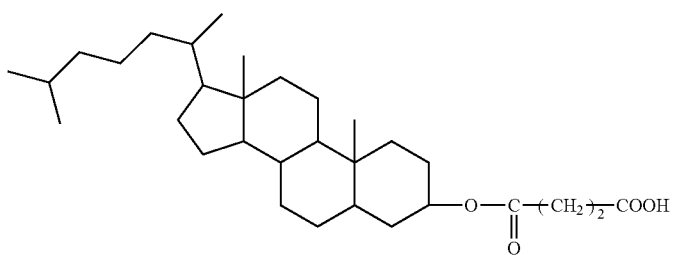 formula (IV-1) |
| PGME | Propylene glycol monomethyl ether |
| MIBK | Methyl isobutyl ketone |
| $H_2O$ | Water |
| TEA | Triethylamine |

TABLE 2

| Component (unit: mole) | | Synthesis example | | | | | | | | |
|---|---|---|---|---|---|---|---|---|---|---|
| | | B-1 | B-2 | B-3 | B-4 | B-5 | B-6 | B'-1 | B'-2 | B'-3 |
| Silane compound (b1) containing a polymerizable unsaturated group | GMPTS | 0.50 | — | — | 0.25 | 0.10 | — | — | 0.50 | — |
| | GAPTS | — | 0.20 | — | — | — | — | 0.20 | — | — |
| | VTMS | — | — | — | — | 0.10 | — | — | — | — |
| | ATMS | — | — | 0.40 | — | — | 0.20 | — | — | — |
| Silane compound (b2) containing an epoxy group | GETMS | 0.30 | — | — | — | — | 0.50 | — | — | — |
| | GBTMS | — | 0.30 | — | — | — | — | 0.30 | — | — |
| | ECETS | — | 0.30 | — | 0.40 | — | — | 0.30 | — | — |
| | ECEES | — | — | 0.20 | — | 0.80 | — | — | — | — |
| | OXTMS | — | — | — | 0.35 | — | — | — | — | — |
| | OXTES | — | — | 0.30 | — | — | — | — | — | — |
| Other silane compounds (b3) | MTMS | 0.10 | — | — | — | — | — | — | 0.40 | 0.50 |
| | DMDMS | 0.10 | — | — | — | — | — | — | 0.10 | — |
| | PTMS | — | 0.20 | 0.10 | — | — | — | 0.20 | — | — |
| | PTES | — | — | — | — | — | 0.30 | — | — | 0.55 |
| Carboxylic acid compound (b4) | FPA | 0.06 | — | — | — | 0.08 | 0.15 | — | — | — |
| | CPA | — | 0.30 | — | — | — | — | — | — | — |
| | NHBA | — | — | 0.10 | — | — | — | — | — | — |
| | 5HBA | — | — | 0.10 | — | — | — | — | — | — |
| | HCEA | — | — | — | 0.04 | — | — | — | — | — |
| (b4)/(b2) | | 0.20 | 0.50 | 0.40 | 0.05 | 0.10 | 0.30 | 0 | 0 | — |
| Solvent (g) | PGME | 6 | — | — | 6 | 8 | 9 | 6 | 8 | — |
| | MIBK | — | 6 | 8 | 2 | — | — | — | — | 6 |
| Catalyst (g) | $H_2O$ | 200 | 200 | 250 | 250 | 200 | 230 | 200 | 200 | 200 |
| | TEA | 20 | 20 | 22 | 25 | 20 | 20 | 20 | 20 | 20 |
| Reaction temperature (° C.) | | 75 | 70 | 80 | 85 | 70 | 65 | 75 | 70 | 80 |
| Polycondensation time (hours) | | 6 | 6.5 | 6 | 5 | 7 | 8 | 6 | 7 | 6 |

EXAMPLES AND COMPARATIVE EXAMPLES OF LIQUID CRYSTAL ALIGNMENT AGENT, LIQUID CRYSTAL ALIGNMENT FILM, AND LIQUID CRYSTAL DISPLAY ELEMENT

Example 1 to example 15 and comparative example 1 to comparative example 14 of the liquid crystal alignment agent, the liquid crystal alignment film, and the liquid crystal display element are described below:

Example 1 a. Liquid Crystal Alignment Agent 100 parts by weight of the polymer (A-1-1), 5 parts by weight of the polysiloxane (B-1), 8 parts by weight of the photopolymerizable compound (C-1) represented by formula (3-43), 1200 parts by weight of N-methyl-2-pyrrolidone (D-1 hereinafter), and 1200 parts by weight of ethylene glycol n-butyl ether (D-2 hereinafter) were weighed. Then, the components were continuously stirred under room temperature with a stirring apparatus until dissolved to form the liquid crystal alignment agent of example 1.

b. Liquid Crystal Alignment Film and Liquid Crystal Display Element

A liquid crystal cell was manufactured via the order shown below by using the obtained liquid crystal alignment agent. The liquid crystal alignment agent was respectively coated on two glass substrates each having an ITO electrode via a spin coating method, wherein the ITO electrodes were respectively a slit pattern having a line/space of 5 µm. Then, after pre-baking at 80° C. for 2 minutes on a heating plate, post-bake was performed in a circulation oven at 220° C. for 20 minutes to form the liquid crystal alignment film of example 1.

A thermal adhesive was coated on one of the two glass substrates on which a liquid crystal alignment film was each formed, and a 4 µm spacer was distributed in the other one. Next, the two glass substrates were pressed, and a pressure of 10 kg was applied with a hot press machine to perform hot press lamination at a temperature of 150° C. Then, after liquid crystal was injected via a liquid crystal injection machine (made by Shimadzu Corporation, model: ALIS-100X-CH), the liquid crystal injection hole was sealed via an ultraviolet curing sealant, and then the ultraviolet curing sealant was cured by irradiating via an ultraviolet lamp. Then, 20 Vp-p of alternating current was applied between the two ITO electrodes, and after 30 J of ultraviolet was irradiated under a driving state of the liquid crystal, the liquid crystal display element of example 1 was obtained. The liquid crystal display element of example 1 was evaluated by each of the following evaluation methods, and the results thereof are as shown in Table 3.

Example 2 to Example 15

The liquid crystal alignment agents, the liquid crystal alignment films, and the liquid crystal display elements of example 2 to example 15 were respectively prepared by the same steps as example 1, and the difference thereof is: the types and the usage amounts of the components were changed, as shown in Table 3. The liquid crystal display elements obtained in examples 2 to 15 were evaluated with the evaluation methods below, and the results thereof are as shown in Table 3.

Comparative Example 1 to Comparative Example 13

The liquid crystal alignment agents, the liquid crystal alignment films, and the liquid crystal display elements of comparative example 1 to comparative example 13 were respectively prepared by the same steps as example 1, and the difference is: the types and the usage amounts of the components were changed, as shown in Table 4. The liquid crystal display elements of comparative example 1 to comparative example 13 were evaluated with the evaluation methods below, and the results thereof are as shown in Table 4.

The compounds corresponding to the abbreviations in Table 3 and Table 4 are as shown below.

| Abbreviation | Component |
|---|---|
| A-1-1 | Polymer (A-1-1) |
| A-1-2 | Polymer (A-1-2) |
| A-1-3 | Polymer (A-1-3) |
| A-1-4 | Polymer (A-1-4) |
| A-1-5 | Polymer (A-1-5) |
| A-2-1 | Polymer (A-2-1) |
| A-2-2 | Polymer (A-2-2) |
| A-2-3 | Polymer (A-2-3) |
| A-2-4 | Polymer (A-2-4) |
| A-2-5 | Polymer (A-2-5) |
| A-2-6 | Polymer (A-2-6) |
| A-2-7 | Polymer (A-2-7) |
| A-2-8 | Polymer (A-2-8) |
| A-2-9 | Polymer (A-2-9) |
| A-2-10 | Polymer (A-2-10) |
| B-1 | Polysiloxane (B-1) |
| B-2 | Polysiloxane (B-2) |
| B-3 | Polysiloxane (B-3) |
| B-4 | Polysiloxane (B-4) |
| B-5 | Polysiloxane (B-5) |
| B-6 | Polysiloxane (B-6) |
| B'-1 | Polysiloxane (B'-1) |
| B'-2 | Polysiloxane (B'-2) |
| B'-3 | Polysiloxane (B'-3) |
| C-1 | Photopolymerizable compound represented by formula (3-43) |
| C-2 | Photopolymerizable compound represented by formula (3-52) |
| C-3 | Photopolymerizable compound represented by formula (3-47) |
| C-4 | Photopolymerizable compound represented by formula (3-70) |
| C-5 | Photopolymerizable compound represented by formula (3-76) |
| C-6 | Photopolymerizable compound represented by formula (3-86) |
| D-1 | N-methyl-2-pyrrolidone (NMP) |
| D-2 | Ethylene glycol n-butyl ether |
| D-3 | N,N-dimethylacetamide |
| E-1 | N,N,N',N'-tetraepoxypropyl-4,4'-diaminodiphenyl methane |
| E-2 | N,N-epoxypropyl-p-glycidoxyaniline |

<Evaluation Methods> a. Imidization Ratio

The imidization ratio refers to the proportion of the number of imide rings based on the total amount of the number of amic acid functional groups and the number of imide rings in the polymer, and is represented in percentage.

The detection method includes dissolving the polymers of the synthesis examples in a suitable deuteration solvent (for instance, deuterated dimethyl sulfoxide) after respectively performing drying under reduced pressure. Then, a result of $^1$H-nuclear magnetic resonance ($^1$H-NMR) was detected under room temperature (such as 25° C.) and using tetramethylsilane as reference material. The imidization ratio (%) was obtained by equation (1).

$$\text{Imidization ratio (\%)} = 1 - \frac{\Delta 1}{\Delta 2 \times \alpha} \times 100\% \quad \text{equation (1)}$$

Δ1: peak area generated due to chemical shift of an NH group proton near 10 ppm;

Δ2: peak area of other protons;

α: number ratio of one proton of NH group relative to other protons in precursor (polyamic acid) of polymer.

b. Resistance to Ultraviolet Decay

The resistance to ultraviolet decay of the liquid crystal display element was evaluated via the voltage holding ratio of the liquid crystal display element. More specifically, the measuring method of the voltage holding ratio of the liquid crystal display element is as described below.

The voltage holding ratio of the liquid crystal display element of each example and comparative example was respectively measured with an electrical measuring machine (made by Toyo Corporation, Model 6254). The test conditions include the application of a voltage of 4 V for 2 ms, release of the voltage, and measurement of the voltage holding ratio (calculated as V1) 1667 ms from release. Then, after the liquid crystal display element was irradiated with 30 mJ/cm² of ultraviolet (model of ultraviolet irradiation machine: KN-SH48K1, made by Kuang Neng), the voltage holding ratio (calculated as V2) after ultraviolet irradiation was measured with the same test conditions. Lastly, percentage change of voltage holding ratio (calculated as $V^{UV-decay}$ (%)) was obtained by calculating with equation (2). A lower percentage change of voltage holding ratio indicates better resistance to ultraviolet decay of the liquid crystal display element.

$$V^{UV-decay} (\%) = \frac{V1 - V2}{V1} \times 100\% \qquad \text{equation (2)}$$

The evaluation criteria of percentage change of voltage holding ratio are as shown below.

⊚: $V^{UV-decay}$<0.5%
○: 0.5%≤$V^{UV-decay}$<1%
Δ: 1%≤$V^{UV-decay}$<3%
X: 3%≤$V^{UV-decay}$ c. Mura Defect The liquid crystal display element of each of the examples and the comparative examples was observed for the generation of mura defect via a polarizing plate under a backlight source irradiation of a standard C light source. The evaluation criteria of mura defect are as shown below.

⊚: no mura defect.
○: slight mura defect, but insignificant.
Δ: significant mura defect.
X: severe mura-defect.

TABLE 3

| Component (unit: parts by weight) | | Example | | | | | | | |
|---|---|---|---|---|---|---|---|---|---|
| | | 1 | 2 | 3 | 4 | 5 | 6 | 7 | 8 |
| Polymer (A) | A-1-1 | 100 | — | — | — | — | — | — | — |
| | A-1-2 | — | 100 | — | — | — | — | — | — |
| | A-1-3 | — | — | 100 | — | — | — | — | — |
| | A-1-4 | — | — | — | 100 | — | — | — | — |
| | A-1-5 | — | — | — | — | 100 | — | — | — |
| | A-2-1 | — | — | — | — | — | 100 | — | — |
| | A-2-2 | — | — | — | — | — | — | 100 | — |
| | A-2-3 | — | — | — | — | — | — | — | 100 |
| | A-2-4 | — | — | — | — | — | — | — | — |
| | A-2-5 | — | — | — | — | — | — | — | — |
| | A-2-6 | — | — | — | — | — | — | — | — |
| | A-2-7 | — | — | — | — | — | — | — | — |
| | A-2-8 | — | — | — | — | — | — | — | — |
| | A-2-9 | — | — | — | — | — | — | — | — |
| | A-2-10 | — | — | — | — | — | — | — | — |
| Polysiloxane (B) | B-1 | 5 | — | — | — | — | 3 | 10 | — |
| | B-2 | — | 10 | — | — | — | — | — | 25 |
| | B-3 | — | — | 20 | — | — | — | — | — |
| | B-4 | — | — | — | 1 | — | — | — | — |
| | B-5 | — | — | — | — | 15 | — | 2 | — |
| | B-6 | — | — | — | — | — | — | — | — |
| Other polysiloxanes (B') | B'-1 | — | — | — | — | — | 3 | — | — |
| | B'-2 | — | — | — | — | — | — | — | — |
| | B'-3 | — | — | — | — | — | — | — | — |
| Photo-polymerizable compound (C) | C-1 | 8 | — | — | — | — | — | — | 20 |
| | C-2 | — | 12 | — | — | — | 3 | — | 10 |
| | C-3 | — | — | 5 | — | — | — | — | — |
| | C-4 | — | — | — | 20 | — | — | 1 | — |
| | C-5 | — | — | — | — | 10 | — | — | — |
| | C-6 | — | — | — | — | 5 | — | — | — |
| Solvent (D) | D-1 | 1200 | — | 900 | — | 250 | — | 2300 | 950 |
| | D-2 | 1200 | 2000 | 900 | — | 2800 | 1000 | — | 3200 |
| | D-3 | — | 500 | 900 | 2200 | — | 1050 | — | — |
| Additive (E) | E-1 | — | — | — | 3 | — | — | — | — |
| | E-2 | — | — | — | — | — | — | 5 | — |
| Resistance to ultraviolet decay | | ○ | ⊚ | ⊚ | ⊚ | ⊚ | ○ | ⊚ | ⊚ |
| Mura defect | | ○ | ⊚ | ⊚ | ⊚ | ⊚ | ○ | ○ | ⊚ |

| Component (unit: parts by weight) | | Example | | | | | | |
|---|---|---|---|---|---|---|---|---|
| | | 9 | 10 | 11 | 12 | 13 | 14 | 15 |
| Polymer (A) | A-1-1 | — | — | — | — | — | 50 | — |
| | A-1-2 | — | — | — | — | — | — | — |
| | A-1-3 | — | — | — | — | — | — | — |
| | A-1-4 | — | — | — | — | — | — | — |
| | A-1-5 | — | — | — | — | — | — | — |
| | A-2-1 | — | — | — | — | — | — | — |
| | A-2-2 | — | — | — | — | — | — | — |
| | A-2-3 | — | — | — | — | — | — | — |
| | A-2-4 | 100 | — | — | — | — | — | — |
| | A-2-5 | — | 100 | — | — | — | — | — |
| | A-2-6 | — | — | 100 | — | — | — | — |
| | A-2-7 | — | — | — | 100 | — | — | — |
| | A-2-8 | — | — | — | — | 100 | — | — |
| | A-2-9 | — | — | — | — | — | 50 | — |
| | A-2-10 | — | — | — | — | — | — | 100 |

TABLE 3-continued

| Component | | | | | | | | |
|---|---|---|---|---|---|---|---|---|
| Polysiloxane (B) | B-1 | — | — | — | — | — | 10 | — |
| | B-2 | — | 12 | — | 6 | — | — | — |
| | B-3 | — | 12 | — | — | 18 | 10 | — |
| | B-4 | 8 | — | — | — | — | — | — |
| | B-5 | — | — | 3 | — | — | — | — |
| | B-6 | — | — | — | — | — | — | 20 |
| Other polysiloxanes (B') | B'-1 | — | — | — | — | — | — | — |
| | B'-2 | — | — | — | — | — | — | — |
| | B'-3 | — | — | — | — | — | — | — |
| Photo-polymerizable compound (C) | C-1 | — | — | — | 12 | — | — | — |
| | C-2 | 12 | — | — | — | 2 | — | — |
| | C-3 | — | 6 | — | — | — | — | 35 |
| | C-4 | — | — | 10 | — | — | — | — |
| | C-5 | — | — | — | — | — | 5 | — |
| | C-6 | — | — | — | 12 | — | 20 | — |
| Solvent (D) | D-1 | — | 980 | — | 2500 | — | 2000 | — |
| | D-2 | 2700 | — | 1500 | — | — | 250 | 850 |
| | D-3 | — | 1580 | 760 | 900 | 1950 | — | 1800 |
| Additive (E) | E-1 | — | — | — | 2 | — | — | — |
| | E-2 | — | — | — | 1 | — | — | — |
| Resistance to ultraviolet decay | | ⊚ | ⊚ | ⊚ | ⊚ | ⊚ | ⊚ | ⊚ |
| Mura defect | | ⊚ | ⊚ | ○ | ⊚ | ⊚ | ⊚ | ⊚ |

TABLE 4

| Component (unit: parts by weight) | | Comparative example | | | | | | |
|---|---|---|---|---|---|---|---|---|
| | | 1 | 2 | 3 | 4 | 5 | 6 | 7 |
| Polymer (A) | A-1-1 | — | — | — | — | — | — | — |
| | A-1-2 | — | — | 100 | — | — | — | — |
| | A-1-3 | — | — | — | — | — | — | — |
| | A-1-4 | — | — | — | — | 100 | — | — |
| | A-1-5 | — | — | — | — | — | — | 100 |
| | A-2-1 | — | — | — | 100 | — | — | — |
| | A-2-2 | — | — | — | — | — | — | — |
| | A-2-3 | — | — | — | — | — | — | — |
| | A-2-4 | — | — | — | — | — | — | — |
| | A-2-5 | — | — | — | — | — | — | — |
| | A-2-6 | — | — | — | — | — | 100 | — |
| | A-2-7 | — | — | — | — | — | — | — |
| | A-2-8 | — | — | — | — | — | — | — |
| | A-2-9 | — | — | — | — | — | — | — |
| | A-2-10 | — | — | — | — | — | — | — |
| Polysiloxane (B) | B-1 | 100 | — | — | — | — | — | — |
| | B-2 | — | — | — | — | — | — | — |
| | B-3 | — | — | — | — | — | — | — |
| | B-4 | — | — | — | — | — | — | — |
| | B-5 | — | — | — | — | — | — | 15 |
| | B-6 | — | — | — | — | — | — | — |
| Other polysiloxanes (B') | B'-1 | — | 100 | — | — | — | — | — |
| | B'-2 | — | — | — | — | 1 | — | — |
| | B'-3 | — | — | — | — | — | 3 | — |
| Photo-polymerizable compound (C) | C-1 | 8 | — | — | — | — | — | — |
| | C-2 | — | — | 12 | 4 | — | — | — |
| | C-3 | — | 5 | — | — | — | — | — |
| | C-4 | — | — | — | — | 20 | 10 | — |
| | C-5 | — | — | — | — | — | — | — |
| | C-6 | — | — | — | — | — | — | — |
| Solvent (D) | D-1 | 1200 | 900 | — | — | — | — | 250 |
| | D-2 | 1200 | 900 | 2000 | 1000 | — | 1500 | 2800 |
| | D-3 | — | 900 | 500 | 1050 | 2200 | 760 | — |
| Additive (E) | E-1 | — | — | — | — | 3 | — | — |
| | E-2 | — | — | — | — | — | — | — |
| Resistance to ultraviolet decay | | X | X | X | X | Δ | X | Δ |
| Mura defect | | X | X | Δ | Δ | Δ | Δ | X |

| Component (unit: parts by weight) | | Comparative example | | | | | |
|---|---|---|---|---|---|---|---|
| | | 8 | 9 | 10 | 11 | 12 | 13 |
| Polymer (A) | A-1-1 | — | — | — | — | — | — |
| | A-1-2 | — | — | — | — | 100 | — |
| | A-1-3 | — | — | — | 100 | — | — |
| | A-1-4 | — | — | — | — | — | — |
| | A-1-5 | — | — | — | — | — | — |
| | A-2-1 | — | — | — | — | — | — |
| | A-2-2 | — | — | — | — | — | — |
| | A-2-3 | — | — | — | — | — | — |
| | A-2-4 | — | — | — | — | — | — |
| | A-2-5 | — | — | — | — | — | — |
| | A-2-6 | — | — | — | — | — | — |
| | A-2-7 | 100 | — | — | — | — | — |
| | A-2-8 | — | — | — | — | — | — |
| | A-2-9 | — | — | — | — | — | — |
| | A-2-10 | — | — | — | — | — | 100 |
| Polysiloxane (B) | B-1 | — | — | — | — | — | — |
| | B-2 | 6 | — | — | — | — | — |
| | B-3 | — | 100 | — | — | — | — |
| | B-4 | — | — | — | — | — | — |
| | B-5 | — | — | — | — | — | — |
| | B-6 | — | — | — | — | — | — |
| Other polysiloxanes (B') | B'-1 | — | — | 50 | — | — | — |
| | B'-2 | — | — | 50 | — | 10 | — |
| | B'-3 | — | — | — | — | — | 20 |
| Photo-polymerizable compound (C) | C-1 | — | — | — | — | — | — |
| | C-2 | — | — | — | — | — | — |
| | C-3 | — | — | — | — | — | — |
| | C-4 | — | — | — | — | — | — |
| | C-5 | — | — | — | — | — | — |
| | C-6 | — | — | — | — | — | — |
| Solvent (D) | D-1 | 2500 | 900 | — | 900 | — | — |
| | D-2 | — | 900 | 2000 | 900 | 2000 | 850 |
| | D-3 | 900 | 900 | 500 | 900 | 500 | 1800 |
| Additive (E) | E-1 | 2 | — | — | — | — | — |
| | E-2 | 1 | — | — | — | — | — |
| Resistance to ultraviolet decay | | Δ | X | X | X | X | X |
| Mura defect | | X | X | X | X | X | X |

Comparative Example 14

The liquid crystal alignment agent, the liquid crystal alignment film, and the liquid crystal display element of comparative example 14 were prepared with the same steps as comparative example 11, wherein the types and the usage amounts of the components were substantially the same, and the difference is: 2.4 wt % of the photopolymerizable compound (C-1) was further added in the used liquid crystal layer. After the obtained liquid crystal display element was also evaluated via the above evaluation methods, the performances of resistance to ultraviolet decay and mura defect thereof were both X.

<Evaluation Results>

It can be known from Table 3 and Table 4 that, in comparison to the liquid crystal display elements (example 1 to example 15) obtained from the liquid crystal alignment agent containing all of the polymer (A), the polysiloxane (B), and the photopolymerizable compound (C), the liquid crystal display elements of comparative example 1 to comparative example 13 do not have resistance to ultraviolet decay and have the issue of severe mura defect.

Moreover, when the polymer (A) (i.e., polymer (A-2-4) to polymer (A-2-9)) having an imidization ratio of 30% to 90% is used (example 9 to example 14), the resistance to ultraviolet decay of the liquid crystal display element is better.

Moreover, when at least one of the compounds represented by formula (3-44) to formula (3-50) and formula (3-69) to formula (3-97) is used as the photopolymerizable compound (C) (example 3 to example 5, example 7, example 10 to example 12, example 14 to example 15), the resistance to ultraviolet decay of the liquid crystal display element is better.

Moreover, when the carboxylic acid compound (b4) having a $C_6$ to $C_{50}$ long chain is used in the liquid crystal alignment agent (example 2 to example 4, example 8 to example 10, and example 12 to example 14), the issue of mura defect of the liquid crystal display element can be further alleviated.

Moreover, when the polymer (A) contains at least one of the diamine compounds (a2) represented by formula (II-1) and formula (II-2) (example 4 to example 5, example 9 to example 10, and example 15), the issue of mura defect of the liquid crystal display element can be further alleviated.

Moreover, when the polymer (A) contains at least one of the diamine compounds (a2) represented by formula (II-26) and formula (II-30) (example 2, example 5, example 8, and example 12), the resistance to ultraviolet decay of the liquid crystal display element can be further increased.

Moreover, it can be known according to the evaluation results of comparative example 14 that, when the photopolymerizable compound (C-1) is further added in the used liquid crystal layer, the liquid crystal display element does not have resistance to ultraviolet decay and has the issue of severe mura defect.

Based on the above, in the SCVA-type liquid-crystal alignment agent of the invention, in addition to containing a polymer and a solvent, a photopolymerizable compound is further added in the liquid crystal alignment agent, and a photopolymerizable compound is not added in the liquid crystal layer as is the case with a polymer-stabilized alignment-type. As a result, the known issue of contamination of the liquid crystal layer from an impurity is solved.

Moreover, the liquid crystal alignment agent of the invention contains a polysiloxane having a specific structure, such that the resistance to ultraviolet decay of the liquid crystal display element is good. Moreover, the liquid crystal alignment agent of the invention contains a photopolymerizable compound, such that the liquid crystal display element does not have the issue of mura defect. As a result, the liquid crystal alignment agent of the invention is suitable for the manufacture of a liquid crystal alignment film and a liquid crystal display element.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A liquid crystal alignment agent, comprising:

a polymer (A);

a polysiloxane (B);

a photopolymerizable compound (C); and a solvent (D), wherein the polymer (A) is obtained by reacting a first mixture, and the first mixture comprises a tetracarboxylic dianhydride component (a1) and a diamine component (a2), the polysiloxane (B) is obtained by reacting a polysiloxane compound and a carboxylic acid compound (b4) having a $C_4$ to $C_{50}$ long chain, the polysiloxane compound is obtained by reacting a second mixture, wherein the second mixture comprises a silane compound (b1) containing a polymerizable unsaturated group and a silane compound (b2) containing an epoxy group or an oxetane group, the polymerizable unsaturated group contained in the silane compound (b1) containing a polymerizable unsaturated group comprises a group represented by formula (1-1), a group represented by formula (1-2), or a combination of the two,

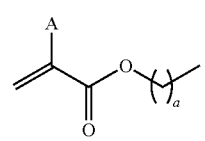

formula (1-1)

in formula (1-1), A represents a hydrogen atom or a methyl group; a represents an integer of 1 to 3,

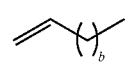

formula (1-2)

in formula (1-2), b represents an integer of 0 or 1, wherein based on 100 parts by weight of the polymer (A), a usage amount of the polysiloxane (B) is 1 part by weight to 25 parts by weight, a usage amount of the photopolymerizable compound (C) is 1 part by weight to 35 by weight, and a usage amount of the solvent (D) is 800 by weight to 4000 parts by weight.

2. The liquid crystal alignment agent of claim 1, wherein the silane compound (b2) contains a group selected from the group consisting of a group represented by formula (2-1), a group represented by formula (2-2), and a group represented by formula (2-3),

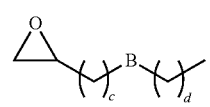

formula (2-1)

in formula (2-1), B represents an oxygen atom or a single bond; c represents an integer of 1 to 3; d represents an integer of 0 to 6, wherein when d represents 0, B is a single bond, formula (2-2)

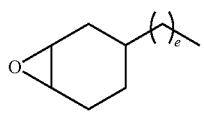

in formula (2-2), e represents an integer of 0 to 6, formula (2-3)

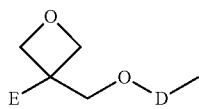

in formula (2-3), D represents a $C_2$ to $C_6$ alkylene group;
E represents a hydrogen atom or a $C_1$ to $C_6$ alkyl group.

3. The liquid crystal alignment agent of claim 1, wherein the carboxylic acid compound (b4) has a $C_6$ to $C_{50}$ long chain.

4. The liquid crystal alignment agent of claim 1, wherein the photopolymerizable compound (C) is a compound represented by formula (3), formula (3)

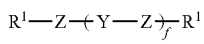

in formula (3),

R$^1$ each independently represents a polymerizable functional group represented by formula (3-1) to formula (3-5), a hydrogen atom, a halogen atom, CN, —CF$_3$, —CF$_2$H, —CFH$_2$, —OCF$_3$, —OCF$_2$H, —N=C=O, —N=C=S, or a $C_1$ to $C_{20}$ alkyl group, wherein any —CH$_2$— in the alkyl group may be substituted by —O—, —S—, —SO$_2$—, —CO—, —COO—, —OCO—, —CH=CH—, —CF=CF—, or —C≡C—, and in the functional group containing a hydrogen atom, any of the hydrogen atom may be substituted by a halogen atom or —CN;

at least one R$^1$ is a polymerizable functional group represented by formula (3-1) to formula (3-5);

Y independently represents a divalent group of a $C_3$ to $C_{20}$ saturated or unsaturated independent ring, condensed ring, or spiro ring, wherein in the ring, any —CH$_2$— may be substituted by —O—, any —CH= may be substituted by —N=, any —H may be substituted by a halogen atom, —CN, —NO$_2$, —NC, —N=C=O, —N=C=S, a silyl group substituted by one to three $C_1$ to $C_4$ alkyl groups or phenyl groups, a $C_1$ to $C_{10}$ straight-chain alkyl group, a $C_1$ to $C_{10}$ branched-chain alkyl group, or a $C_1$ to $C_{10}$ haloalkyl group, and in the alkyl group, any —CH$_2$— may be substituted by —O—, —CO—, —COO—, —OCO—, —OCOO—, —CH=CH—, or —C≡C—;

Z each independently represents a single bond or a $C_1$ to $C_{20}$ alkylene group, wherein any —CH$_2$— in the alkylene group may be substituted by —O—, —S—, —SO$_2$—, —CO—, —COO—, —OCO—, —OCOO—, —CH=CH—, —CF=CF—, —N=CH—, —N=N—, —N(O)=N—, or —C≡C—, and any —H may be substituted by a halogen atom, a $C_1$ to $C_{10}$ alkyl group, or a $C_1$ to $C_{10}$ haloalkyl group;

f represents an integer of 1 to 6, wherein when f is an integer of 2 to 6, a plurality of —Y—Z— are the same or different;

formual (3-1)

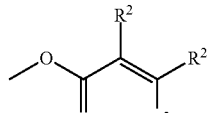

formula (3-2)

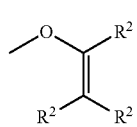

formula (3-3)

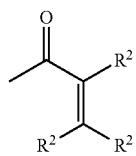

formula (3-4)

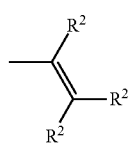

formula (3-5)

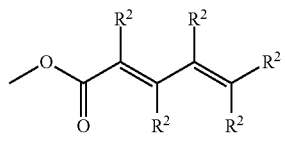

in formula (3-1) to formula (3-5), R$^2$ represents a hydrogen atom, a halogen atom, —CF$_3$, or a $C_1$ to $C_5$ alkyl group.

5. The liquid crystal alignment agent of claim 4, wherein at least one R$^1$ of the photopolymerizable compound (C) is the polymerizable functional group represented by formula (3-1) to formula (3-3).

6. The liquid crystal alignment agent of claim 4, wherein in the photopolymerizable compound (C), Y each independently represents a divalent group of 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]octane-1,4-diyl, bicyclo[3.1.0]hexane-3,6-diyl, or triptycene-1,4-diyl; in the ring, any —CH$_2$— may be substituted by —O—, any —CH= may be substituted by —N=, any —H may be substituted by a halogen atom, —CN, —NO$_2$, —NC, —N=C=O, —N=C=S, a silyl group substituted by one to three $C_1$ to $C_4$ alkyl groups or phenyl groups, a $C_1$ to $C_{10}$ straight-chain alkyl group or branched-chain alkyl group, or a $C_1$ to $C_{10}$ haloalkyl group; and in the alkyl group, any —CH$_2$— may be substituted by —O—, —CO—, —COO—, —OCO—, —OCOO—, —CH=CH—, or —C≡C—.

7. The liquid crystal alignment agent of claim 6, wherein Y each independently represents at least one selected from the group consisting of functional groups represented by formula (3-6) to formula (3-30), formula (3-6)
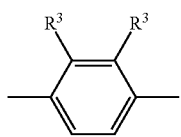
formula (3-7)
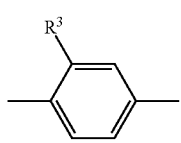
formula (3-8)
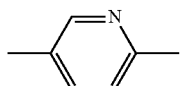
formula (3-9)
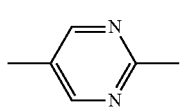
formula (3-10)
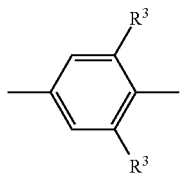
formula (3-11)
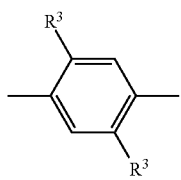
formula (3-12)
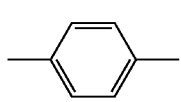
formula (3-13)
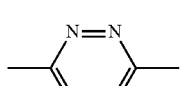
formula (3-14)
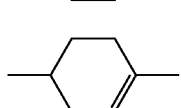
formula (3-15)
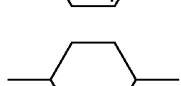
formula (3-16)
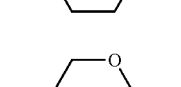
formula (3-17)
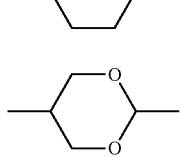
formula (3-18)
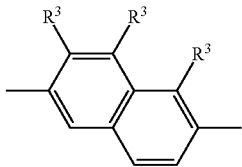
formula (3-19)
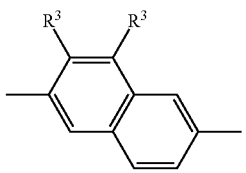
formula (3-20)
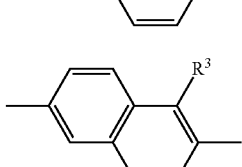
formula (3-21)
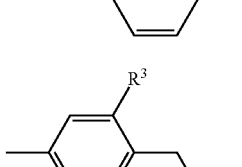
formula (3-22)
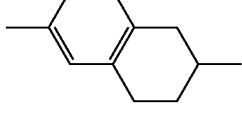
formula (3-23)
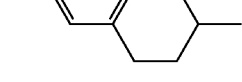
formula (3-24)
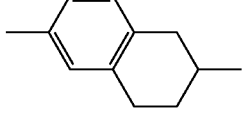
formula (3-25)
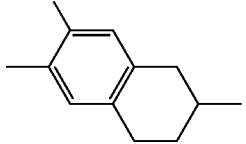
formula (3-26)
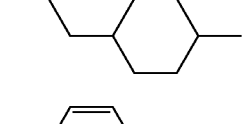
formula (3-27)
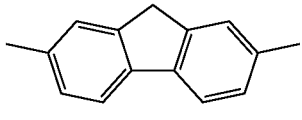

-continued

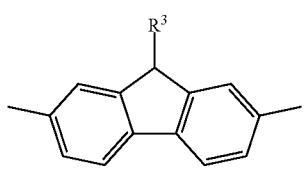
formula (3-28)

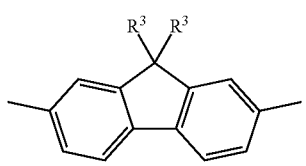
formula (3-29)

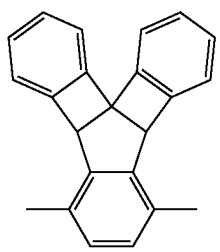
formula (3-30)

in formula (3-6) to formula (3-30), $R^3$ represents a halogen atom, a $C_1$ to $C_3$ alkyl group, a $C_1$ to $C_3$ alkoxy group, or a $C_1$ to $C_3$ haloalkyl group.

8. The liquid crystal alignment agent of claim 4, wherein the photopolymerizable compound (C) is a compound represented by formula (3),

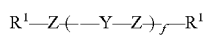 formula (3)

in formula (3), $R^1$ each independently represents a polymerizable functional group represented by formula (3-1) to formula (3-5), a hydrogen atom, a halogen atom, CN, —$CF_3$, —$CF_2H$, —$CFH_2$, —$OCF_3$, —$OCF_2H$, —N=C=O, —N=C=S, or a $C_1$ to $C_{20}$ alkyl group, wherein any —$CH_2$— in the alkyl group may be substituted by —O—, —S—, —$SO_2$—, —CO—, —COO—, —OCO—, —CH=CH—, —CF=CF—, or —C≡C—, and in the functional group containing a hydrogen atom, any of the hydrogen atom may be substituted by a halogen atom or —CN;

at least one $R^1$ is a polymerizable functional group represented by formula (3-1) to formula (3-5);

Y independently represents a divalent group of a $C_3$ to $C_{20}$ saturated or unsaturated independent ring, condensed ring, or spiro ring, wherein in the ring, any —$CH_2$— may be substituted by —O—, any —CH= may be substituted by —N=, any —H may be substituted by a halogen atom, —CN, —$NO_2$, —NC, —N=C=O, —N=C=S, a silyl group substituted by one to three $C_1$ to $C_4$ alkyl groups or phenyl groups, a $C_1$ to $C_{10}$ straight-chain alkyl group, a $C_1$ to $C_{10}$ branched-chain alkyl group, or a $C_1$ to $C_{10}$ haloalkyl group, and in the alkyl group, any —$CH_2$— may be substituted by —O—, —CO—, —COO—, —OCO—, —OCOO—, —CH=CH—, or —C≡C—;

Z each independently represents a single bond or a $C_1$ to $C_{20}$ alkylene group, wherein any —$CH_2$— in the alkylene group may be substituted by —O—, —S—, —$SO_2$—, —CO—, —COO—, —OCO—, —OCOO—, —CH=CH—, —CF=CF—, —CH=N—, —N=CH—, —N=N—, —N(O)=N—, or —C≡C—, and any —H may be substituted by a halogen atom, a $C_1$ to $C_{10}$ alkyl group, or a $C_1$ to $C_{10}$ haloalkyl group;

f represents an integer of 3 to 6, wherein a plurality of —Y—Z— are the same or different;

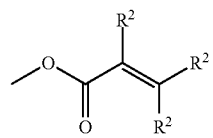
formula (3-1)

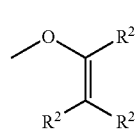
formula (3-2)

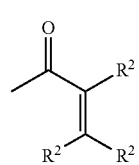
formula (3-3)

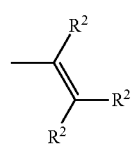
formula (3-4)

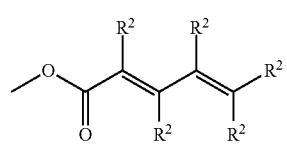
formula (3-5)

in formula (3-1) to formula (3-5), $R^2$ represents a hydrogen atom, a halogen atom, —$CF_3$, or a $C_1$ to $C_5$ alkyl group.

9. The liquid crystal alignment agent of claim 1, wherein the photopolymerizable compound (C) is at least one selected from the group consisting of compounds represented by formula (3-31) to formula (3-42),

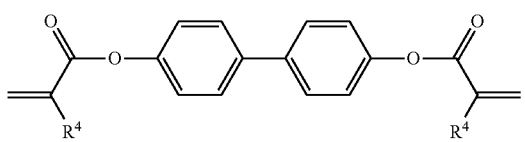
formula (3-31)

-continued
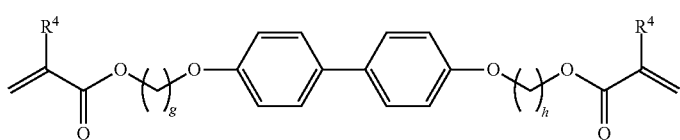
formula (3-32)
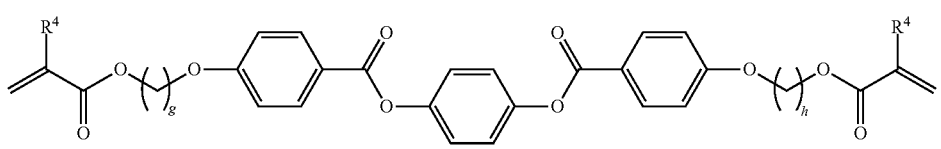
formula (3-33)
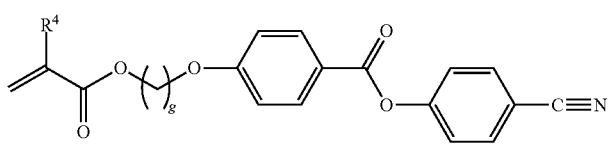
formula (3-34)
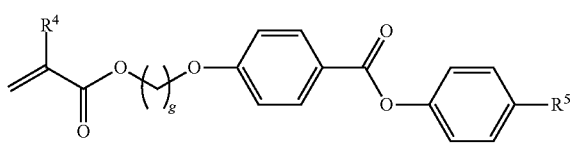
formula (3-35)
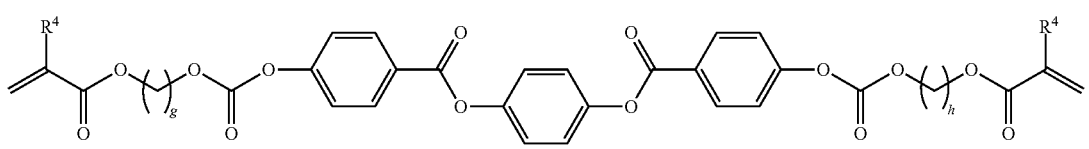
formula (3-36)
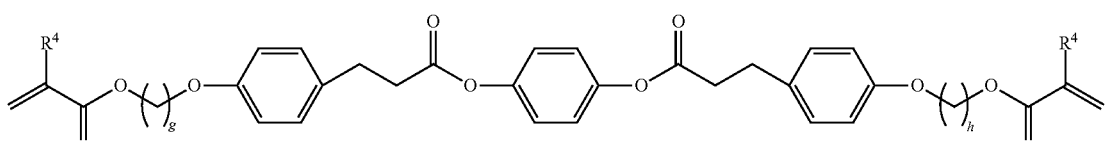
formula (3-37)
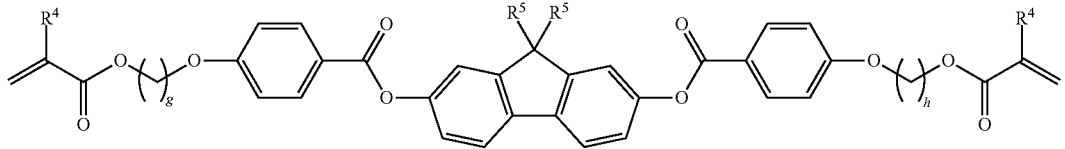
formula (3-38)
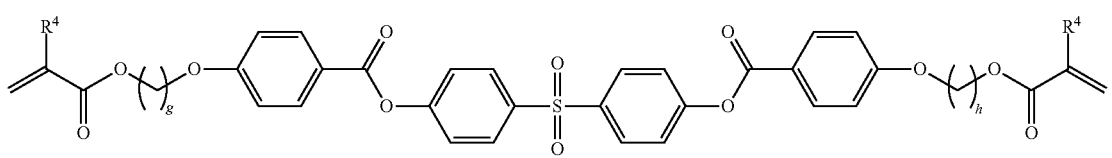
formula (3-39)
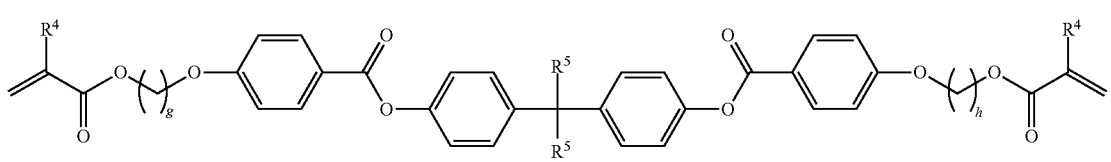
formula (3-40)

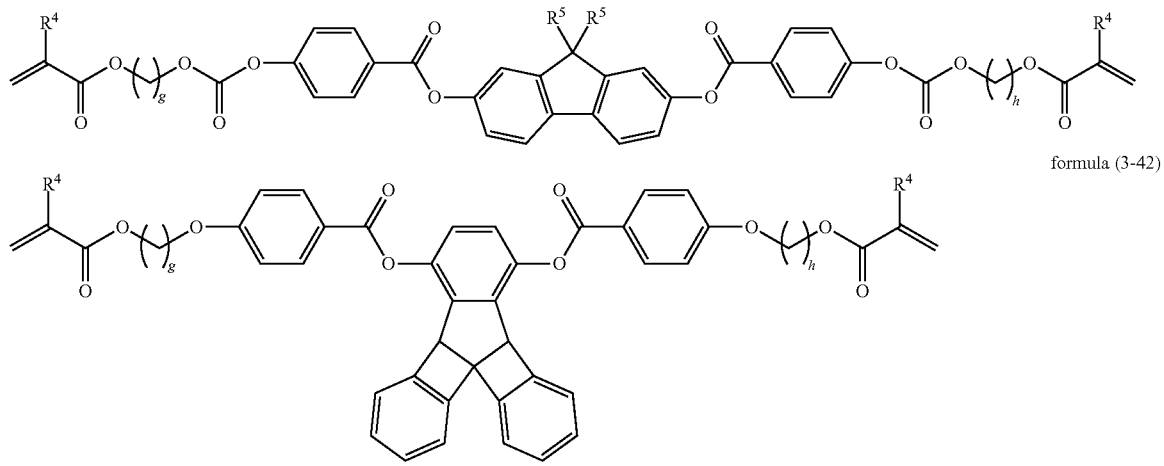

formula (3-41)

formula (3-42)

in formula (3-31) to formula (3-42), $R^4$ each independently represents a hydrogen atom or a methyl group;

$R^5$ each independently represents a hydrogen atom, a halogen atom, a methyl group, —$CF_3$, —$OCH_3$, a phenyl group, or a $C_6$ to $C_{15}$ saturated or unsaturated hydrocarbon ring formed by two $R^5$ on a same carbon atom;

g and h each independently represent an integer of 1 to 20.

10. The liquid crystal alignment agent of claim 1, wherein an imidization ratio of the polymer (A) is 30% to 90%.

11. A liquid crystal alignment film formed by the liquid crystal alignment agent of claim 1.

12. A liquid crystal display element, comprising the liquid crystal alignment film of claim 11.

* * * * *